(12) United States Patent
Chen et al.

(10) Patent No.: US 12,511,015 B2
(45) Date of Patent: Dec. 30, 2025

(54) APPLICATION SWITCHING METHOD, GRAPHICAL INTERFACE, AND RELATED APPARATUS

(71) Applicant: Honor Device Co., Ltd., Shenzhen (CN)

(72) Inventors: Wenjie Chen, Shenzhen (CN); Liwei Huang, Shenzhen (CN); Kai Qian, Shenzhen (CN); Jie Ren, Shenzhen (CN); Jing Ni, Shenzhen (CN); Xiaolong Wang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 228 days.

(21) Appl. No.: 18/278,908

(22) PCT Filed: May 13, 2022

(86) PCT No.: PCT/CN2022/092835
§ 371 (c)(1),
(2) Date: Aug. 25, 2023

(87) PCT Pub. No.: WO2023/016011
PCT Pub. Date: Feb. 16, 2023

(65) Prior Publication Data
US 2024/0061549 A1  Feb. 22, 2024

(30) Foreign Application Priority Data
Aug. 10, 2021  (CN) .................. 202110915930.X

(51) Int. Cl.
*G06F 3/048*  (2013.01)
*G06F 3/04817*  (2022.01)
(Continued)

(52) U.S. Cl.
CPC ........ *G06F 3/04817* (2013.01); *G06F 3/0482* (2013.01); *G06F 3/0488* (2013.01)

(58) Field of Classification Search
CPC ... G06F 3/04817; G06F 3/0482; G06F 3/0488
See application file for complete search history.

(56) References Cited

U.S. PATENT DOCUMENTS 9,116,616 B2 *   8/2015  Kyprianou .......... G06F 3/04886
9,298,474 B2 *   3/2016  Bauchot ................ G06F 3/0481
(Continued)

FOREIGN PATENT DOCUMENTS

CN          105453023 A      3/2016
CN          109062479 A     12/2018
(Continued)

*Primary Examiner* — David Phantana-angkool
(74) *Attorney, Agent, or Firm* — Leydig, Voit & Mayer, Ltd.

(57) ABSTRACT

This application discloses an application switching method. In the method, an electronic device may separately display interfaces of corresponding applications by using a plurality of floating windows. When a quantity of floating windows is greater than a preset quantity, and the electronic device detects that a new floating window is opened, the electronic device may switch the first displayed floating window to a form of a floating ball, and add a new floating window. In addition, the electronic device may switch the one or more floating windows to one or more corresponding floating balls for display. When detecting a sliding operation input by the user, the electronic device may switch a current floating window to a corresponding floating window on which the minimization operation is first or last performed. In this way, the electronic device can simultaneously display a plurality of applications, and quickly switch any one of the applications.

19 Claims, 74 Drawing Sheets

(51) Int. Cl.
  *G06F 3/0482* (2013.01)
  *G06F 3/0488* (2022.01)

(56) References Cited

U.S. PATENT DOCUMENTS

| | | | | |
|---|---|---|---|---|
| 10,509,537 | B2* | 12/2019 | Yoshida | G06F 3/0481 |
| 11,301,952 | B2* | 4/2022 | Zhao | G06F 9/485 |
| 11,543,928 | B2* | 1/2023 | Jing | G06F 3/0481 |
| 11,785,304 | B2* | 10/2023 | Weng | G06F 3/04817 |
| | | | | 715/720 |
| 11,921,977 | B2* | 3/2024 | Li | G06F 3/04817 |
| 12,236,060 | B2* | 2/2025 | Liao | G06F 3/0484 |
| 12,314,738 | B2* | 5/2025 | Liu | G06F 9/451 |
| 2014/0320425 | A1 | 10/2014 | Jeong et al. | |
| 2015/0309667 | A1* | 10/2015 | Wang | G06F 9/451 |
| | | | | 715/781 |
| 2021/0096675 | A1* | 4/2021 | Klein | G06F 3/04886 |
| 2021/0109644 | A1* | 4/2021 | Chen | G06F 9/451 |
| 2021/0271384 | A1* | 9/2021 | Shin | G06F 3/016 |
| 2022/0004292 | A1 | 1/2022 | Shim et al. | |
| 2022/0318036 | A1* | 10/2022 | Zhang | G06F 3/0488 |
| 2023/0046708 | A1* | 2/2023 | Xu | G06F 1/1677 |
| 2023/0289023 | A1 | 9/2023 | Kim et al. | |
| 2024/0295905 | A1* | 9/2024 | Yang | G06F 3/0488 |
| 2024/0361897 | A1* | 10/2024 | Yan | G06F 3/04842 |
| 2025/0086804 | A1* | 3/2025 | Hu | G06F 3/04883 |
| 2025/0156048 | A1* | 5/2025 | Ren | G06F 3/04883 |

FOREIGN PATENT DOCUMENTS

| | | |
|---|---|---|
| CN | 109213402 A | 1/2019 |
| KR | 1020150026079 A | 3/2015 |
| WO | 2020007147 A1 | 1/2020 |

* cited by examiner

CONT.
FROM
FIG. 8A

The electronic device 100 detects a fifth operation input by the user, and displays, in a floating window, a third interface provided by a third application — S106

The electronic device receives, within a first time in which the third interface is displayed, no operation performed on the third application, and receives a sixth operation, and the electronic device switches the third application to the second application on which the minimization operation is first or last performed in the first sequence — S107

The electronic device changes the first sequence of the applications to a second sequence — S108

When the electronic device receives, within the first time in which the second interface provided by the second application is displayed, an operation performed on the second application, and/or after the first time in which the electronic device displays the second interface provided by the second application, the electronic device changes the second sequence of the applications to a third sequence — S109

The electronic device receives a seventh operation, and switches the second application to the third application on which the minimization operation is first or last performed in the third sequence — S110

FIG. 8B

APPLICATION SWITCHING METHOD, GRAPHICAL INTERFACE, AND RELATED APPARATUS

CROSS-REFERENCE TO RELATED APPLICATIONS

This application is a national stage of International Application No. PCT/CN2022/092835, filed on May 13, 2022, which claims priority to Chinese Patent Application No. 202110915930.X, filed on Aug. 10, 2021. The disclosures of both of the aforementioned applications are hereby incorporated by reference in their entireties.

TECHNICAL FIELD

This application relates to the field of terminals, and in particular, to an application switching method, a graphical interface, and a related apparatus.

BACKGROUND

With rapid development of terminal technologies, if a user wants to complete a task on a terminal, a plurality of applications need to be covered, in other words, the user needs to use or browse the plurality of applications in stages to complete the task. How to design an application switching method so that a user can easily use or browse a plurality of applications to efficiently complete a task is a problem that urgently needs to be resolved.

SUMMARY

This application provides an application switching method, a graphical interface, and a related apparatus. In the method, an electronic device may display, at a time by using floating windows, interfaces provided by a plurality of applications, or may switch one or more floating windows to one or more corresponding floating balls for display. If a sliding operation input by the user is detected, the electronic device may switch a current floating window to a corresponding floating window first or last switched to a floating ball. In this way, the electronic device can not only simultaneously display a plurality of applications, but also quickly switch any one of the applications. Such an operation simplifies redundant steps, achieves an effect of direct entry to a target scenario, and improves user experience.

According to a first aspect, this application provides an application switching method. The method is applied to an electronic device, and the method includes: The electronic device displays a first interface, where the first interface includes a first floating window and a second floating window, the first floating window corresponds to a first application, and the second floating window corresponds to a second application. The electronic device detects a first operation. The electronic device displays a second interface in response to the first operation, where the second interface includes the second floating window, a third floating window, and a first floating ball, the third floating window corresponds to a third application, and the first floating ball corresponds to the first application.

According to the method provided in the first aspect, a user can simultaneously browse or use a plurality of applications by using floating windows, and also, when opening a new floating application, the user can switch the first displayed floating application to a form of a floating ball for display, so that the user can tap the floating ball to quickly display the corresponding floating window again.

With reference to the first aspect, in an implementation, the method further includes: The electronic device detects a second operation performed on the first floating ball. The electronic device displays a third interface in response to the second operation, where the third interface includes the first floating window, the third floating window, and a second floating ball, and the second floating ball corresponds to the second application.

In this way, the user can tap a floating ball to quickly display a corresponding floating window again. Such an operation simplifies redundant steps, achieves an effect of direct entry to a target scenario, and improves user experience.

With reference to the first aspect, in an implementation, after the electronic device displays the third interface, the method further includes: The electronic device detects a third operation used to display the first floating window in a minimized form. The electronic device displays a fourth interface in response to the third operation, where the fourth interface displays the third floating window, the second floating ball, and the first floating ball, and the first floating ball is displayed in a manner of being superimposed on the second floating ball. The electronic device detects a fourth operation of sliding rightward performed on the bottom of the third floating window. The electronic device displays a fifth interface in response to the fourth operation, where the fifth interface displays the first floating window, the second floating ball, and the third floating ball, and the second floating ball is displayed in a manner of being superimposed on the third floating ball.

In this way, the user can sequentially perform a minimization operation on one or more floating windows, and sequentially switch the one or more floating windows to one or more corresponding floating balls for display. Then the user can input a sliding operation on a currently displayed floating window, and switch the current floating window to a corresponding floating window on which the minimization operation is first or last performed. Continuous multi-point touch interaction, namely, sliding operation interaction, is used to replace an original human-computer interaction form of touching or tapping switched between a plurality of windows, to switch an application. Such an operation meets an expectation of the user, and avoids interrupting an operation flow of the user, thereby bringing immersive "flow" experience to the user and improving user experience.

With reference to the first aspect, in an implementation, after the electronic device displays the fifth interface, the method further includes: The electronic device detects no fifth operation within a first time in which the fifth interface is displayed, and detects a sixth operation of sliding leftward performed on the bottom of the first floating window, where a fifth operation includes an operation used to change a display size, a display location, or display content of the first floating window. The electronic device displays a sixth interface in response to the sixth operation, where the sixth interface displays the third floating window, the second floating ball, and the first floating ball, and the first floating ball is displayed in a manner of being superimposed on the second floating ball.

In this way, the user can switch back and forth between two applications by performing continuous leftward sliding and rightward sliding operations, thereby improving application switching efficiency, helping the user quickly browse a plurality of applications, and improving user experience.

With reference to the first aspect, in an implementation, after the electronic device displays the fifth interface, the method further includes: The electronic device receives a fifth operation within a first time in which the fifth interface is displayed, or the electronic device displays the fifth interface for duration exceeding the first time, where the fifth operation includes an operation used to change a display size, a display location, or display content of the first floating window. Then the electronic device detects a sixth operation of sliding rightward performed on the bottom of the first floating window. The electronic device displays a sixth interface in response to the sixth operation, where the sixth interface displays the third floating window, the second floating ball, and the first floating ball, and the second floating ball is displayed in a manner of being superimposed on the first floating ball.

In this way, the user can switch back and forth between two applications by performing a non-continuous leftward sliding or rightward sliding operation, thereby improving application switching efficiency, helping the user quickly browse a plurality of applications, and improving user experience.

With reference to the first aspect, in an implementation, that the electronic device detects a first operation specifically includes: The electronic device first detects an operation of sliding from an edge to an inner side of a display screen and displays a side bar, where the side bar displays icons of one or more applications, and then detects an operation performed on an icon of the third application, where the icons of the one or more applications include the icon of the third application. Alternatively, the electronic device detects an operation of sliding from an edge to an inner side of a display screen and displays a side bar, where the side bar displays icons of one or more applications; then detects an operation of continuously touching the display screen and sliding upward or downward after the operation of sliding toward the inner side, and determines, based on the operation of sliding upward or downward, that a corresponding application icon is selected; and finally detects an operation of stopping touching the display screen when the icon of the third application is selected.

In this way, the user can use continuous multi-point touch interaction, namely, sliding operation interaction, to replace an original human-computer interaction form of touching or tapping switched between a plurality of windows, to open a new floating application. Such an operation meets an expectation of the user, and avoids interrupting an operation flow of the user, thereby bringing immersive "flow" experience to the user and improving user experience.

With reference to the first aspect, in an implementation, the first floating window displays any one or more of the following: a top bar, a maximize control, a minimize control, a close control, or a bottom bar.

With reference to the first aspect, in an implementation, after the electronic device displays the fifth interface, the method further includes: The electronic device detects a seventh operation, and the electronic device performs any one of the following in response to the seventh operation: changing a location of the third floating window; changing a size of the third floating window; displaying, in full screen, an interface provided by the application corresponding to the third floating window; and stopping running the application corresponding to the third floating window.

In this way, the user can switch the floating window to a floating ball by performing a sliding operation on the top bar, or switch the floating window to a full-screen form by performing a tapping operation on the maximize control or a downward sliding operation on the bottom bar, to display a corresponding application, or control a size of the floating window by performing an upward sliding operation on the close control or the bottom bar or an operation of sliding inward or outward from four corners of the floating window, or change a display location of the floating window by performing a dragging operation on the top bar, to meet a personalized requirement of the user and improve user experience.

With reference to the first aspect, in an implementation, before the electronic device displays the first interface, the method further includes: The electronic device displays, in full screen, an interface provided by a fourth application.

In this way, the user can open floating windows of one or more other applications in an interface for displaying an application in full screen on the electronic device, and further display a plurality of applications in a full-screen form or a form of a floating window, so that the user can simultaneously browse or use a plurality of applications, thereby meeting a requirement of the user.

With reference to the first aspect, in an implementation, after the electronic device displays the sixth interface, the method further includes: The electronic device detects an eighth operation of double-tapping the bottom bar in the third floating window; displays a seventh interface in response to the eighth operation, where the seventh interface displays, in full screen, an interface provided by the third application corresponding to the third floating window; and displays the fourth floating window, the first floating ball, and the second floating ball in the interface provided by the first application, where the fourth floating window corresponds to the fourth application.

In this way, when the electronic device displays an interface of an application in full screen, and displays an application in the interface in a floating state, no user can switch, by performing an operation of double-tapping a bottom control in the floating window, the application displayed in the floating window to a full-screen form for display, and switch the application displayed in full screen to a form of a floating window for display. Such an operation simplifies redundant steps, achieves an effect of direct entry to a target scenario, and improves user experience.

With reference to the first aspect, in an implementation, that the side bar displays icons of one or more applications specifically includes: The electronic device displays the icons of the one or more applications in the side bar in a form of a single column or a plurality of columns.

In this way, the electronic device can display the side bar in different forms to meet a personalized requirement of the user.

With reference to the first aspect, in an implementation, that the side bar displays icons of one or more applications specifically includes: When the electronic device is displayed in a landscape mode, the electronic device displays the icons of the one or more applications in the side bar in a form of a plurality of columns; and when the electronic device is displayed in a portrait mode, the electronic device displays the icons of the one or more applications in the side bar in a form of a single column; or when a quantity of icons of the one or more applications is greater than a preset quantity, the electronic device displays the icons of the one or more applications in the side bar in a form of a plurality of columns; and when the quantity of icons of the one or more applications is less than or equal to the preset quantity, the electronic device displays the icons of the one or more applications in the side bar in a form of a single column.

In this way, the electronic device can control, by using a plurality of rules such as landscape-mode display/portrait-mode display and an application icon quantity, the side bar to display application icons in different forms, and the user can display a corresponding side bar on the electronic device based on a personal requirement, to meet a personalized requirement of the user.

With reference to the first aspect, in an implementation, the icons of the one or more applications displayed in the side bar are preset by the electronic device or set by the user.

Therefore, the application icon displayed in the side bar may be displayed by the electronic device by default, or may be a corresponding application icon displayed as user-defined, so that a personalized requirement of the user is met.

According to a second aspect, this application provides an application switching method. The method is applied to an electronic device, and the method includes: The electronic device sequentially displays, in a floating window, interfaces provided by a plurality of different applications, and sequentially switches the plurality of applications to the background for running. The electronic device displays, in the floating window, an interface provided by a first application. The electronic device receives a first operation. In response to the first operation, the electronic device switches the first application to the background for running, and displays, in the floating window, an interface provided by a second application. The first operation is an operation performed on the floating window, and the second application is an application, other than the first application in the plurality of applications, that is first or last switched to the background for running.

According to the method provided in the second aspect, the electronic device can use continuous multi-point touch interaction, namely, sliding operation interaction, to replace an original human-computer interaction form of touching or tapping switched between a plurality of windows. Such an operation simplifies redundant steps, achieves an effect of direct entry to a target scenario, meets an expectation of a user, and avoids interrupting an operation flow of the user, thereby bringing immersive "flow" experience to the user and improving user experience.

With reference to the second aspect, in an implementation, after the electronic device displays, in the floating window, the interface provided by the second application, the method further includes: The electronic device receives no second operation and receives a first operation within a first time in which the interface provided by the second application is displayed, where the second operation includes an operation, other than the first operation, performed on the floating window. In response to the first operation, the electronic device switches the second application to the background for running, and displays, in the floating window, an interface provided by a third application, where the third application is an application, other than the first application and the second application in the plurality of applications, that is first or last switched to the background for running.

In this way, the user can switch back and forth between two applications by performing continuous leftward sliding and rightward sliding operations, thereby improving application switching efficiency, helping the user quickly browse a plurality of applications, and improving user experience.

With reference to the second aspect, in an implementation, after the electronic device displays, in the floating window, the interface provided by the second application, the method further includes: The electronic device receives a second operation within the first time, or the electronic device displays, for duration exceeding the first time, the interface provided by the second interface, where the second operation includes an operation, other than the first operation, performed on the floating window. In response to the first operation, the electronic device switches the second application to the background for running, and displays, in the floating window, the interface provided by the first application.

In this way, the user can switch back and forth between two applications by performing continuous leftward sliding and rightward sliding operations, thereby improving application switching efficiency, helping the user quickly browse a plurality of applications, and improving user experience.

With reference to the second aspect, in an implementation, the first operation is specifically an operation of sliding leftward or rightward performed on the bottom of the floating window.

Such an operation simplifies redundant steps, achieves an effect of direct entry to a target scenario, meets an expectation of the user, and avoids interrupting an operation flow of the user, thereby bringing immersive "flow" experience to the user and improving user experience.

With reference to the second aspect, in an implementation, the second operation is specifically an operation of adjusting any one or more of a size, a location, or content of a second window.

With reference to the second aspect, in an implementation, after the electronic device sequentially displays, in the floating window, the interfaces provided by the plurality of different applications, and sequentially switches the plurality of applications to the background for running, the method further includes: The electronic device records a first sequence, where the first sequence is a sequence of switching the plurality of applications to the background for running or a reverse sequence of the sequence. That in response to the first operation, the electronic device displays, in the floating window, an interface provided by a second application specifically includes: In response to the first operation, the electronic device displays, in the floating window, an interface provided by the $1^{st}$ application in the first sequence.

In this way, when detecting that the user inputs an operation used to switch a floating window, the electronic device can switch a corresponding application based on a sequence of operations of switching floating windows to floating balls that are previously performed by the user, to meet a requirement of the user.

With reference to the second aspect, in an implementation, the method further includes: The electronic device records a second sequence in response to the first operation, where the second sequence is a sequence of switching an application other than the second application in the plurality of applications and the first application to the background for running or a reverse sequence of the sequence. That in response to the first operation, the electronic device displays, in the floating window, an interface provided by a third application specifically includes: In response to the first operation, the electronic device displays, in the floating window, an interface provided by the $1^{st}$ application in the second sequence.

In this way, after detecting that the user inputs an operation of switching a floating window to a floating ball, the electronic device can update a sequence of minimizing floating windows to floating balls, so that when inputting an operation of switching a floating window application next time, the user can switch to an application on which a minimization operation is last performed.

With reference to the second aspect, in an implementation, the method further includes: The electronic device records a second sequence in response to the first operation, where the second sequence is a sequence of switching an application other than the second application in the plurality of applications and the first application to the background for running or a reverse sequence of the sequence. The electronic device records a third sequence in response to the second operation or the first time, where in the third sequence, the $1^{st}$ application is the first application, and a sequence of applications other than the second application in the plurality of applications is the same as that in the first sequence. That in response to the first operation, the electronic device displays, in the floating window, the interface provided by the first application specifically includes: In response to the first operation, the electronic device displays, in the floating window, an interface provided by the $1^{st}$ application in the third sequence.

With reference to the second aspect, in an implementation, the method further includes: the floating window includes a first floating window and a second floating window, and that the electronic device sequentially displays, in a floating window, interfaces provided by a plurality of different applications, and sequentially switches the plurality of applications to the background for running specifically includes: The electronic device displays, in the first floating window, the interface provided by the first application, and then switches the first application to the background for running; and the electronic device displays, in the second floating window, the interface provided by the second application, and then switches the second application to the background for running. Alternatively, the electronic device displays, in the first floating window, the interface provided by the first application, and displays, in the second floating window, the interface provided by the second application; and then switches the first application to the background for running, and switches the second application to the background for running.

In this way, the electronic device can first display a floating application and switch the floating application to a floating ball, and then display the second application and switch the second application to a floating ball, or the electronic device can first display the $1^{st}$ floating application, then display the $2^{nd}$ floating application, and then sequentially switch the first application and the second application to floating balls. The user can display a floating application based on a personal habit or requirement.

With reference to the second aspect, in an implementation, that the electronic device displays, in the first floating window, the interface provided by the first application specifically includes: The electronic device detects an operation of sliding from an edge to an inner side of a display screen, and displays a side bar, where the side bar displays icons of one or more applications. The electronic device detects an operation performed on the icon, displays a first floating window, and displays, in the first floating window, the interface provided by the first application corresponding to the icon.

In this way, the user can open a floating application by opening the side bar.

With reference to the second aspect, in an implementation, that the electronic device displays, in the first floating window, the interface provided by the first application specifically includes: The electronic device detects an operation of sliding from an edge to an inner side of a display screen, and displays a side bar, where the side bar displays icons of one or more applications; and after detecting the operation of sliding from the edge to the inner side of the display screen, detects an operation of continuously touching the display screen and sliding upward or downward on the display screen and then stopping touching the display screen, displays the first floating window, and displays, in the first floating window, the interface provided by the first application corresponding to the icon selected when touching the display screen is stopped.

In this way, the user can use continuous multi-point touch interaction, namely, sliding operation interaction, to replace an original human-computer interaction form of touching or tapping switched between a plurality of windows, to open a new floating application. Such an operation meets an expectation of the user, and avoids interrupting an operation flow of the user, thereby bringing immersive "flow" experience to the user and improving user experience.

With reference to the second aspect, in an implementation, the side bar displays the icons of the one or more application programs in a form of a single column or plurality of columns; or the applications corresponding to the icons included in the side bar is set by the electronic device, or is set by the user.

In this way, the electronic device can control, by using a plurality of rules such as landscape-mode display/portrait-mode display and an application icon quantity, the side bar to display application icons in different forms, and the user can display a corresponding side bar on the electronic device based on a personal requirement, to meet a personalized requirement of the user.

With reference to the second aspect, in an implementation, before the electronic device displays, in the floating window, the interface provided by the first application, the method further includes: The electronic device displays, in full screen, an interface provided by a fourth application.

In this way, the user can open floating windows of one or more other applications in an interface for displaying an application in full screen on the electronic device, and further display a plurality of applications in a full-screen form or a form of a floating window, so that the user can simultaneously browse or use a plurality of applications, thereby meeting a requirement of the user.

With reference to the second aspect, in an implementation, after the electronic device displays, in the floating window, the interface provided by the first application, the method further includes: The electronic device detects a fourth operation, and in response to the fourth operation, switches the interface that is provided by the fourth application and that is displayed on the display screen to the interface provided by the first application, and displays, in the floating window, the interface provided by the fourth application.

In this way, when the electronic device displays an interface of an application in full screen, and displays an application in the interface in a floating state, no user can switch, by performing an operation of double-tapping a bottom control in the floating window, the application displayed in the floating window to a full-screen form for display, and switch the application displayed in full screen to a form of a floating window for display. Such an operation simplifies redundant steps, achieves an effect of direct entry to a target scenario, and improves user experience.

With reference to the second aspect, in an implementation, after the electronic device displays, in the floating window, the interface provided by the first application, the method further includes: The electronic device detects a fifth operation, and the electronic device performs any one of the following in response to the fifth operation: changing a location of the floating window; changing a size of the floating window; displaying, in full screen, the interface provided by the first application; and stopping running the first application. In this way, the user can switch the floating window to a floating ball by performing a sliding operation on a top bar, or switch the floating window to a full-screen form by performing a tapping operation on a maximize control or a downward sliding operation on a bottom bar, to display a corresponding application, or control a size of the floating window by performing an upward sliding operation on a close control or the bottom bar or an operation of sliding inward or outward from four corners of the floating window, or change a display location of the floating window by performing a dragging operation on the top bar, to meet a personalized requirement of the user and improve user experience.

According to a third aspect, this application provides an application switching method. The method is applied to an electronic device, and the method includes: The electronic device detects an operation of sliding upward from the bottom of a display screen, and displays a multitasking bar and an icon list. The multitasking bar includes interface thumbnails of background applications, and the icon list includes icons of the background applications. A quantity of icons in the icon list is greater than a quantity of interface thumbnails. A sequence of the background applications in the multitasking bar is the same as a sequence of the background applications in the icon list. An interface thumbnail located in the middle of the multitasking bar and an icon located in the middle of the icon list correspond to a same background application. The electronic device detects a first operation, and in response to the first operation, controls the interface thumbnails in the multitasking bar and the icons of the plurality of applications to move toward a first side, gradually increases interface thumbnails of background applications for display on a second side of the multitasking bar and stops displaying an interface thumbnail of a background application on the first side of the multitasking bar, gradually increases icons of background applications for display on the second side of the icon list and stops, on the first side of the icon list, displaying an icon of an application running in the background, where the second side is opposite to the first side. The electronic device detects a second operation, and in response to the second operation, the electronic device displays an interface provided by a first application, where the first application is an application corresponding to an interface thumbnail displayed in the multitasking bar.

In this way, when opening a multitasking view, a user can quickly enter the target application, so that application switching efficiency is improved, and user experience is improved.

With reference to the third aspect, in an implementation, the first operation specifically includes an operation of continuously touching the display screen and sliding toward the first side on the display screen after the operation of sliding upward from the bottom of the display screen, where a speed at which the electronic device controls, in response to the first operation, the interface thumbnails in the multitasking bar and the icons of the plurality of applications to move toward the first side is positively correlated with a speed of sliding toward the first side in the first operation, the second operation is specifically an operation of stopping touching the display screen after the operation of sliding toward the first side on the display screen, and the first application is specifically an application corresponding to the interface thumbnail in the middle of the task bar when the second operation is detected.

In this way, continuous multi-point touch interaction, namely, sliding operation interaction, is used to replace an original human-computer interaction form of touching or tapping switched between a plurality of windows, to switch an application. Such an operation meets an expectation of the user, and avoids interrupting an operation flow of the user, thereby bringing immersive "flow" experience to the user and improving user experience.

With reference to the third aspect, in an implementation, the first operation is specifically an operation of sliding the icon list toward the first side, where a speed at which the electronic device controls the interface thumbnails in the multitasking bar and the icons of the plurality of applications to move toward the first side is positively correlated with a speed of sliding the icon list toward the first side in the first operation; or the first operation is specifically an operation performed on a first icon other than the icon in the middle of the icon list, where the first operation is used to trigger the electronic device to move the first icon to the middle of the icon list. The second operation is specifically an operation performed on an interface thumbnail of the first application in the multitasking bar.

According to a fourth aspect, this application provides an electronic device. The electronic device includes one or more processors and one or more memories. The one or more memories are coupled to the one or more processors, and the one or more memories are configured to store computer program code. The computer program code includes computer instructions, and when the one or more processors execute the computer instructions, the electronic device is enabled to perform the methods implemented according to the first aspect, the second aspect, and the third aspect.

According to the electronic device provided in the fourth aspect, a user can simultaneously browse or use a plurality of applications by using floating windows, and also, when opening a new floating application, the user can switch the first displayed floating application to a form of a floating ball for display, so that the user can tap the floating ball to quickly display the corresponding floating window again.

According to a fifth aspect, this application provides a computer program product including instructions. When the computer program product runs on an electronic device, the electronic device is enabled to perform the methods implemented according to the first aspect, the second aspect, and the third aspect.

According to a sixth aspect, this application provides a computer-readable storage medium. The computer-readable storage medium includes instructions, and when the instructions run on an electronic device, the electronic device is enabled to perform the methods implemented according to the first aspect, the second aspect, and the third aspect.

BRIEF DESCRIPTION OF DRAWINGS

FIG. 6A-FIG. 6J are schematic diagrams of another group of user interfaces according to an embodiment of this application;

FIG. 8A and FIG. 8B are a flowchart of an application switching method according to an embodiment of this application.

DESCRIPTION OF EMBODIMENTS

The following clearly describes the technical solutions in embodiments of this application with reference to the accompanying drawings. In the descriptions of embodiments of this application, unless otherwise specified, "/" means "or", for example, A/B may mean A or B. In this specification, "and/or" merely describes an association relationship between associated objects, and represents that three relationships may exist. For example, A and/or B may represent the following cases: Only A exists, both A and B exist, and only B exists.

The following terms "first" and "second" are merely intended for descriptive purposes, and shall not be understood as an indication or an implication of relative importance or an implicit indication of a quantity of indicated technical features. Therefore, features defined with "first" and "second" may explicitly or implicitly include one or more features. In the descriptions of embodiments of this application, unless otherwise specified, "a plurality of" means two or more.

An "embodiment" in this application means that a specific feature, structure, or characteristic described with reference to the embodiment may be included in at least one embodiment of this application. The term appearing at various locations in the specification does not necessarily refer to a same embodiment, nor is it an independent or alternative embodiment mutually exclusive with another embodiment. A person skilled in the art explicitly and implicitly understands that the described embodiments in this application may be combined with another embodiment.

The term "user interface (UI)" in the following embodiments of this application is a medium interface for interaction and information exchange between an application or an operating system and a user, and implements conversion between an internal form of information and a form that can be accepted by the user. The user interface is source code written in a specific computer language such as java or an extensible markup language (XML). Interface source code is parsed and rendered on an electronic device, and is finally presented as content that can be identified by the user. The user interface is usually in a representation form of a graphical user interface (GUI), and the graphical user interface is a user interface that is related to a computer operation and that is displayed in a graphical manner. The user interface may be a visual interface element such as a text, an icon, a button, a menu, a tab, a text box, a dialog box, a status bar, a navigation bar, or a Widget displayed on a display screen of the electronic device.

Next, an implementation method in which an electronic device performs display through back-and-forth jumping between a plurality of applications is first described.

Figure 1A:
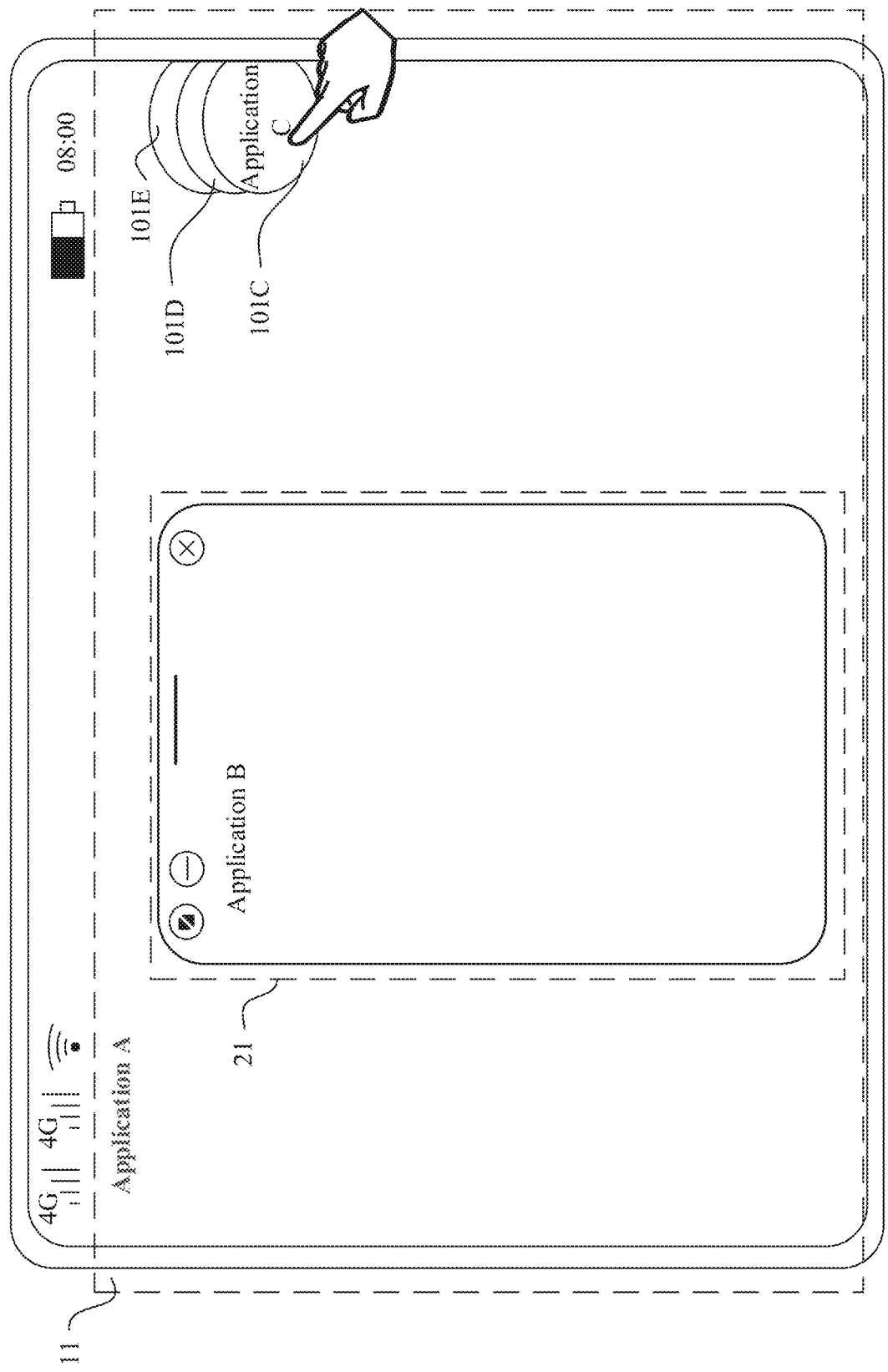
FIG. 1A-FIG. 1D are schematic diagrams of a group of user interfaces according to an embodiment of this application.

As shown in FIG. 1A, the electronic device displays an interface 11, an interface 21, and a floating ball icon 101C. The interface 11 is an interface provided by an application A, and is displayed on a display screen in full screen. The interface 21 is an interface provided by an application B, and is displayed in the interface 11 in a floating state. The floating ball icon 101C is an icon of an application recently displayed in a floating state. "Full screen" in "the interface 11 is displayed in full screen" herein refers to a region other than a status bar on the display screen.

The electronic device may detect, in a user interface shown in FIG. 1A, an operation performed on the floating ball icon 101C. In response to the operation, the electronic device may display a user interface shown in FIG. 1B.

Figure 1B:
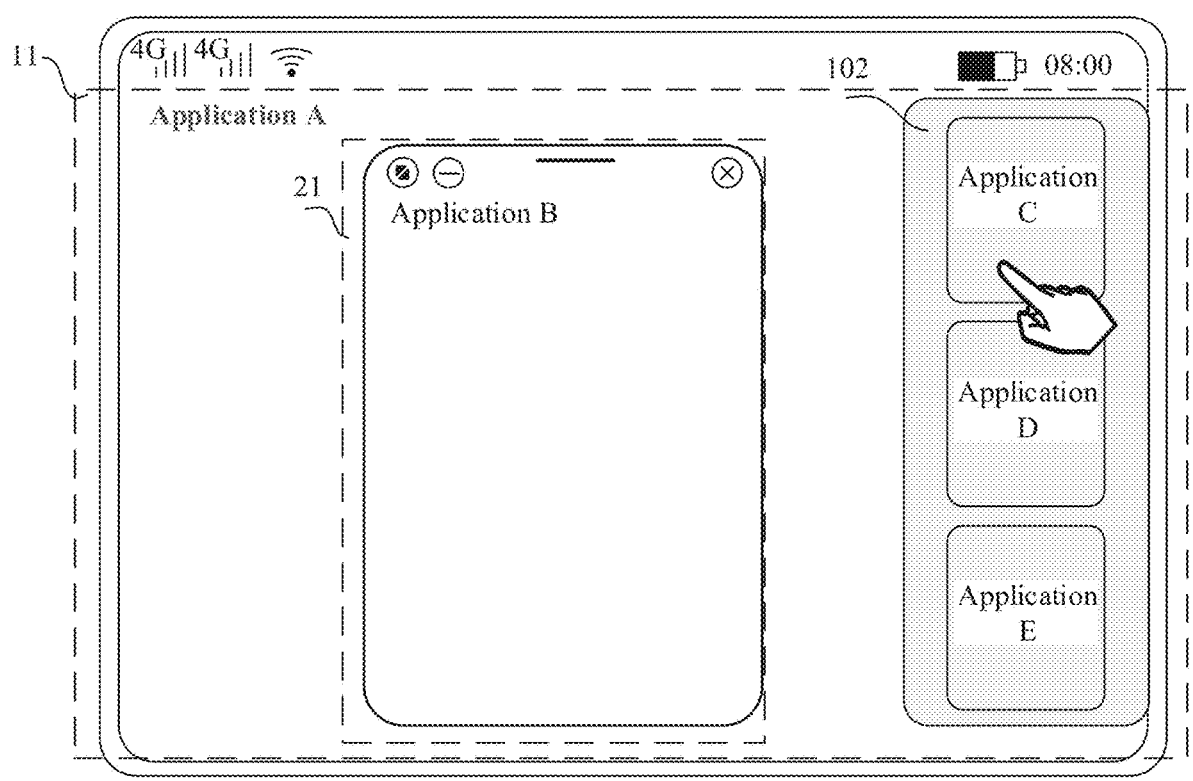

As shown in FIG. 1B, the electronic device expands the floating ball icon 101C in FIG. 1A into a historical application window 102. The historical application window 102 displays interface thumbnails of historical applications displayed in a floating state, for example, interface thumbnails of an application C, an application D, and an application E.

The electronic device may detect, in the user interface shown in FIG. 1B, an operation performed on an interface thumbnail of the application C in the historical application window 102. In response to the operation, the electronic device may display a user interface shown in FIG. 1C.

Figure 1C:
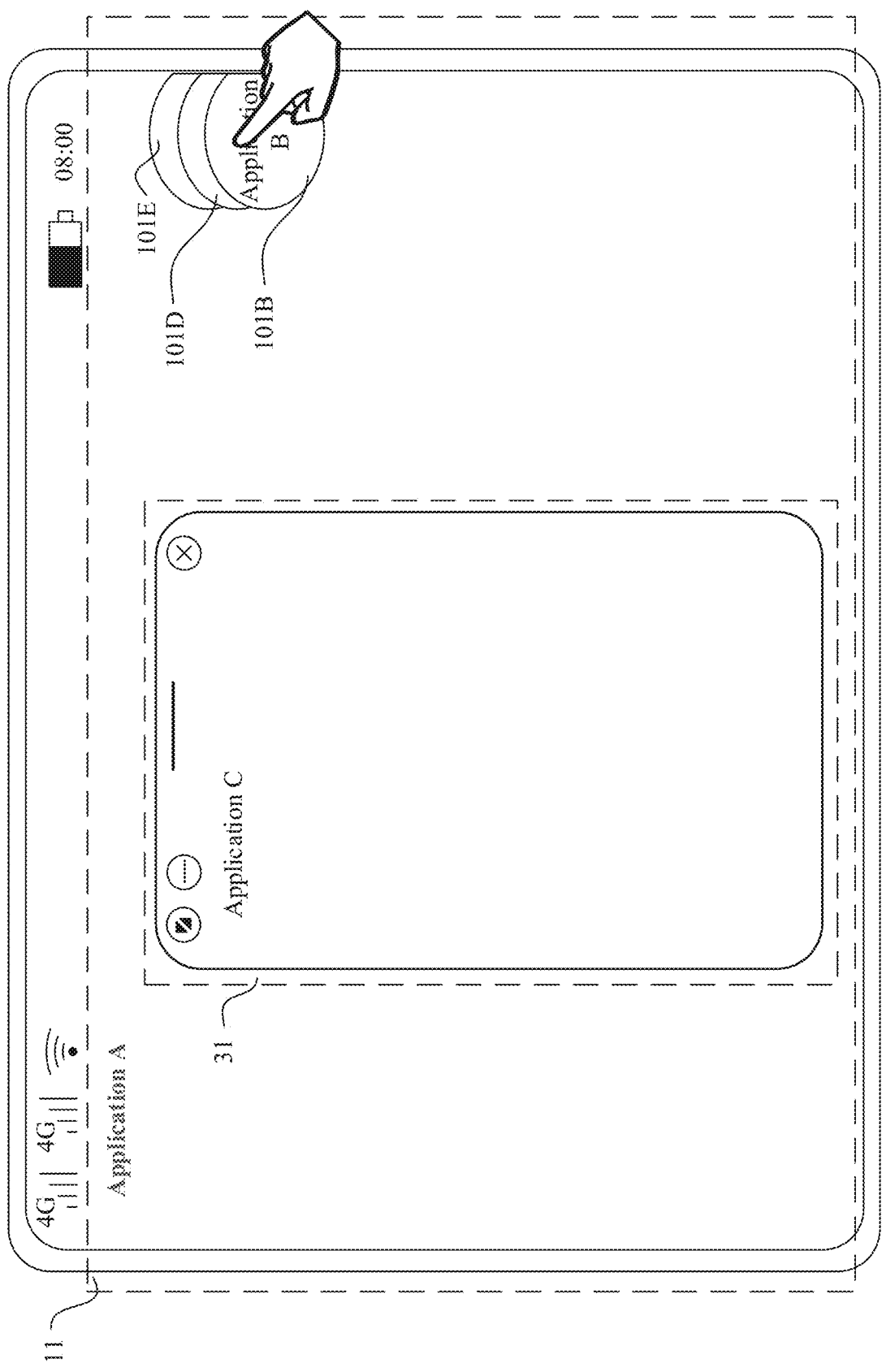

As shown in FIG. 1C, the electronic device switches an interface 21 provided by the application B displayed in a floating window in FIG. 1B to an interface 31 provided by the application C, and retracts the application B into the historical application window 102. In addition, in this case, a floating ball icon 101B is displayed at the uppermost layer, in other words, is displayed in a manner of being superimposed on a floating ball icon 101D and a floating ball icon 101E.

Based on the interface shown in FIG. 1C, if a user needs to switch the interface 31 provided by the application C displayed in the floating window back to the user interface shown in FIG. 1B, the electronic device may detect, in the user interface shown in FIG. 1C, a tapping operation performed on the floating ball icon 101B. In response to the operation, the electronic device displays a user interface shown in FIG. 1D.

Figure 1D:
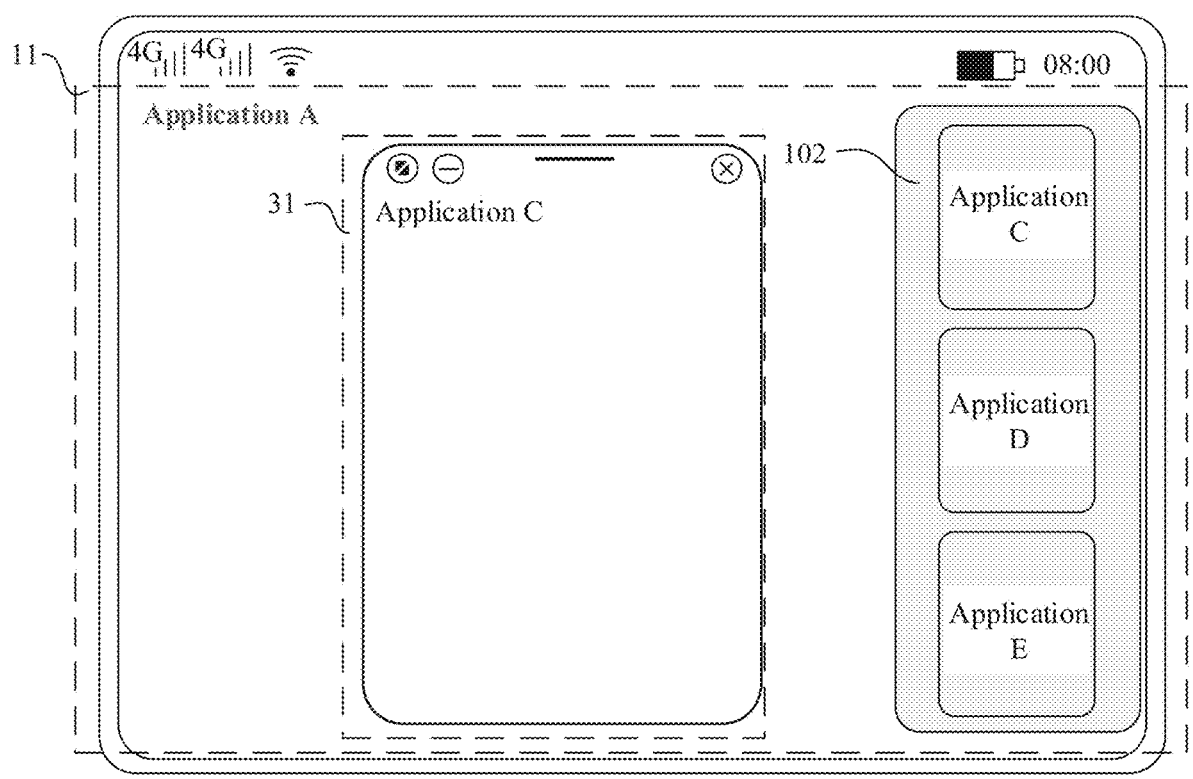

As shown in FIG. 1D, the floating ball icon 101B expands into the historical application window 102. In this case, the historical application window 102 displays interface thumbnails of historical applications displayed in a floating state, for example, interface thumbnails of the application B, the application D, and the application E. An interface thumbnail of an application last displayed in a floating state, namely, an interface thumbnail of the application B, is displayed at the $1^{st}$ location in the historical application window 102.

The electronic device may detect, in the user interface shown in FIG. 1D, an operation performed on the interface thumbnail of the application B in the historical application window 102. In response to the operation, the electronic device switches the interface 31 provided by the application C in the floating window to the interface 21 shown in FIG. 1B. For details, refer to the user interface shown in FIG. 1B.

It can be learned that when the user needs to switch back and forth, in the floating window, the interface 21 provided by the application B and the interface 31 provided by the application C, the operation performed on a floating ball icon and the operation performed on the interface thumbnail of the application B or the application C in the historical application window 102 that are described above need to be repeated. Such a switching operation is excessively cumbersome. When the user needs to frequently switch between a plurality of applications, such a switching operation requires the user to input touch/tapping or the like at a plurality of locations. It takes too long to perform such an operation. Therefore, operation costs are increased, operation efficiency of the user is reduced, and user experience is affected.

To resolve the foregoing problems, this application provides an application switching method. In the method, an electronic device may separately display interfaces of corresponding applications by using a plurality of floating windows. When a quantity of floating windows is greater than a preset quantity, and the electronic device detects that a new floating window is to be opened, the electronic device may switch the first displayed floating window to a form of a floating ball, and add the new floating window for display. In addition, the electronic device may switch, based on an operation that is input by a user and that is of sequentially performing a minimization operation on one or more floating windows, the one or more floating windows to one or more corresponding floating balls for display. When detecting a sliding operation input by the user, the electronic device may switch a current floating window to a corresponding floating window on which the minimization operation is first or last performed.

In this way, the electronic device uses continuous multi-point touch interaction, namely, sliding operation interaction, to replace an original human-computer interaction form of touching or tapping switched between a plurality of windows. Such an operation simplifies redundant steps, achieves an effect of direct entry to a target scenario, meets an expectation of the user, and avoids interrupting an operation flow of the user, thereby bringing immersive "flow" experience to the user and improving user experience.

To provide clearer and more detailed descriptions of the application switching method provided in embodiments of this application, the following first describes the electronic device 100 that implements the method and that is provided in embodiments of this application.

Figure 2A:
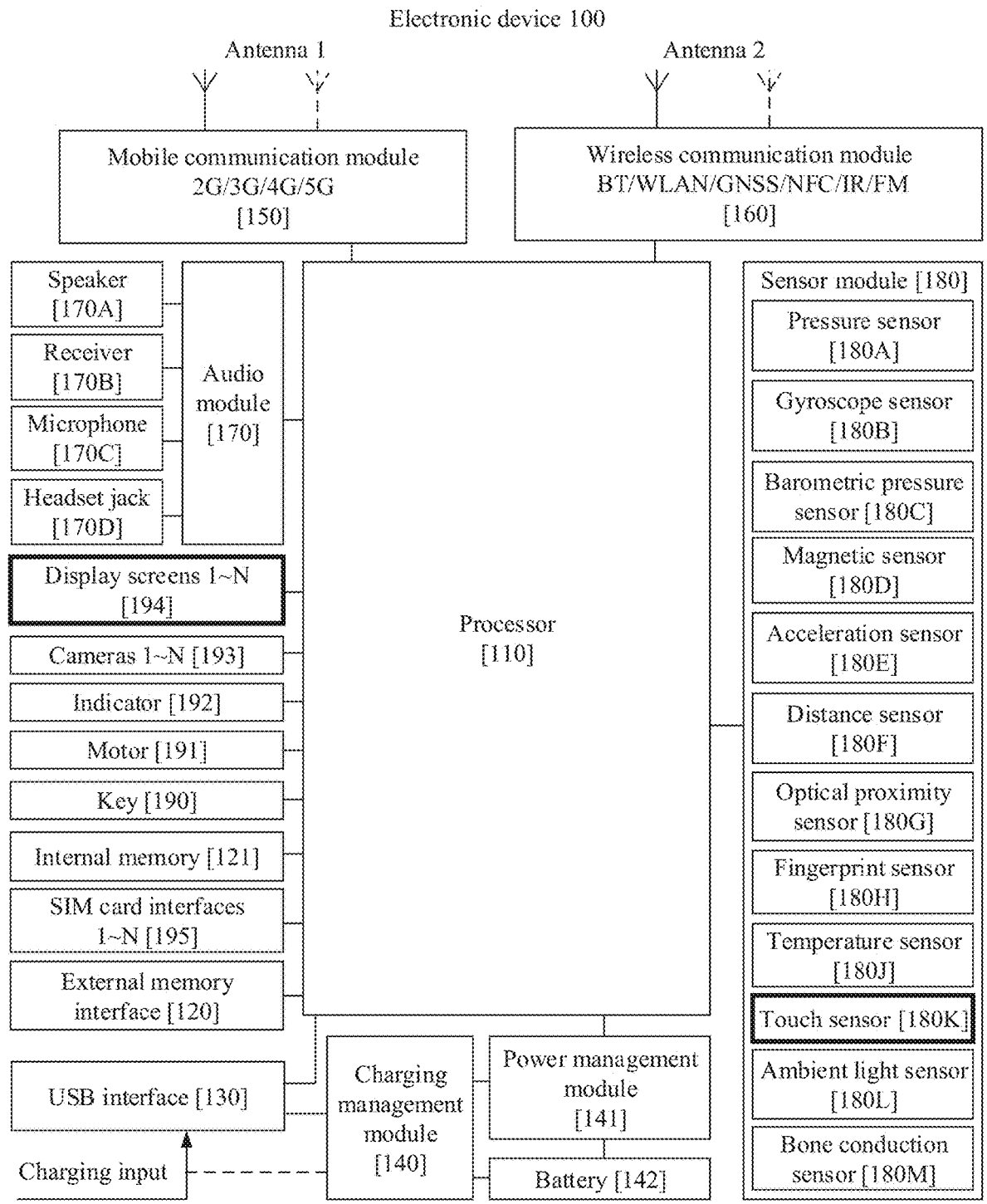
FIG. 2A is a schematic diagram of a hardware architecture of an electronic device 100 according to an embodiment of this application.

FIG. 2A is a schematic diagram of a hardware structure of the electronic device 100.

The electronic device 100 may be a mobile phone, a tablet computer, a desktop computer, a laptop computer, a handheld computer, a notebook computer, an ultra-mobile personal computer (UMPC), a netbook, a cellular phone, a personal digital assistant (PDA), an augmented reality (AR) device, a virtual reality (VR) device, an artificial intelligence (AI) device, a wearable device, a vehicle-mounted device, a smart household device, and/or a smart urban device. A specific type of the electronic device 100 is not specially limited in this embodiment of this application.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display screen 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present disclosure does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors. The controller may generate an operation control signal based on instruction operation code and a timing signal, to complete control of instruction fetching and instruction execution.

A memory may be further disposed in the processor 110 to store instructions and data. In some embodiments, the memory in the processor 110 is a cache. The memory may store instructions or data that is recently used or cyclically used by the processor 110. If the processor 110 needs to use the instructions or the data again, the processor 110 may directly invoke the instructions or the data from the memory. This avoids repeated access and reduces waiting time of the processor 110, thereby improving system efficiency.

In this embodiment of this application, the processor 110 may invoke, based on an operation that is input by a user and that is performed on an input/output device, an input/output device driver to send the operation input by the user to an IMS at an application framework layer. Then the IMS distributes the operation to a corresponding application at an application layer. Then an application E invokes a startActivity interface in an AMS to start an Activity corresponding to the operation. In addition, the AMS further needs to invoke a WMS interface, so that a WMS draws a window corresponding to the Activity, and invokes a display driver to implement interface display on the display screen.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a bidirectional synchronous serial bus, including a serial data line (SDA) and a serial clock line (SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, thereby implementing a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call by using a Bluetooth headset.

The PCM interface may also be used for audio communication, to sample, quantize, and encode an analog signal. In some embodiments, the audio module 170 may be coupled to the wireless communication module 160 through the PCM bus interface. In some embodiments, the audio module 170 may also transmit an audio signal to the wireless communication module 160 through the PCM interface, to perform the function of answering a call by using the Bluetooth headset. Both the I2S interface and the PCM interface may be used for audio communication.

The UART interface is a universal serial data bus, and is used for asynchronous communication. The bus may be a bidirectional communication bus. The bus converts to-be-transmitted data between serial communication and parallel communication. In some embodiments, the UART interface is usually configured to connect the processor 110 and the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music by using the Bluetooth headset.

The MIPI interface may be configured to connect the processor 110 and peripheral components such as the display screen 194 and the camera 193. The MIPI interface includes a camera serial interface (CSI), a display serial interface (DSI), and the like. In some embodiments, the processor 110 and the camera 193 communicate with each other through the CSI interface, to implement a photographing function of the electronic device 100. The processor 110 and the display screen 194 communicate with each other through the DSI interface, to implement a display function of the electronic device 100.

The GPIO interface may be configured by using software. The GPIO interface may be configured as a control signal or may be configured as a data signal. In some embodiments, the GPIO interface may be configured to connect the processor 110 to the camera 193, the display screen 194, the wireless communication module 160, the audio module 170, the sensor module 180, and the like. The GPIO interface may alternatively be configured as the I2C interface, the I2S interface, the UART interface, the MIPI interface, or the like.

The USB interface 130 is an interface that complies with USB standard specifications, and may be specifically a Mini USB interface, a Micro USB interface, a USB Type C interface, or the like. The USB interface 130 may be configured to connect to the charger to charge the electronic device 100, or may be configured to transmit data between the electronic device 100 and a peripheral device, or may be configured to connect to a headset, to play audio by using the headset. The interface may alternatively be configured to connect to another electronic device 100, for example, an AR device.

It may be understood that an interface connection relationship between modules illustrated in this embodiment of the present disclosure is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive charging input from the charger. The charger may be a wireless charger or a wired charger. In some embodiments of wired charging, the charging management module 140 may receive charging input of a wired charger through the USB interface 130. In some embodiments of wireless charging, the charging management module 140 may receive wireless charging input through a wireless charging coil of the electronic device 100. When charging the battery 142, the charging management module 140 may further supply power to the electronic device 100 by using the power management module 141.

The power management module 141 is configured to connect to the battery 142, the charging management module 140, and the processor 110. The power management module 141 receives input of the battery 142 and/or the charging management module 140, and supplies power to the processor 110, the internal memory 121, the display screen 194, the camera 193, the wireless communication module 160, and the like. The power management module 141 may be further configured to monitor parameters such as a battery capacity, a quantity of battery cycles, and a battery health status (leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communication module 150 may provide a solution for wireless communication including 2G/3G/4G/5G and the like to be applied to the electronic device 100. The mobile communication module 150 may include at least one filter, at least one switch, at least one power amplifier, at least one low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal obtained after modulation by the modem processor, and convert the signal into an electromagnetic wave for radiation through the antenna 1. In some embodiments, at least some functional modules in the mobile communication module 150 may be disposed in the processor 110. In some embodiments, at least some functional modules in the mobile communication module 150 may be disposed in a same component as at least some modules in the processor 110.

The modem processor may include a modulator and a demodulator. The modulator is configured to modulate a to-be-sent low-frequency baseband signal into an intermediate-frequency signal or a high-frequency signal. The demodulator is configured to demodulate a received electromagnetic wave signal into a low-frequency baseband signal. Then the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (not limited to the speaker 170A or the receiver 170B), or displays an image or a video by using the display screen 194. In some embodiments, the modem processor may be a standalone component. In some other embodiments, the modem processor may be independent of the processor 110, and is disposed in a same component as the mobile communication module 150 or another functional module.

The wireless communication module 160 may provide a wireless communication solution to be applied to the electronic device 100, including a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, and the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 are coupled, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 implements a display function by using the GPU, the display screen 194, the application processor, and the like. The GPU is a microprocessor for image processing, and is connected to the display screen 194 and the application processor. The GPU is configured to perform mathematical and geometric calculation for graphics rendering. The processor 110 may include one or more GPUs that execute program instructions to generate or change display information.

The display screen 194 is configured to display an image, a video, and the like. The display screen 194 includes a display panel. The display panel may be a liquid crystal display (LCD), an organic light-emitting diode (OLED), an active-matrix organic light emitting diode (AMOLED), a flexible light-emitting diode (FLED), a Miniled, a MicroLed, a Micro-oLed, a quantum dot light emitting diode (QLED), or the like. In some embodiments, the electronic device 100 may include one or N display screens 194, where N is a positive integer greater than 1.

In this embodiment of this application, the display screen 194 may be configured to display interfaces in different states that are provided by an application, for example, display the interfaces in full screen, display the interfaces in a floating window, or display the interfaces in a historical application window. For details of how the display screen 194 displays the interfaces provided by the application, refer to related descriptions in the following UI embodiments. Details are not described herein.

The electronic device 100 may implement a photographing function by using the ISP, the camera 193, the video codec, the GPU, the display screen 194, the application processor, and the like.

The ISP is configured to process data fed back by the camera 193. For example, during photographing, a shutter is opened, and light is transmitted to a photosensitive element of the camera through a lens. An optical signal is converted into an electrical signal. The photosensitive element of the camera transmits the electrical signal to the ISP for processing, to convert the electrical signal into an image visible to naked eyes. The ISP may further perform algorithm optimization on noise, brightness, and complexion of the image. The ISP may further optimize parameters such as exposure and a color temperature of a photographing scene. In some embodiments, the ISP may be disposed in the camera 193.

The camera 193 is configured to capture a still image or a video. An optical image is generated for an object by using the lens and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert electrical signal into a digital image signal. The ISP outputs the digital image signal to the DSP for processing. The DSP converts the digital image signal into an image signal in a standard format, for example, RGB or YUV. In some embodiments, the electronic device 100 may include one or N cameras 193, where N is a positive integer greater than 1.

The digital signal processor is configured to process a digital signal. In addition to processing a digital image signal, the digital signal processor can process another digital signal. For example, when the electronic device 100 selects a frequency, the digital signal processor is configured to perform Fourier transform on frequency energy.

The video codec is configured to compress or decompress a digital video. The electronic device 100 may support one or more video codecs. Therefore, the electronic device 100 may play or record videos in a plurality of encoding formats such as moving picture experts group (MPEG) 1, MPEG 2, MPEG 3, and MPEG 4.

The NPU is a neural-network (NN) computing processor, quickly processes input information by referring to a biological neural network structure, for example, by referring to a transmission mode between human brain neurons, and may further perform self-learning continuously. Applications such as intelligent cognition of the electronic device 100, for example, image recognition, face recognition, speech recognition, and text understanding, may be implemented by using the NPU.

The internal memory 121 may include one or more random access memories (RAMs) and one or more non-volatile memories (NVMs).

The random access memory may include a static random-access memory (SRAM), a dynamic random access memory (DRAM), a synchronous dynamic random access memory (SDRAM), a double data rate synchronous dynamic random access memory (DDR SDRAM, where for example, a fifth generation DDR SDRAM is usually referred to as a DDR5 SDRAM), and the like.

The non-volatile memory may include a magnetic disk storage component and a flash memory.

The flash memory may include NOR FLASH, NAND FLASH, 3D NAND FLASH, and the like based on an operating principle. The flash memory may include a single-level cell (SLC), a multi-level cell (MLC), a triple-level cell (TLC), a quad-level cell (QLC), and the like based on a quantity of levels of a cell. The flash memory may include a universal flash storage (UFS), an embedded multi media card (eMMC), and the like based on a storage specification.

The processor 110 may directly perform reading from or writing into the random access memory. The random access memory may be configured to store an executable program (for example, a machine instruction) of an operating system or another running program, and may be further configured to store data of a user and data of an application, and the like.

The non-volatile memory may also store the executable program, the data of the user, and the data of the application, and the like, which may be loaded into the random access memory in advance for directly reading and writing by the processor 110.

The external memory interface 120 may be configured to connect to an external non-volatile memory, to extend a storage capability of the electronic device 100. The external non-volatile memory communicates with the processor 110 through the external memory interface 120, to implement a data storage function. For example, files such as music and a video are stored in the external non-volatile memory.

The electronic device 100 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is further configured to convert analog audio input into a digital audio signal. The audio module 170 may be further configured to encode and decode an audio signal. In some embodiments, the audio module 170 may be disposed in the processor 110, or some functional modules in the audio module 170 may be disposed in the processor 110.

The speaker 170A, also referred to as a "horn", is configured to convert an audio electrical signal into a sound signal. The electronic device 100 may listen to music or answer a call in a hands-free mode by using the speaker 170A.

The receiver 170B, also referred to as an "earpiece", is configured to convert an audio electrical signal into a sound signal. When the electronic device 100 is used to answer a call or listen to voice information, a voice may be listened to by placing the receiver 170B close to a human ear.

The microphone 170C, also referred to as a "mic" or "mike", is configured to convert a sound signal into an electrical signal. When making a call or sending voice information, the user may make a sound by approaching the mouth to the microphone 170C, to input a sound signal to the microphone 170C. At least one microphone 170C may be disposed in the electronic device 100. In some other embodiments, the electronic device 100 may be provided with two microphones 170C, to implement a noise reduction function in addition to collecting a sound signal. In some other embodiments, the electronic device 100 may alternatively be provided with three, four, or more microphones 170C, to collect a sound signal, implement noise reduction, and identify a sound source, to implement a directional recording function and the like.

The headset jack 170D is configured to connect to a wired headset. The headset jack 170D may be the USB interface 130, or may be a 3.5 mm open mobile electronic device 100 platform (open mobile terminal platform, OMTP) standard interface or a cellular telecommunications industry association of the USA (CTIA) standard interface.

The pressure sensor 180A is configured to sense a pressure signal, and may convert the pressure signal into an electrical signal. In some embodiments, the pressure sensor 180A may be disposed on the display screen 194. There are many types of pressure sensors 180A, for example, a resistive pressure sensor, an inductive pressure sensor, and a capacitive pressure sensor. The capacitive pressure sensor may include at least two parallel plates having an electrically conductive material. When a force is applied onto the pressure sensor 180A, a capacitance between electrodes changes. The electronic device 100 determines strength of pressure based on a change of the capacitance. When a touch operation is performed on the display screen 194, the electronic device 100 detects intensity of the touch operation by using the pressure sensor 180A. The electronic device 100 may also calculate a touch location based on a detected signal of the pressure sensor 180A. In some embodiments, touch operations performed on a same touch location but with different touch operation intensity may correspond to different operation instructions. For example, when a touch operation whose touch operation intensity is less than a first pressure threshold is performed on a Messages application icon, an instruction for viewing an SMS message is executed. For example, when a touch operation whose touch operation intensity is greater than or equal to the first pressure threshold is performed on the Messages application icon, an instruction for creating a new SMS message is executed.

The gyroscope sensor 180B may be configured to determine a moving posture of the electronic device 100. In some embodiments, angular velocities of the electronic device 100 around three axes (namely, an x axis, a y axis, and a z axis) may be determined by using the gyroscope sensor 180B. The gyroscope sensor 180B may be configured to implement image stabilization during photographing. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may be further used in a navigation scenario and a motion sensing game scenario.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D may include a Hall effect sensor. The electronic device 100 may detect opening or closing of a flip leather case by using the magnetic sensor 180D. In some embodiments, when the electronic device 100 is a flip phone, the electronic device 100 may detect opening or closing of a flip cover based on the magnetic sensor 180D, and further set features such as automatic unlocking of the flip cover based on a detected opening or closing state of the leather case and a detected opening or closing state of the flip cover.

The acceleration sensor 180E may detect magnitudes of acceleration in various directions (usually on three axes) of the electronic device 100, and may detect a magnitude and a direction of gravity when the electronic device 100 is still. The acceleration sensor 180E may be further configured to recognize a posture of the electronic device 100, and is applied to switching between a landscape mode and a portrait mode, a pedometer, or another application.

The distance sensor 180F is configured to measure a distance. The electronic device 100 may measure a distance by using infrared or laser. In some embodiments, in a photographing scenario, the electronic device 100 may measure a distance by using the distance sensor 180F, to implement fast focusing.

The optical proximity sensor 180G may include, for example, a light-emitting diode (LED) and an optical detector such as a photodiode. The light-emitting diode may be an infrared light-emitting diode. The electronic device 100 emits infrared light to the outside by using the light-emitting diode. The electronic device 100 uses the photodiode to detect reflected infrared light from a nearby object. When abundant reflected light is detected, it may be determined that an object exists near the electronic device 100. When insufficient reflected light is detected, the electronic device 100 may determine that no object exists near the electronic device 100. The electronic device 100 may detect, by using the optical proximity sensor 180G, that the user holds the electronic device 100 close to an ear for a call, to implement automatic screen-off to save power. The optical proximity sensor 180G may alternatively be used in a leather case mode or a pocket mode to automatically unlock or lock a screen.

The ambient light sensor 180L is configured to sense luminance of ambient light. The electronic device 100 may adaptively adjust luminance of the display screen 194 based on the sensed luminance of the ambient light. The ambient light sensor 180L may also be configured to automatically adjust white balance during photographing. The ambient light sensor 180L may further cooperate with the optical proximity sensor 180G to detect whether the electronic device 100 is in a pocket to prevent accidental touch.

The fingerprint sensor 180H is configured to collect a fingerprint. The electronic device 100 may implement fingerprint unlocking, application lock accessing, fingerprint-based photographing, fingerprint-based call answering, and the like by using a feature of the collected fingerprint.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 degrades performance of a processor located near the temperature sensor 180J, to reduce power consumption and implement thermal protection. In some other embodiments, when the temperature is less than another threshold, the electronic device 100 heats the battery 142, to prevent the electronic device 100 from being abnormally powered off due to the low temperature. In some other embodiments, when the temperature is less than still another threshold, the electronic device 100 boosts an output voltage of the battery 142, to avoid abnormal power-off caused by the low temperature.

The touch sensor 180K is also referred as a "touch component". The touch sensor 180K may be disposed on the display screen 194. The touch sensor 180K and the display screen 194 constitute a touchscreen, also referred to as a "touch control screen". The touch sensor 180K is configured to detect a touch operation performed on or near the touch sensor 180K. The touch sensor may transmit the detected touch operation to the application processor, to determine a type of a touch event. Visual output related to the touch operation may be provided by using the display screen 194. In some other embodiments, the touch sensor 180K may alternatively be disposed on a surface of the electronic device 100, and is at a location different from that of the display screen 194.

In this embodiment of this application, the touch sensor 180K may detect a sliding operation, a touch/tapping operation, or the like that is input by the user and that is performed on the display screen, and then report the data to the processor 110. The processor may invoke corresponding software and hardware modules based on the operation input by the user, to perform a time corresponding to the operation. For example, as described in the following UI embodiments, the touch sensor 180K may detect a rightward sliding operation that is input by the user and that is performed on a bottom Bar 401 in a third interface of a third application on the display screen. In response to the operation, the processor 110 may invoke the display screen to switch the third interface of the third application to a second interface of a second application for display.

The touch sensor 180K may further detect another operation input by the user. For details, refer to descriptions of the following method embodiments and UI implementation. Details are not described herein.

The bone conduction sensor 180M may obtain a vibration signal. In some embodiments, the bone conduction sensor 180M may obtain a vibration signal of a vibration bone in a human vocal-cord part. The bone conduction sensor 180M may also be in contact with a human pulse to receive a blood pressure pulse signal. In some embodiments, the bone conduction sensor 180M may alternatively be disposed in a headset, to form a bone conduction headset in combination with the headset. The audio module 170 may obtain a speech signal through parsing based on the vibration signal that is of the vibration bone in the vocal-cord part and that is obtained by the bone conduction sensor 180M, to implement a speech function. The application processor may parse heart rate information based on the blood pressure pulse signal obtained by the bone conduction sensor 180M, to implement a heart rate detection function.

The key 190 includes a power on/off key, a volume key, and the like. The key 190 may be a mechanical key, or may be a touch key. The electronic device 100 may receive key input and generate key signal input related to user settings and function control of the electronic device 100.

The motor 191 may generate a vibration prompt. The motor 191 may be configured to provide a vibration prompt for an incoming call, and may also be configured to provide vibration feedback for touch. For example, touch operations performed on different applications (for example, photographing and audio playing) may correspond to different vibration feedback effects. The motor 191 may also correspond to different vibration feedback effects when touch operations are performed on different regions of the display screen 194. Different application scenarios (for example, a time reminder, information receiving, an alarm clock, and a game) may also correspond to different vibration feedback effects. A touch vibration feedback effect may be further customized.

The indicator 192 may be an indicator light, may be configured to indicate a charging status or a power change, and may be further configured to indicate a message, a missed incoming call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support 1 or N SIM card interfaces, where N is a positive integer greater than 1. The SIM card interface 195 may support a Nano SIM card, a Micro SIM card, a SIM card, or the like. A plurality of cards may be simultaneously inserted into a same SIM card interface 195. The plurality of cards may be of a same type or different types. The SIM card interface 195 may also be compatible with SIM cards of different types. The SIM card interface 195 may be further compatible with the external memory card. The electronic device 100 interacts with a network by using the SIM card, to implement functions such as a call and data communication. In some embodiments, the electronic device 100 uses an eSIM, that is, an embedded SIM card. The eSIM card may be embedded in the electronic device 100 and cannot be separated from the electronic device 100.

A software system of the electronic device 100 may use a layered architecture, an event-driven architecture, a microkernel architecture, a microservice architecture, or a cloud architecture. In this embodiment of the present disclosure, an Android system with a layered architecture is used as an example to describe a software structure of the electronic device 100.

Figure 2B:
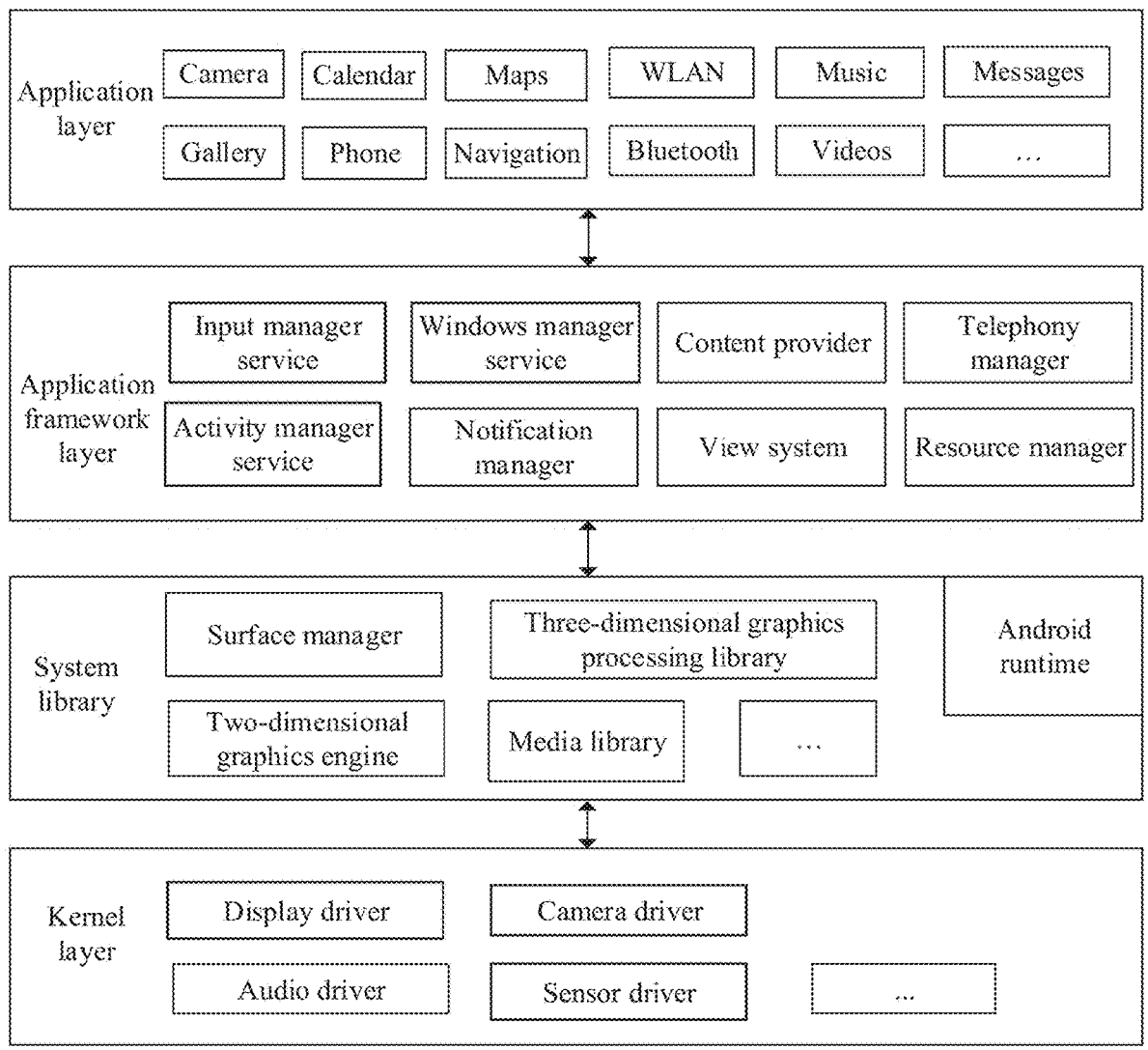
FIG. 2B is a schematic diagram of a software architecture of an electronic device 100 according to an embodiment of this application.

FIG. 2B is a block diagram of a software structure of the electronic device 100 according to an embodiment of the present disclosure.

The layered architecture divides software into several layers, and each layer has a clear role and task. The layers communicate with each other through software interfaces. In some embodiments, the Android system is divided into four layers, which are a program application layer, an application framework layer, an Android runtime and system library, and a kernel layer from top to bottom.

The application layer may include a series of application packages.

As shown in FIG. 2B, the application packages may include applications such as Camera, Gallery, Calendar, Phone, Maps, Navigation, WLAN, Bluetooth, Music, Videos, and Messages.

The application framework layer provides an application programming interface (API) and a programming framework for an application at the application layer. The application framework layer includes some predefined functions.

As shown in FIG. 2B, the application framework layer may include an input manager service (IMS), an activity manager service (Activity, AMS), a windows manager service (WMS), a content provider, a view system, a telephony manager, a resource manager, a notification manager, and the like.

The IMS may be configured to receive an operation that is input by a user and that is sent by an input/output driver.

The AMS may be invoked by an upper-layer application, for example, a first application or a second application, to open a corresponding activity, for example, open a first interface of the first application or a second interface of the second application.

The WMS is configured to manage a window program. The windows manager service may obtain a size of the display screen. For example, display is performed in full screen, or display is performed in a floating window. The windows manager service further determines whether there is a status bar, locks a screen, takes a screenshot, and the like.

The content provider is configured to store and obtain data, and enable the data to be accessible by an application. The data may include videos, images, audio, calls that are made and answered, browsing histories and bookmarks, a phone book, and the like.

The view system includes visual controls, for example, a control for displaying a text and a control for displaying a picture. The view system may be configured to build an application. A display interface may include one or more views. For example, a display interface including an SMS notification icon may include a view for displaying a text and a view for displaying a picture.

The telephony manager is configured to provide a communication function of the electronic device 100, for example, call status management (including answering, hanging up, or the like).

The resource manager provides various resources for an application, for example, a localized string, an icon, a picture, a layout file, and a video file.

The notification manager enables an application to display notification information in the status bar, and may be configured to convey a message of a notification type, where the displayed notification information may automatically disappear after a short stay without user interaction. For example, the notification manager is configured to notify download completion, provide a message reminder, and the like. The notification manager may alternatively be a notification that appears in a top status bar of the system in a form of a graph or a scroll bar text, for example, a notification of an application running in the background or a notification that appears on a screen in a form of a dialog window. For example, text information is prompted in the status bar, a prompt tone is made, the electronic device 100 vibrates, or an indicator light flashes.

The Android Runtime includes a kernel library and a virtual machine. The Android runtime is responsible for scheduling and management of the Android system.

The kernel library includes two parts: a functional function that needs to be invoked by a java language, and a kernel library of Android.

The application layer and the application framework layer run on the virtual machine. The virtual machine executes java files at the application layer and the application framework layer as binary files. The virtual machine is configured to perform functions such as object lifecycle management, stack management, thread management, security and exception management, and garbage collection.

The system library may include a plurality of functional modules, for example, a surface manager, a media library (Media Libraries), a three-dimensional graphics processing library (for example, an OpenGL ES), and a 2D graphics engine (for example, an SGL).

The surface manager is configured to manage a display subsystem, and provide 2D and 3D layer fusion for a plurality of applications.

The media library supports playback and recording in a plurality of common audio and video formats, static image files, and the like. The media library may support a plurality of audio and video coding formats such as MPEG 4, H.264, MP3, AAC, AMR, JPG, and PNG.

The three-dimensional graphics processing library is configured to implement three-dimensional graphics drawing, image rendering and composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes example working procedures of software and hardware of the electronic device 100 with reference to a capturing and photographing scenario.

When the touch sensor 180K receives a touch operation, a corresponding hardware interrupt is sent to the kernel layer. The kernel layer processes the touch operation into an original input event (including touch coordinates, a timestamp of the touch operation, and other information). The original input event is stored at the kernel layer. The application framework layer obtains the original input event from the kernel layer, and identifies a control corresponding to the input event. For example, the touch operation is a touch tapping operation, and a control corresponding to the tapping operation is a control of a camera application icon. A camera application invokes an interface of the application framework layer to start the camera application, so that the kernel layer is invoked to start the camera driver, and the camera 193 captures a still image or a video.

FIG. 3A-FIG. 3F show examples of a series of user interfaces related to a side bar according to an embodiment of this application.

In this embodiment of this application, the side bar may be further referred to as a "side bar", an "application navigation bar", or the like. The side bar may be displayed at a location on a right side, a left side, or the like of a display screen of the electronic device.

Figure 3A:
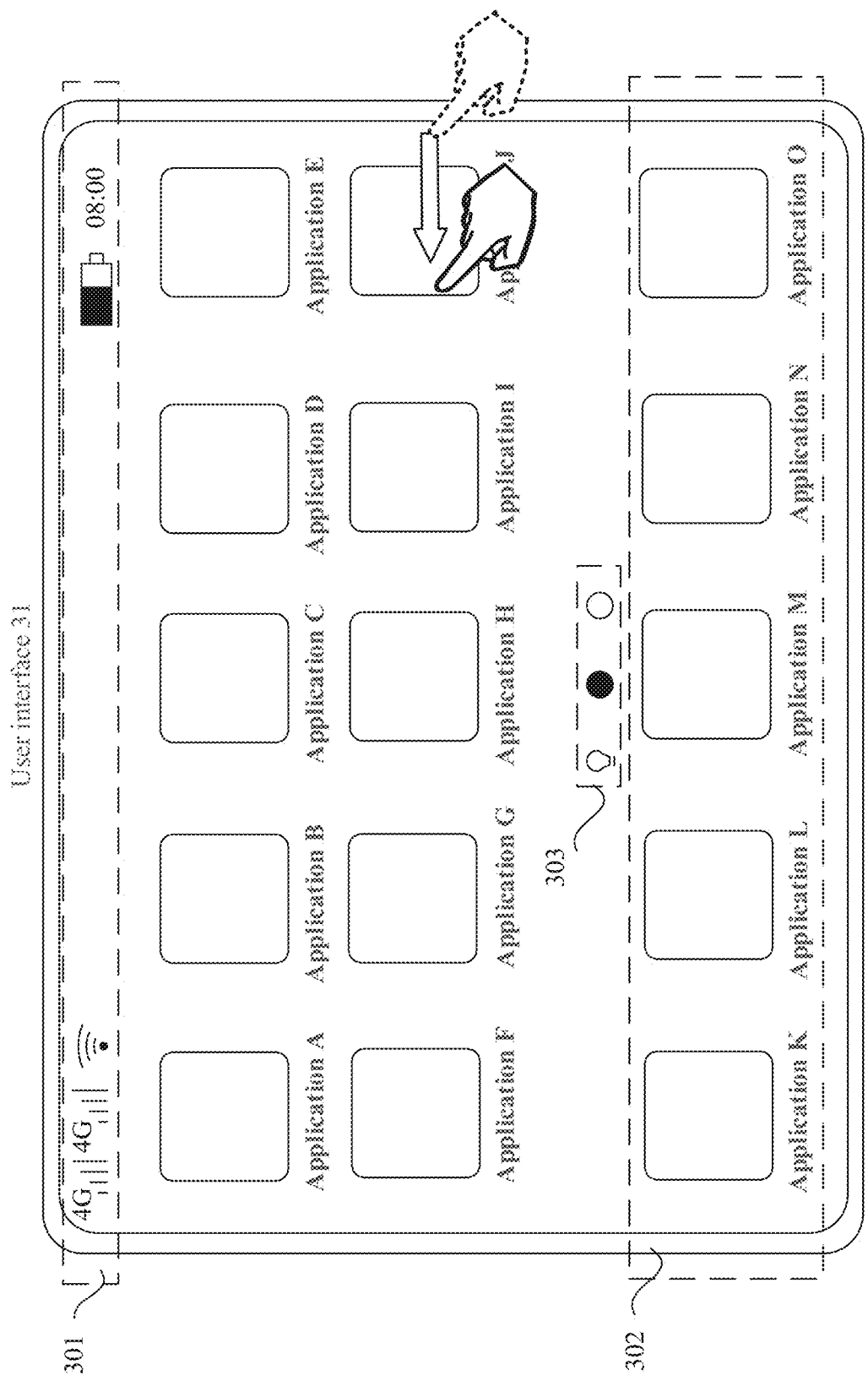
FIG. 3A-FIG. 3N are schematic diagrams of another group of user interfaces according to an embodiment of this application.
Figure 3B:
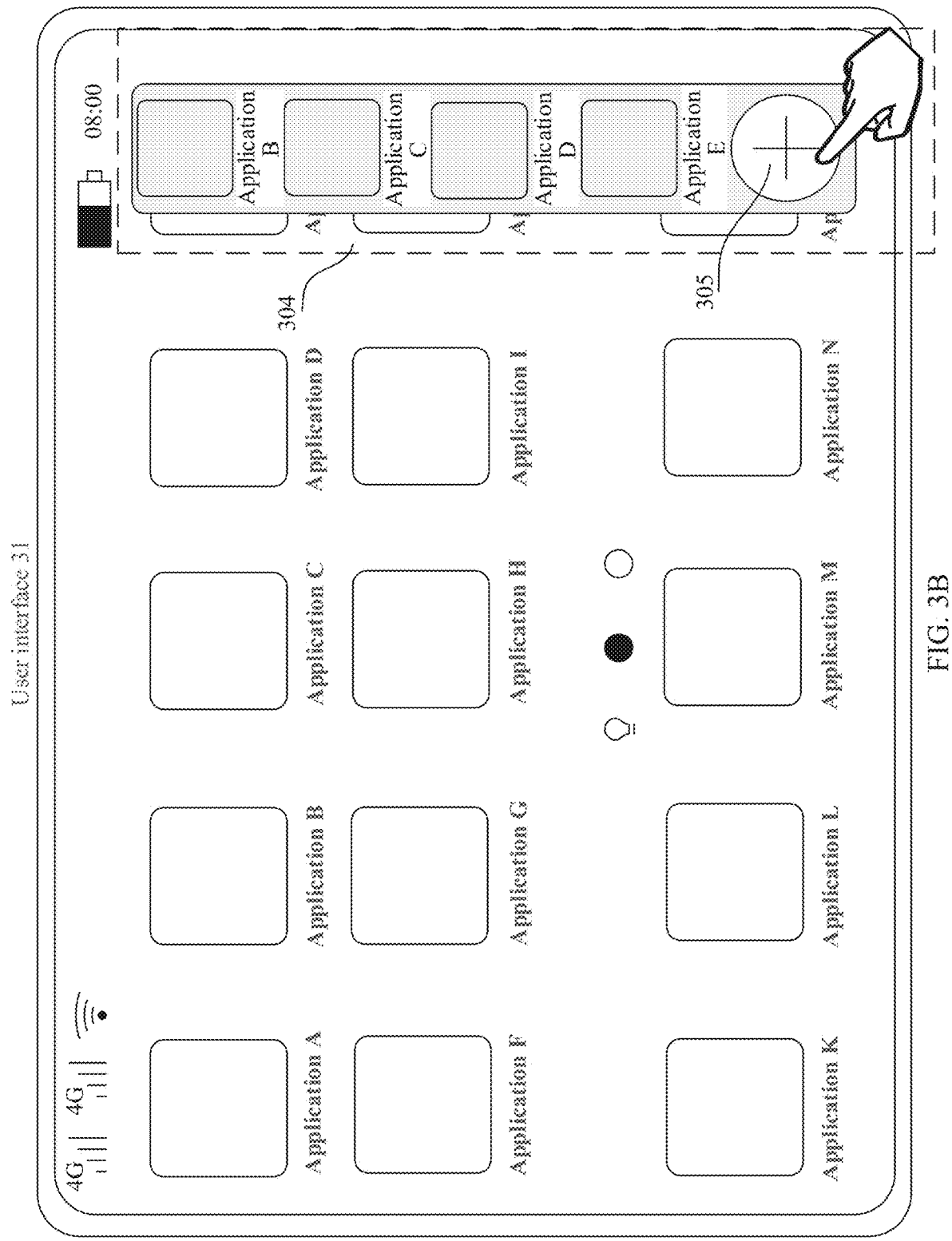

FIG. 3A-FIG. 3B show an example implementation in which the electronic device invokes a side bar.

FIG. 3A shows an example home screen displayed by the electronic device 100.

As shown in FIG. 3A, a user interface 31 displays a status bar 301, a tray 302 with icons of frequently used applications, an interface indicator 303, and other application icons.

The status bar 301 may include one or more signal strength indicators of a mobile communication signal (which may also be referred to as a cellular signal), one or more signal strength indicators of a wireless fidelity (Wi-Fi) signal, a battery status indicator, a time indicator, and the like.

The tray 302 with icons of frequently used applications may display icons of one or more applications.

The other application icons may be, for example, an icon of an application A, an icon of an application B, and an icon of an application C.

The user interface 31 may further include a page indicator. The other application icons may be distributed on a plurality of pages. The page indicator may be used to indicate a page in which an application is currently browsed by a user. The user may slide a region of the other application icons leftward or rightward to browse application icons in other pages.

The electronic device 100 may detect, in the user interface 31 shown in FIG. 3A, an operation of sliding from a right edge of the screen to an inner side of the screen. In response to the operation, the electronic device 100 may display a user interface of a side bar 304 shown in FIG. 3B.

As shown in FIG. 3B, the electronic device 100 displays the side bar 304 in the user interface 31, and the side bar 304 displays a series of application icons, for example, the icon of the application B, the icon of the application C, an icon of an application D, an icon of an application E, and a more control 305. The application icons displayed in the side bar 304 may be one or more application icons preset by the electronic device 100 by default, or may be one or more application icons that are user-defined based on an editing operation of the user.

A manner of triggering the electronic device 100 to invoke the side bar is not limited to the foregoing operation manner of sliding from the right edge of the screen to the inner side of the screen, and may be another manner. For example, the electronic device 100 may be triggered in an operation manner of sliding from a left edge of the screen to the inner side of the screen or an operation manner of inputting a voice instruction or shaking the electronic device 100 to invoke the side bar. Details are not described herein.

FIG. 3C-FIG. 3F show examples of a series of user interfaces displayed by the electronic device when a side bar is edited.

Figure 3C:
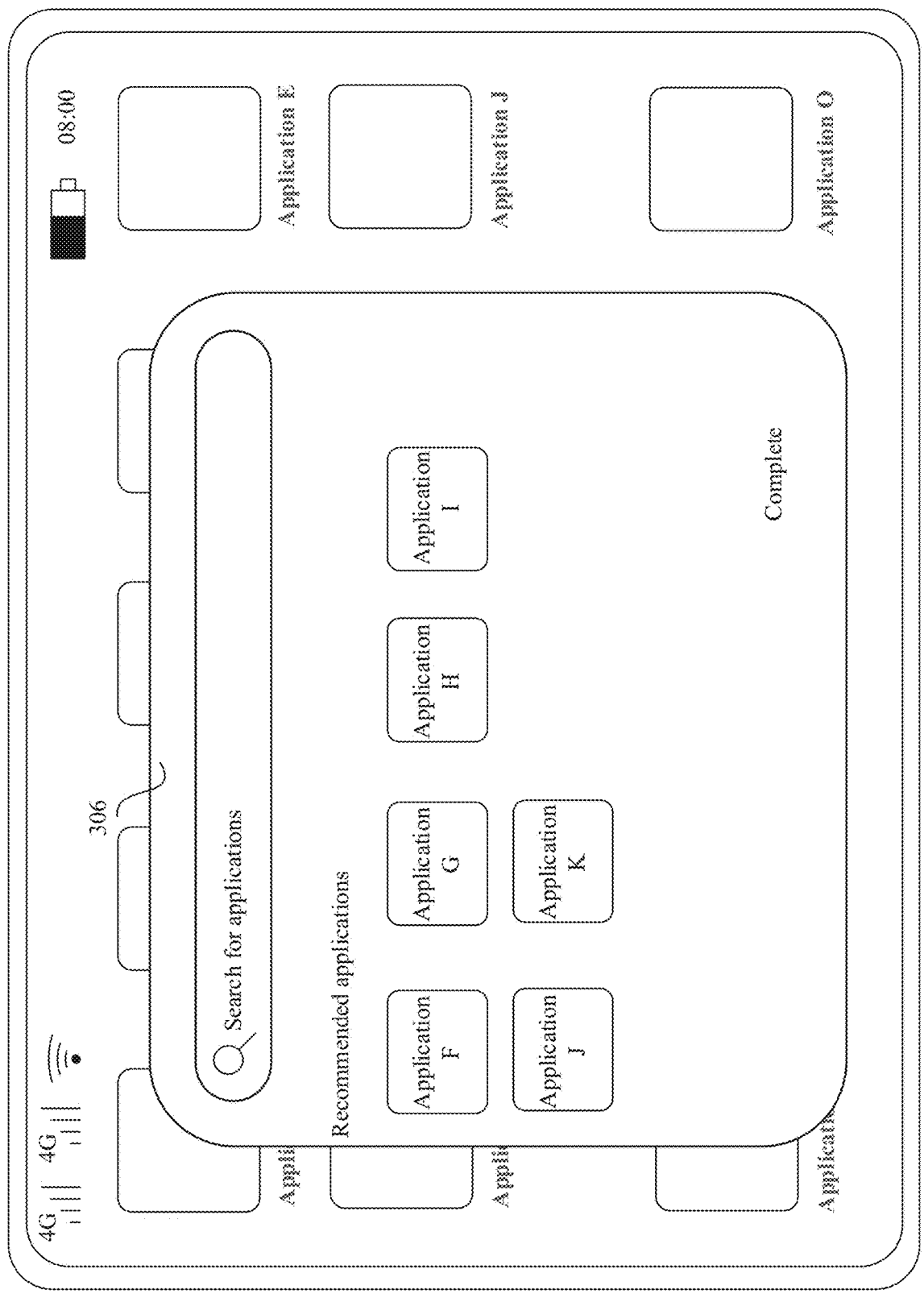

When the electronic device 100 detects an operation of tapping the add control 305 shown in FIG. 3B by the user, in response to the operation, the electronic device 100 may be a user interface shown in FIG. 3C.

As shown in FIG. 3C, the electronic device 100 displays a window 306, and the window 306 displays an application search bar, icons corresponding to one or more recommended applications, a complete control, and the like.

Figure 3D:
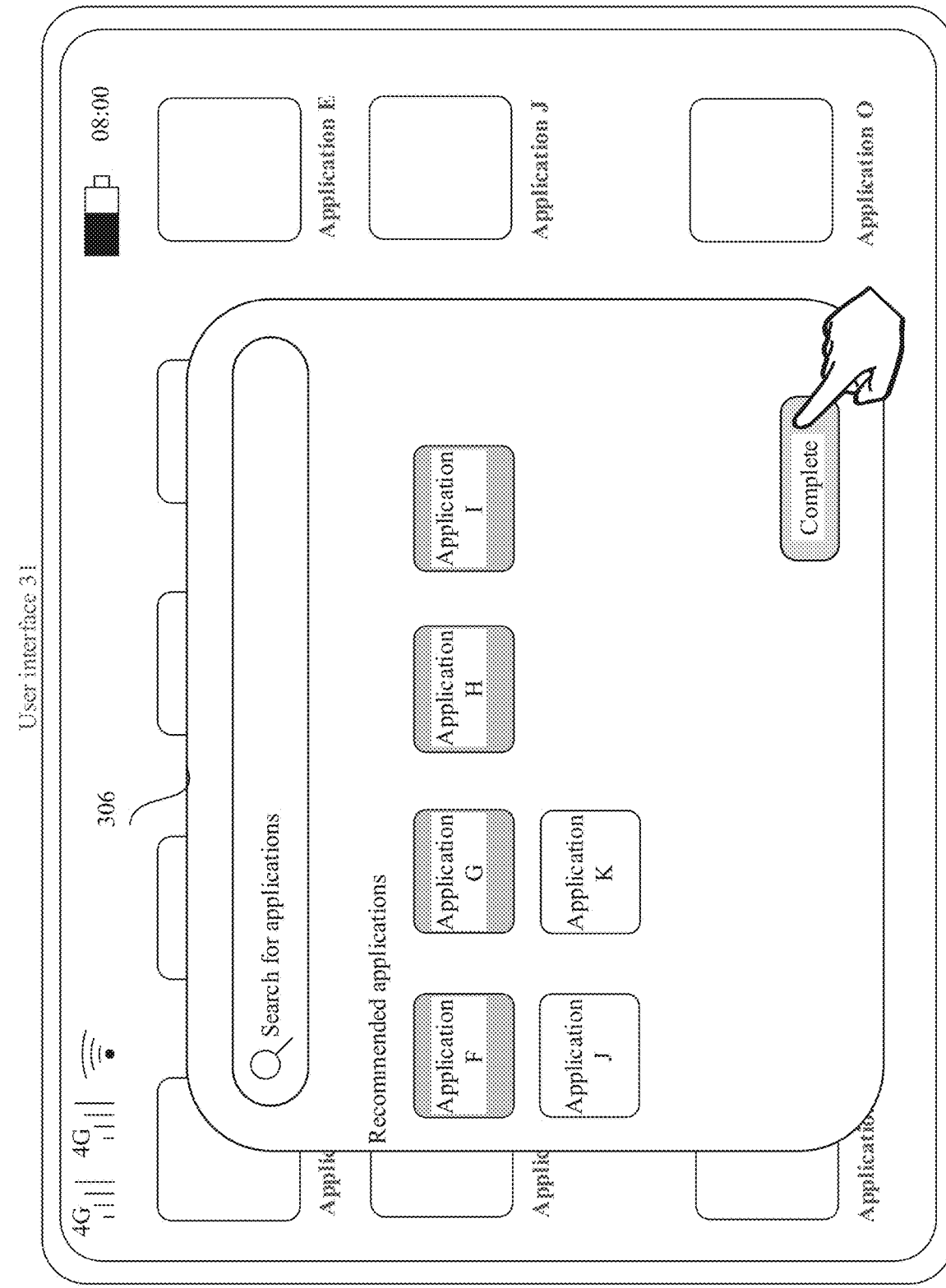

As shown in FIG. 3D, the electronic device 100 may detect an operation of first selecting an application icon in the window 306 and then tapping the complete control by the user. In response to the operation, the electronic device 100 may add the application icon selected by the user to the side bar. When the electronic device 100 detects that a quantity of application icons added to the side bar 304 is less than or equal to a first threshold, for example, 8, the electronic device 100 may display a side bar 304 shown in FIG. 3E.

Figure 3E:
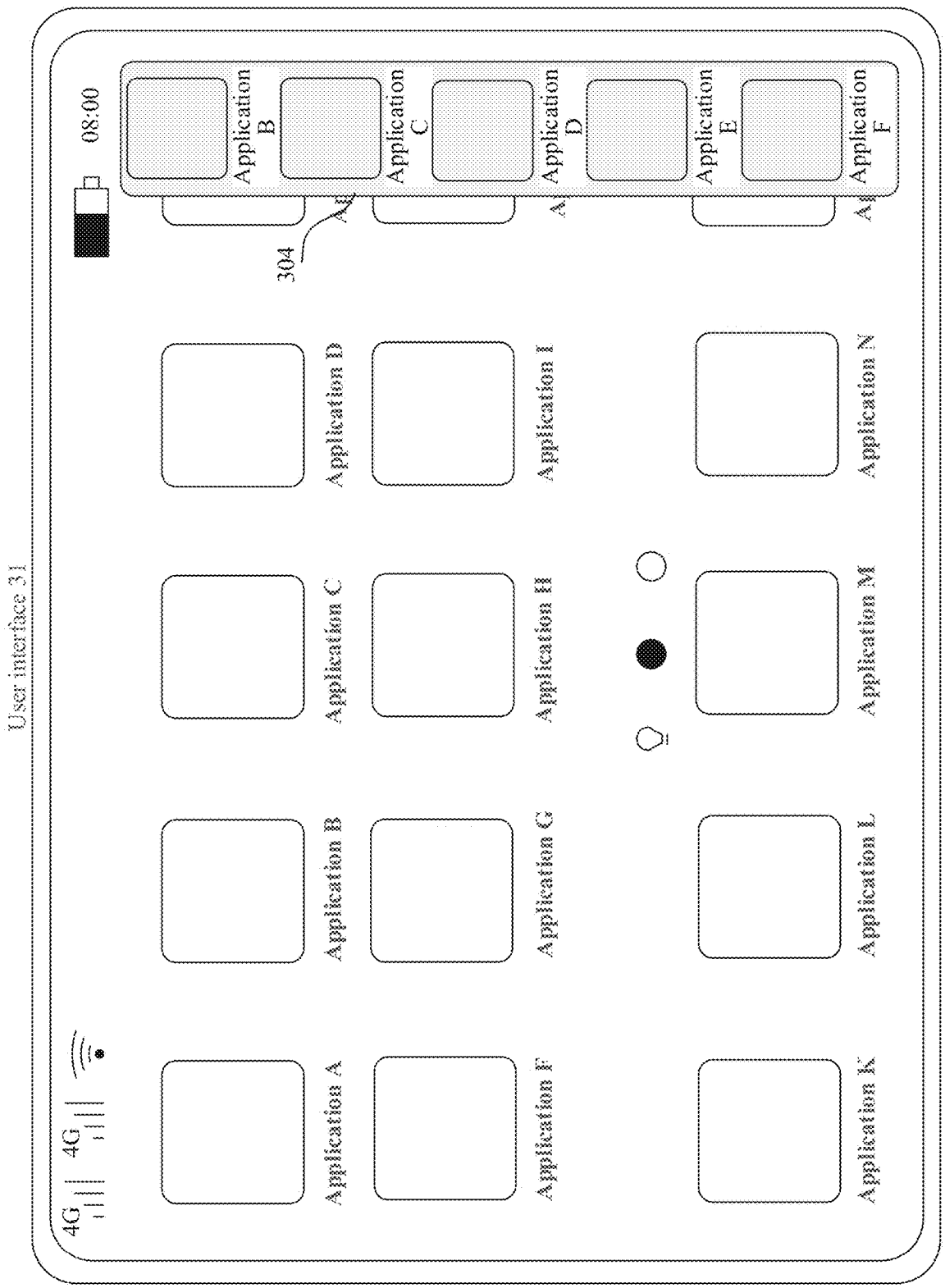

As shown in FIG. 3E, in this case, the side bar 304 may be referred to as a single-column side bar, in other words, one column of application icons are displayed in the side bar 304. It may be understood that when the electronic device 100 is displayed in a landscape mode, a maximum of five application icons can be displayed in the one column of application icons. When a quantity of the single column of application icons is greater than 5 and less than or equal to 8, the user may browse the application icons and the add control 305 by sliding a region of the single-column side bar upward or downward.

Figure 3F:
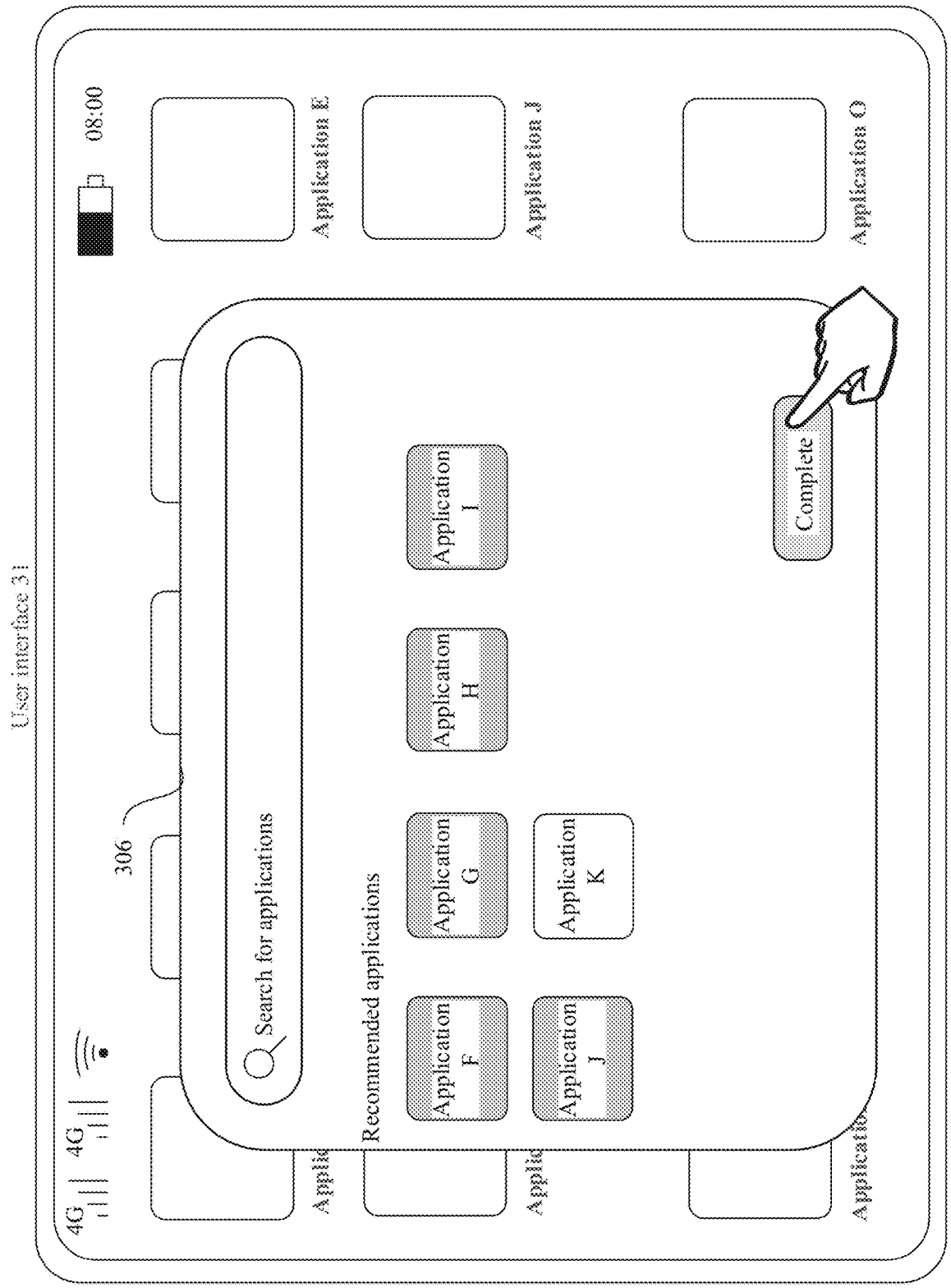

As shown in FIG. 3F, when the electronic device 100 detects that a quantity of application icons added to the side bar 304 exceeds a first threshold, for example, 8, the electronic device 100 may display a side bar 304 shown in FIG. 3F.

Figure 3G:
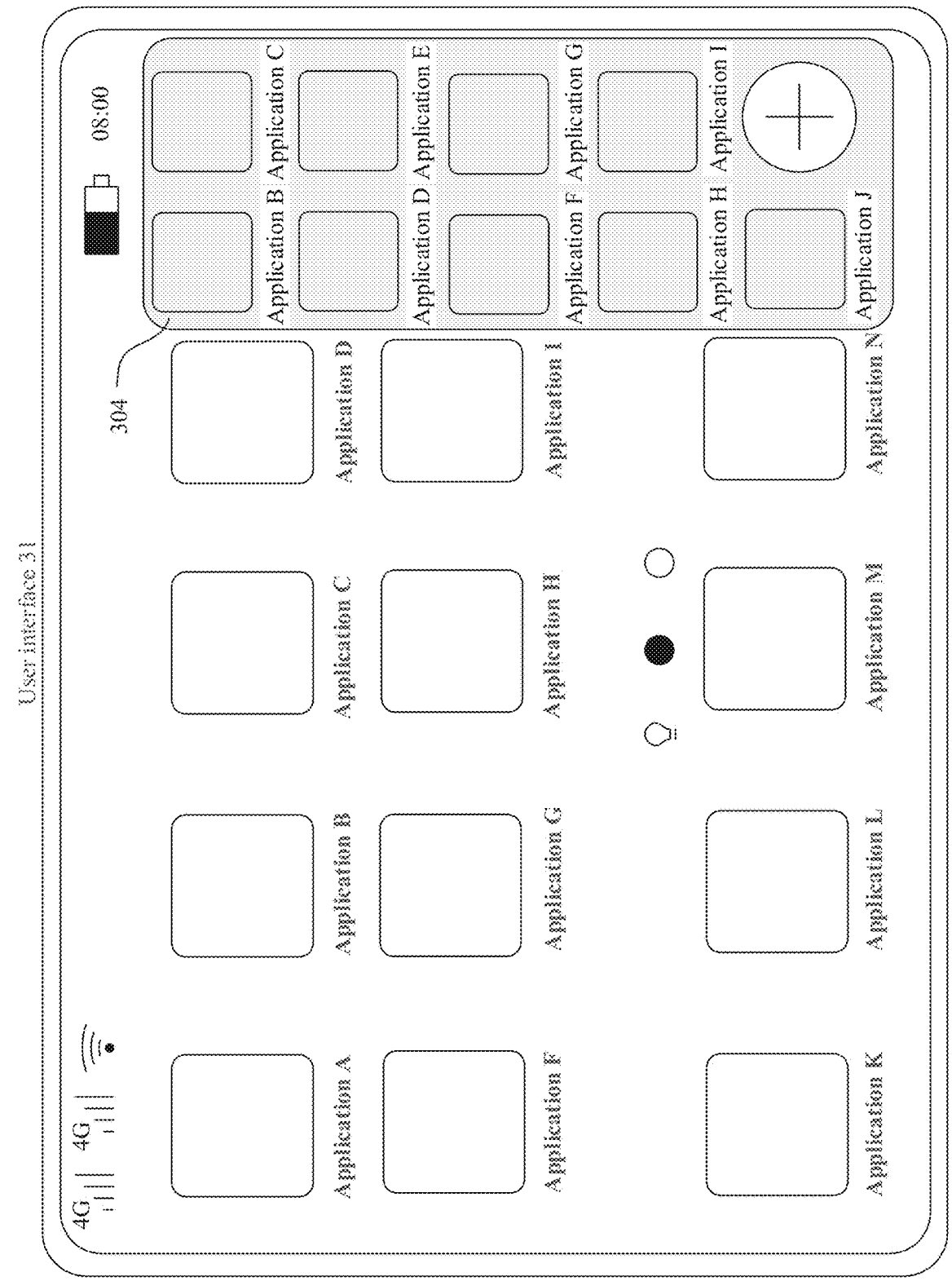

As shown in FIG. 3G, in this case, the side bar 304 may be referred to as a double-column side bar, in other words, two columns of application icons are displayed in the side bar 304. It may be understood that when the electronic device 100 is displayed in a landscape mode, still a maximum of five application icons can be displayed in each column of application icons. When a quantity of application icons in the double-column side bar is greater than 10 and less than or equal to a second threshold, for example, 15, the user may browse the application icons and the add control 30 by sliding a region of the single-column side bar upward or downward.

In this embodiment of this application, regardless of whether the electronic device 100 displays the single-column side bar or the double-column side bar, a maximum of 15 application icons can be added to and displayed in the side bar. When 15 application icons are added to the side bar, the side bar no longer displays the add control 305.

FIG. 3D-FIG. 3G show only example display forms of a side bar when the electronic device 100 is displayed in a landscape mode. When the electronic device 100 is displayed in a portrait mode, regardless of whether a quantity of applications added to the side bar exceeds the first threshold, for example, 5, the side bar displays only one column of application icons, and a quantity of the one column of application icons is greater than a quantity of one column of application icons in the landscape mode, for example, may be 8. When the quantity of application icons added to the side bar is greater than 8 and less than or equal to 15, the user may browse the application icons by sliding a region of the single-column side bar upward or downward.

Figure 3H:
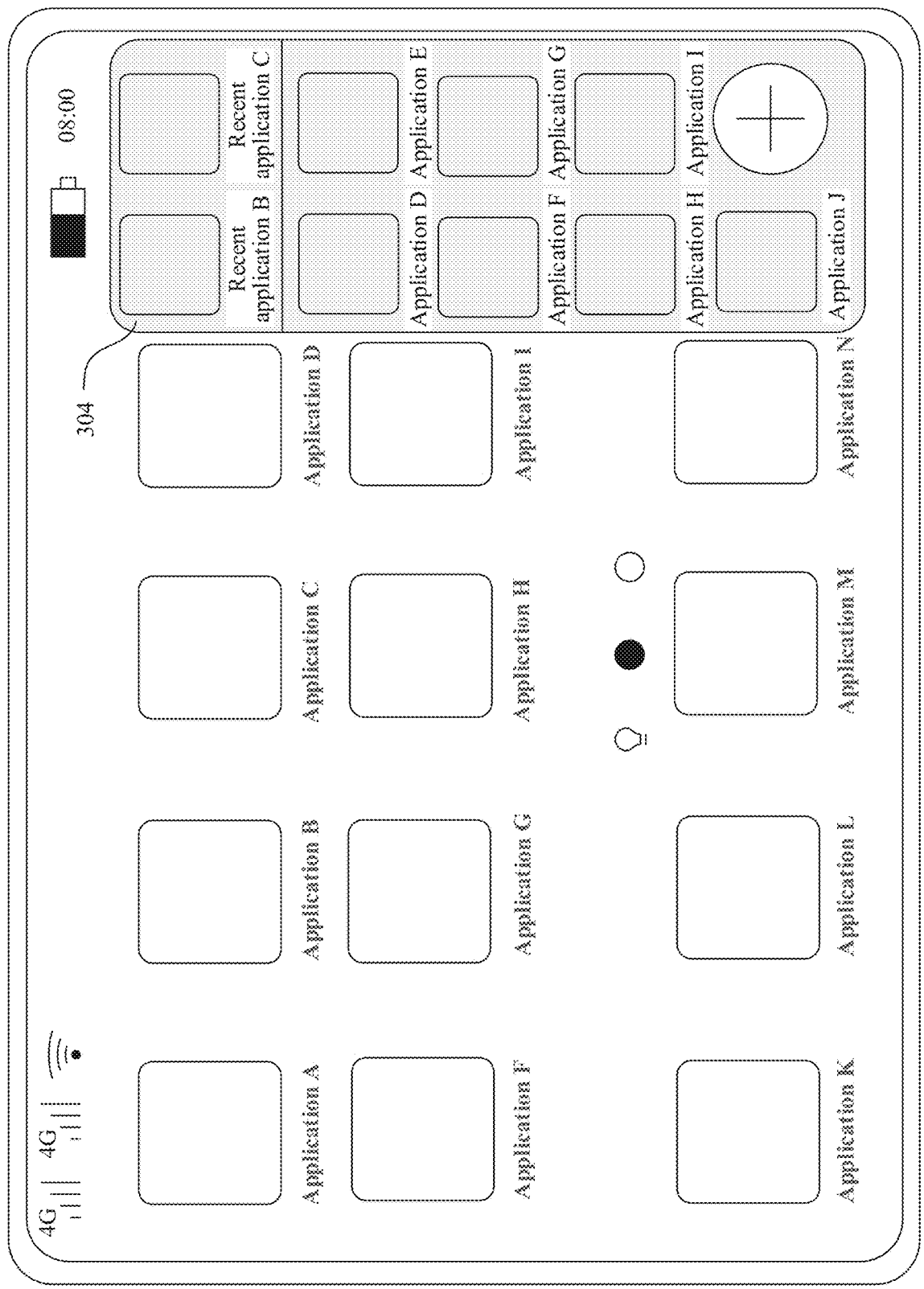

Optionally, when the electronic device detects that the quantity of application icons added by the user to the side bar is less than 2, the side bar does not display a recent application, and when the electronic device detects that the quantity of application icons added by the user to the side bar is greater than 2, the side bar displays recent applications, as shown in FIG. 3H.

As shown in FIG. 3H, when the electronic device displays a double-column side bar, a maximum of two recent application icons can be displayed. In addition, when the electronic device displays a single-column side bar, a maximum of one recent application icon can be displayed. In this embodiment of this application, an application corresponding to the recent application icon is an application that has been recently displayed in a floating state for a quantity of times that is greater than a threshold and/or an application that has been added, in a recent period of time, to the side bar for a quantity of times that is greater than a threshold.

In some embodiments of this application, regardless of whether the electronic device 100 displays the side bar in the landscape mode or displays the side bar in the portrait mode, the user may further perform, by inputting a touch and hold operation or tapping the add control 305, further editing operations on all application icons displayed in the side bar 304, for example, delete any application icon and adjust a display location of an application.

Figure 3I:
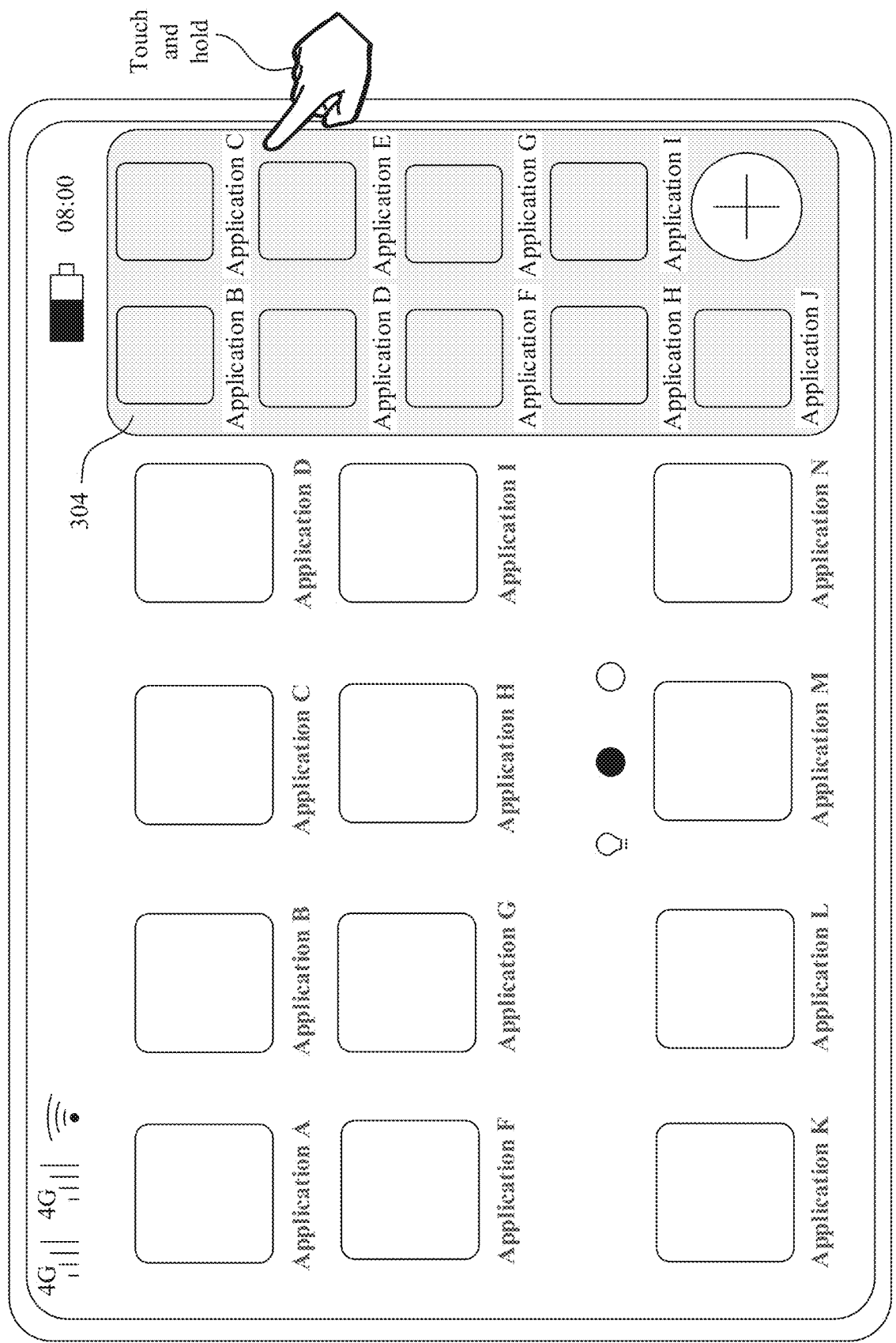
Figure 3J:
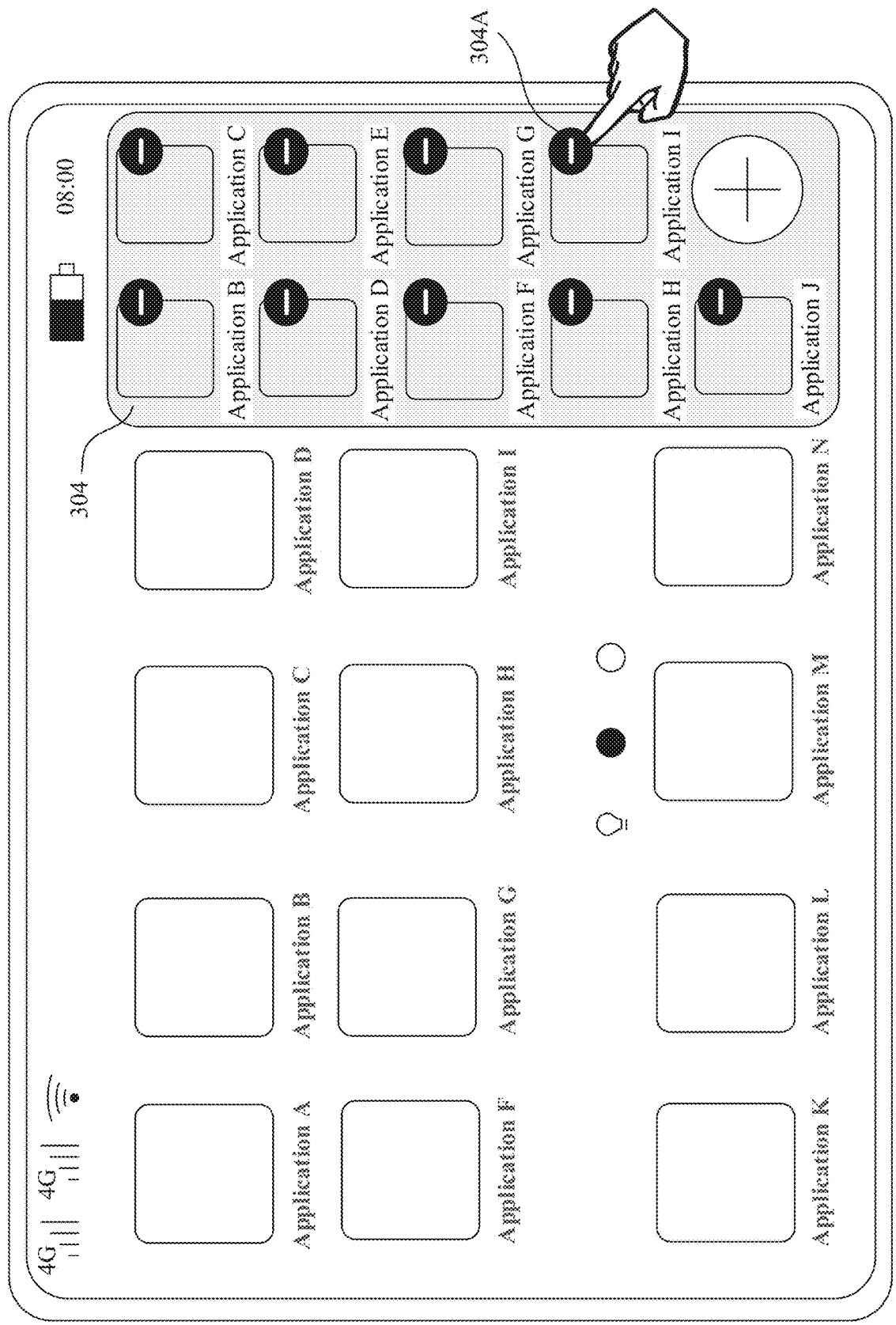
Figure 3K:
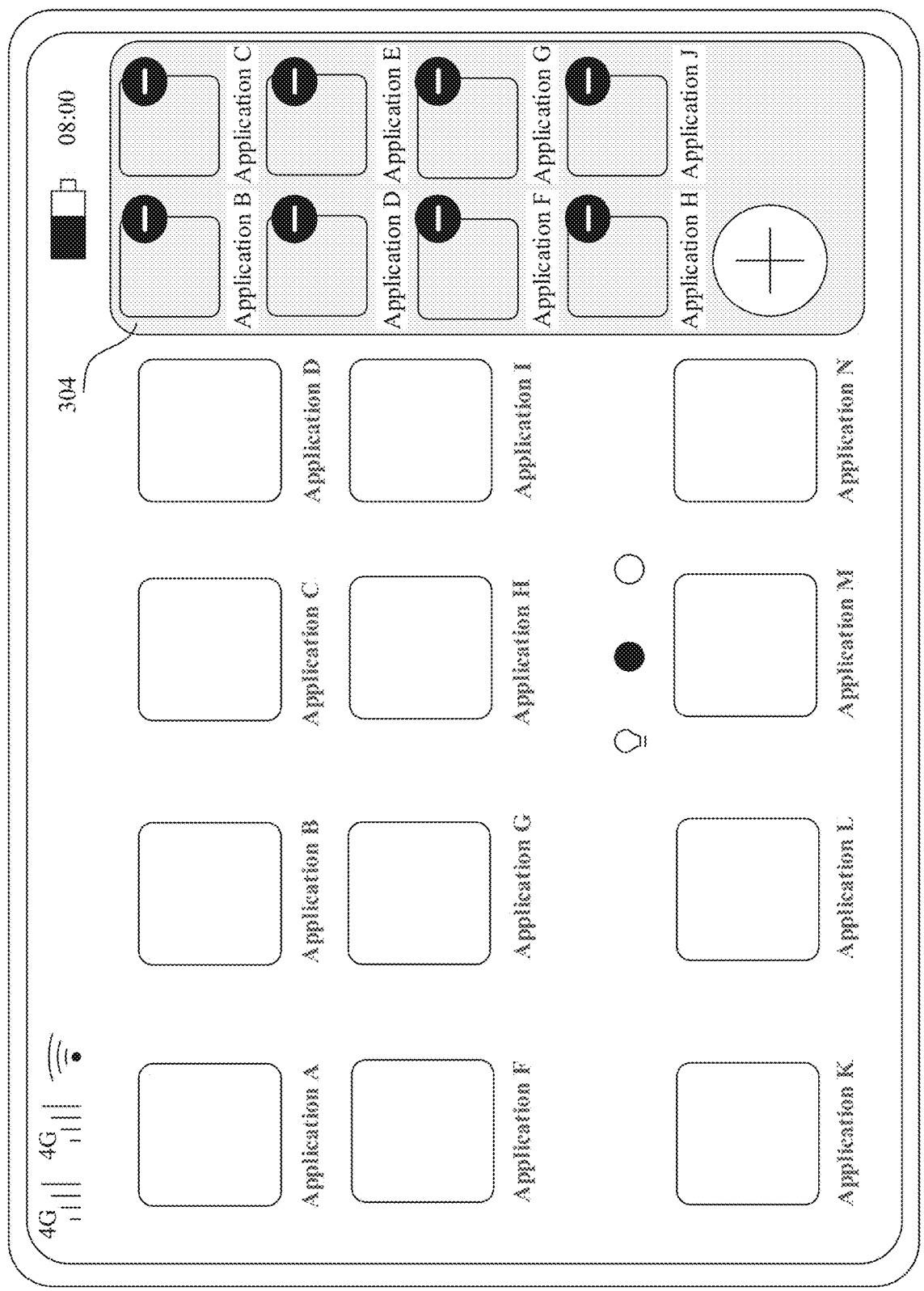

FIG. 3I-FIG. 3K show an example operation of deleting any application icon in a side bar.

As shown in FIG. 3I, the electronic device 100 may detect an operation of touching and holding the side bar 304 by the user. In response to the operation, the electronic device 100 controls the side bar 304 to be in an edit state, to display a user interface shown in FIG. 3J.

As shown in FIG. 3J, one delete icon 304A is correspondingly displayed in each application icon in the side bar 304 displayed by the electronic device 100. The electronic device may detect an operation of tapping 304A by the user. In response to the operation, the electronic device deletes an application icon corresponding to 304A from the side bar 304.

As shown in FIG. 3K, the side bar 304 of the electronic device 100 no longer displays an icon of an application I corresponding to 304A shown in FIG. 3J.

Figure 3L:
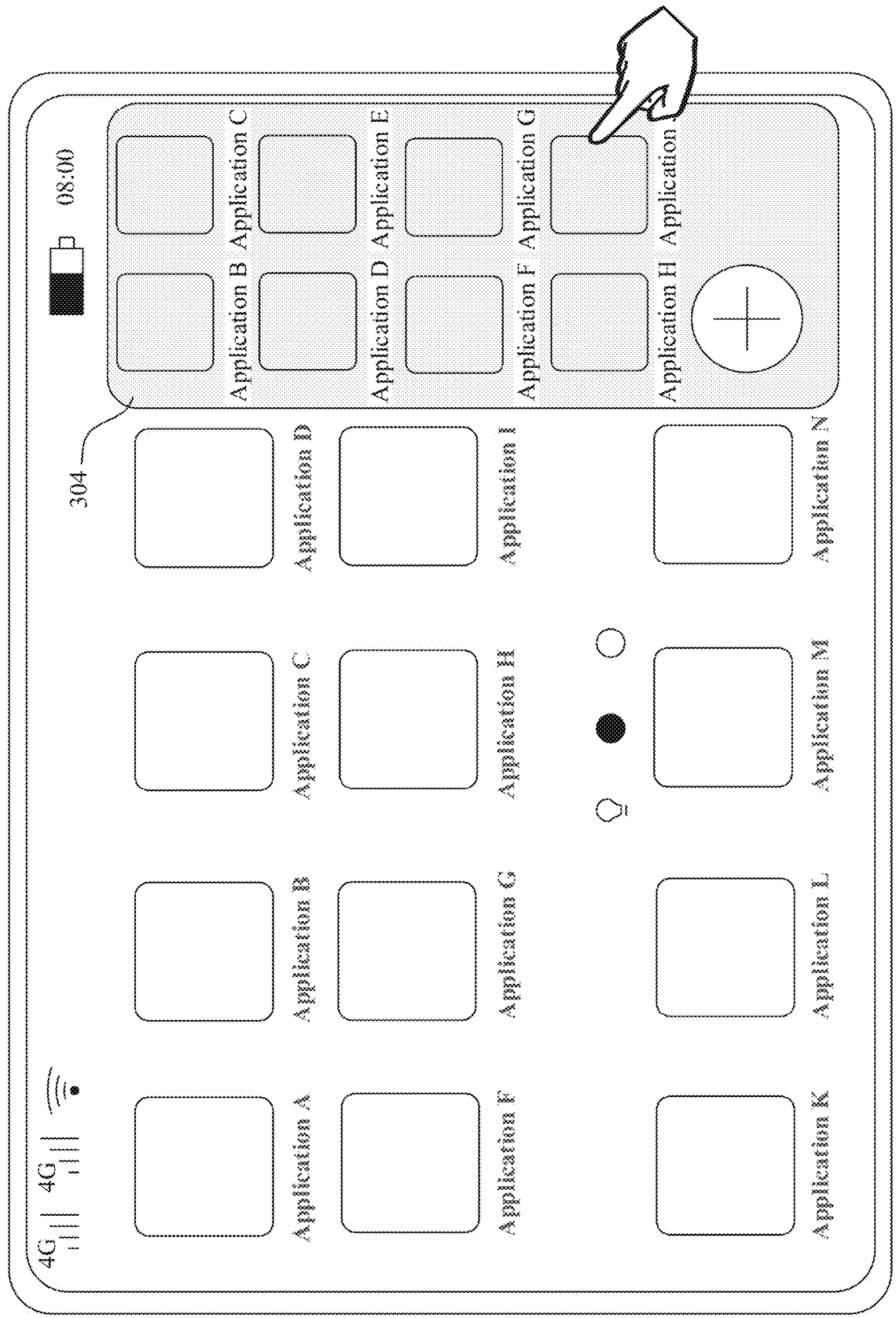
Figure 3M:
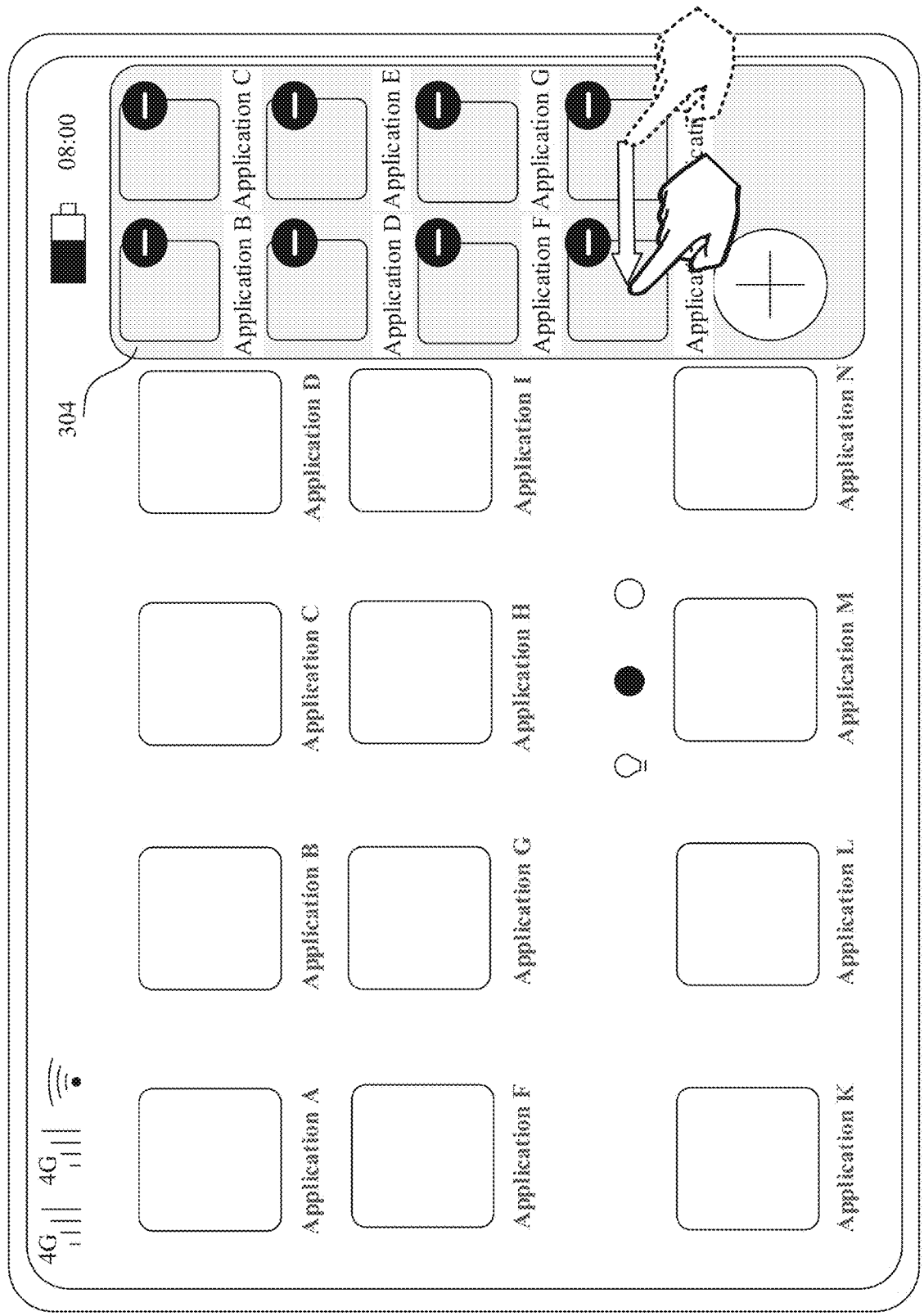
Figure 3N:
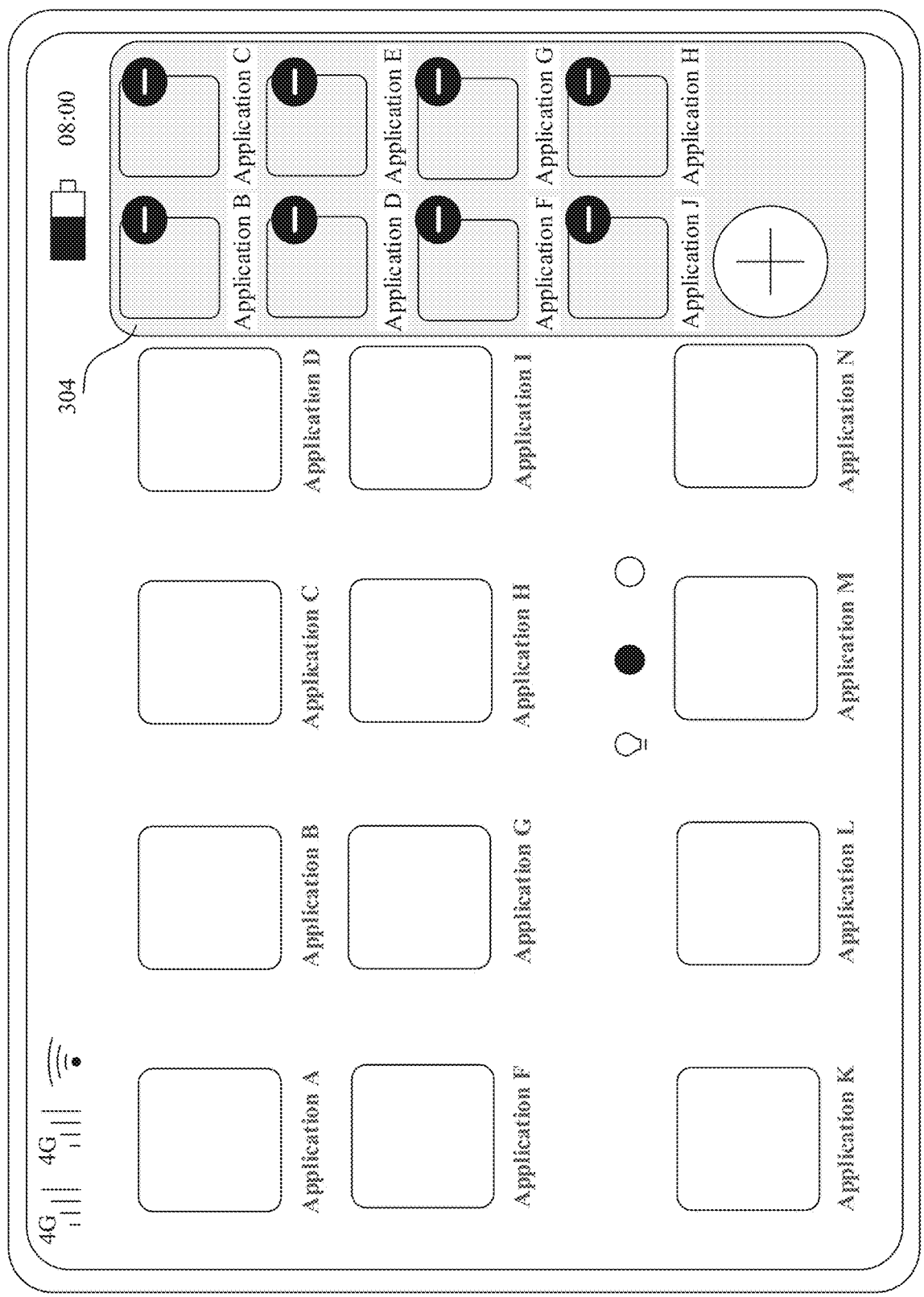

FIG. 3L-FIG. 3N show an example operation of deleting an icon of any application in a side bar.

As shown in FIG. 3L, the electronic device 100 may detect an operation of touching and holding any application icon in the side bar 304 or a blank region in the side bar 304 by the user. In response to the operation, the electronic device 100 controls the side bar 304 to be in an edit state, to display a user interface shown in FIG. 3M.

As shown in FIG. 3M, one delete icon 304A is correspondingly displayed in each application icon in the side bar 304 displayed by the electronic device 100. The electronic device may detect an operation of tapping an icon of an application J and dragging the icon of the application J to a target location, for example, a display location of an icon of an application H, by the user. In response to the operation, the electronic device adjusts a sequence of application icons in the side bar to a sequence shown in FIG. 3N.

It may be understood that the two operations shown in FIG. 3L and FIG. 3M may be a continuous operation, that is, an operation of touching and holding the icon of the application J without releasing a hand and then dragging the icon of the application J to the target location, for example, the display location of the icon of the application H, by the user.

As shown in FIG. 3N, a location of the icon of the application J in the electronic device 100 moves to a location of the icon of the application H in FIG. 3M, and the icon of the application H moves to a location of the icon of the application J in FIG. 3M for display. It can be learned that the user may move a display location of an application icon to a target location by performing a dragging operation, and then move an application icon at the target location and an application icon displayed after the target location backward by one display unit at a time.

FIG. 4A-FIG. 4D show example implementation methods in which the electronic device invokes a floating window from a side bar to display an application.

Specifically, the electronic device may receive a user operation performed on the side bar, and in response to the user operation, display a floating window provided by an application corresponding to an application icon selected by the user operation. In other words, the electronic device may display, in a form of a floating window, an interface provided by an application corresponding to an application icon.

In this embodiment of this application, the floating window is a window floating on a desktop of the electronic device. The desktop may be a home screen or another user interface of the electronic device, for example, an interface that is provided by an application and that is displayed in full screen. The floating window may be displayed in a transparent form or an opaque form. This is not limited in this embodiment of this application.

Figure 4A:
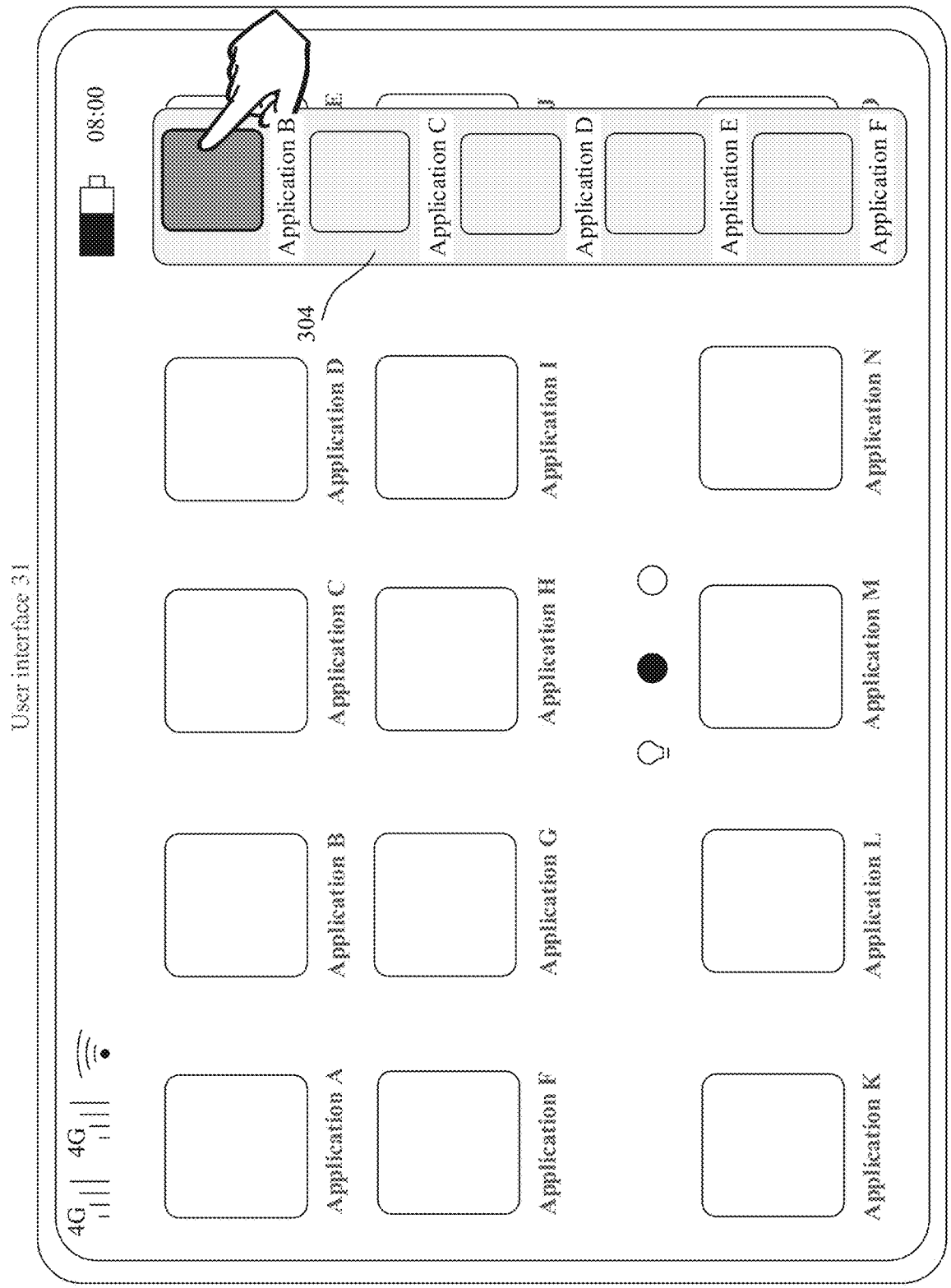
FIG. 4A-FIG. 4N are schematic diagrams of another group of user interfaces according to an embodiment of this application.
Figure 4B:
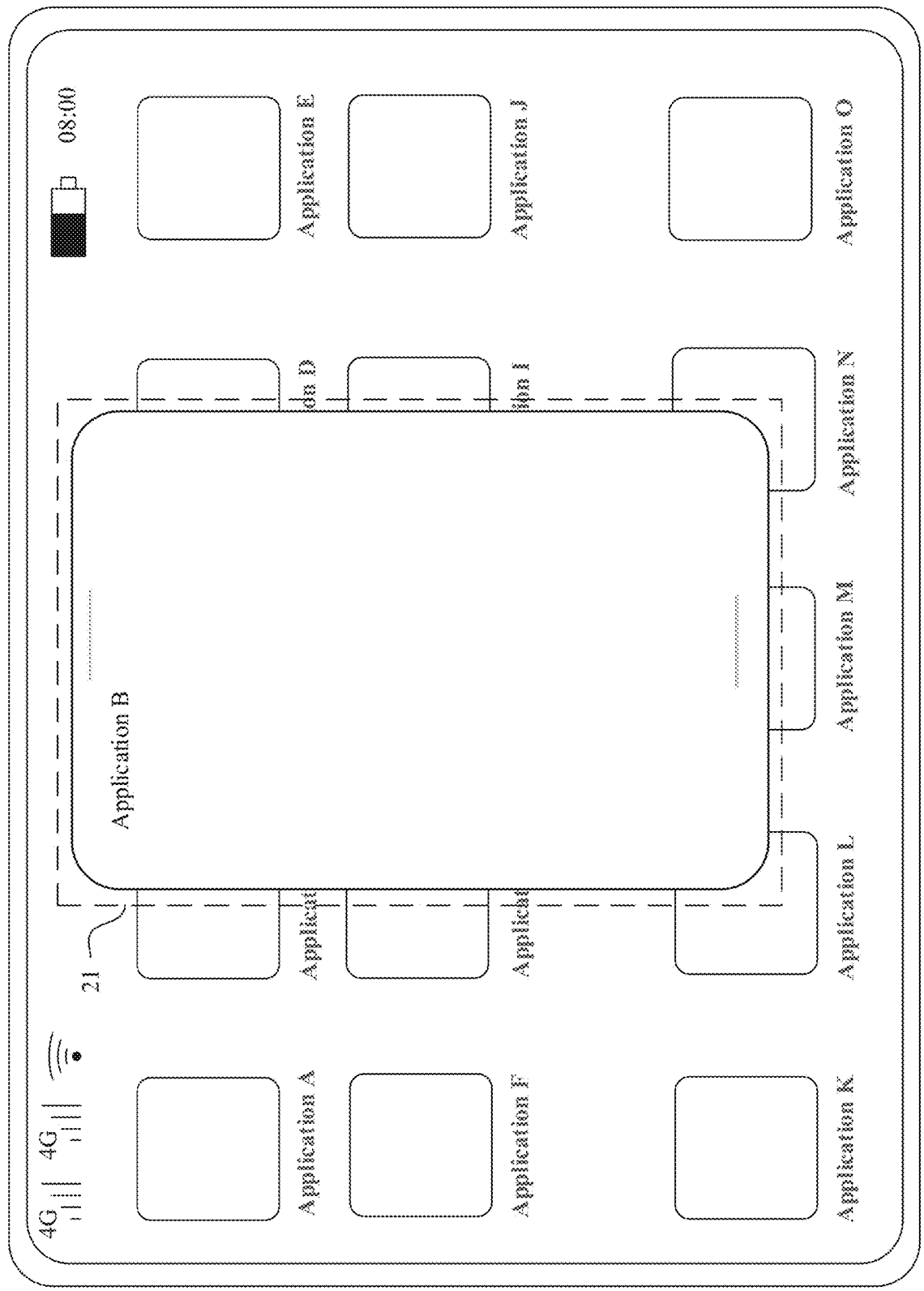

FIG. 4A-FIG. 4B show an example implementation method in which the electronic device invokes a floating window from a side bar to display an application.

As shown in FIG. 4A, the electronic device 100 may detect, in the side bar 304 shown in FIG. 4A, an operation performed on the icon of the application B. In response to the operation, the electronic device 100 may display a user interface shown in FIG. 4A.

As shown in FIG. 4B, the electronic device 100 displays an interface 21. The interface 21 is an interface provided by the application B. The interface 21 is displayed in an interface 11 in a form of a floating window.

Figure 4C:
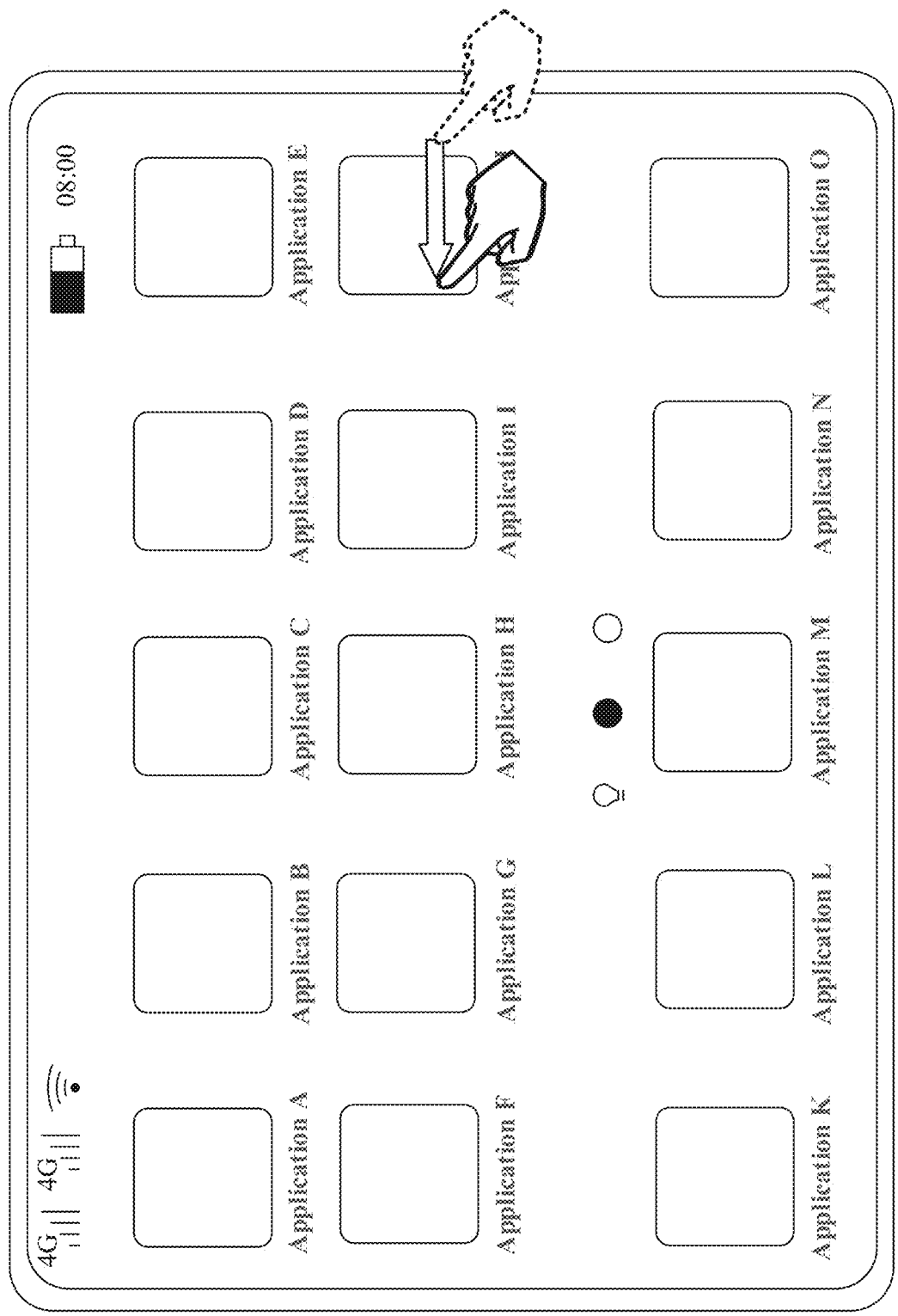
Figure 4D:
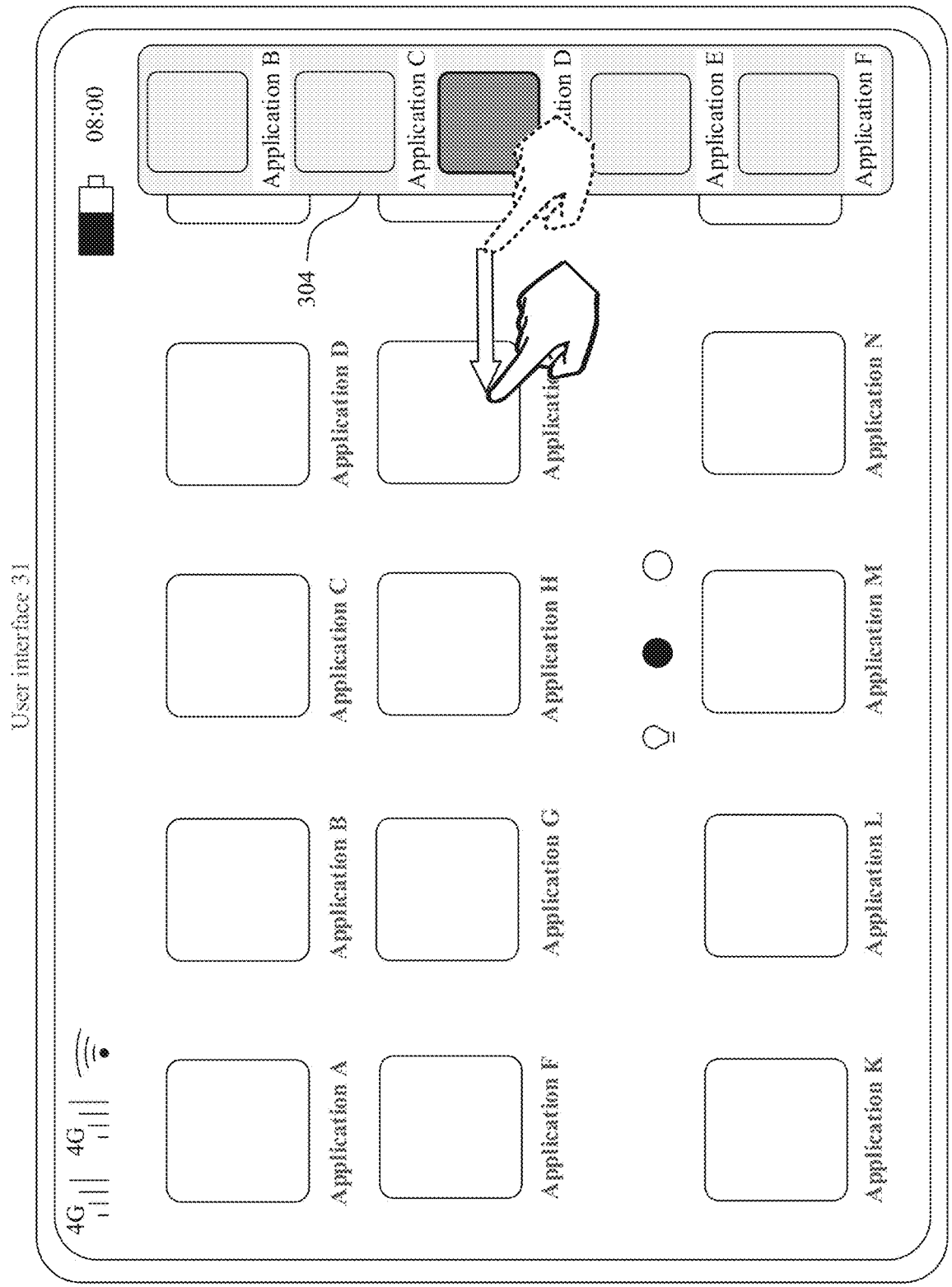

FIG. 4C-FIG. 4D show another example implementation method in which the electronic device invokes a floating window from a side bar to display an application.

As shown in FIG. 4C, the electronic device 100 may detect, in the user interface 31 shown in FIG. 4C, an operation of sliding from the right edge of the screen to the inner side of the screen, and in this case, the user still remains in a state of touching the display screen, in other words, a hand is not released after the user inputs the gesture operation of sliding from the right edge of the screen to the inner side of the screen. In response to the operation, the electronic device 100 may display a user interface shown in FIG. 4D.

As shown in FIG. 4D, in this case, the electronic device 100 displays the side bar 304, and an icon of an intermediate application, for example, the $3^{rd}$ application D, in the side bar 304 is selected by default, in other words, in this case, the icon of the application D is in a focused state.

In this case, the user may continue to input a sliding operation, for example, an upward/downward sliding operation, to control the electronic device 100 to select any application icon displayed in the side bar 304. In other words, the electronic device 100 may determine, based on the upward/downward sliding operation input by the user, that an application icon corresponding to the operation is selected.

Figure 4E:
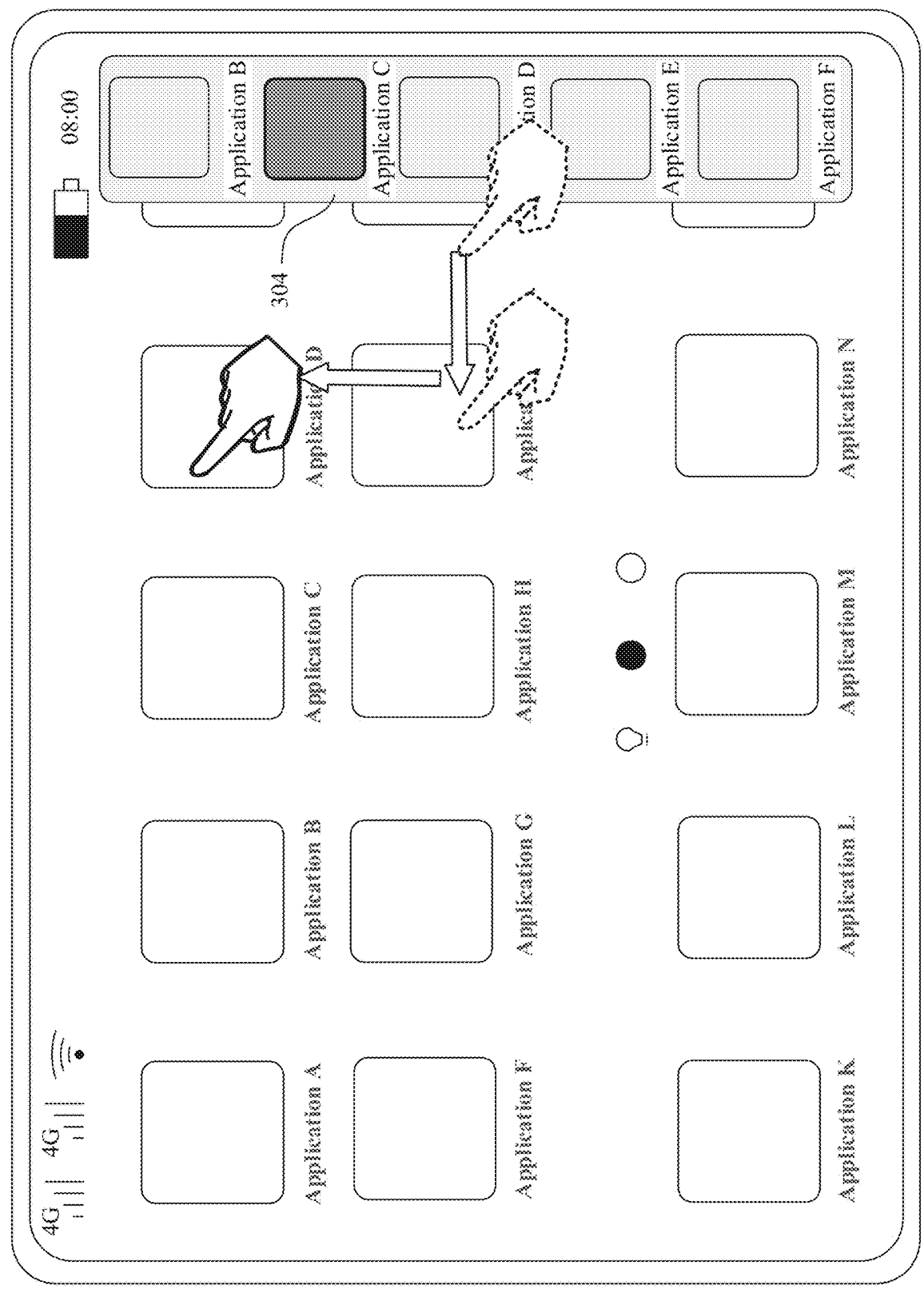

As shown in FIG. 4E, when the user inputs an operation of sliding upward for a distance and then stopping sliding, the electronic device 100 may correspondingly display applications in the side bar 304 in a sliding manner based on the upward sliding operation of the user. When the user stops sliding and stops touching the display screen, the electronic device determines that the icon of the application C corresponding to the operation is selected. Alternatively, when the user inputs an upward sliding operation, applications in the side bar 304 are correspondingly displayed in a sliding manner, and after the user stops sliding and stops continuously touching the display screen, the electronic device may detect an operation of tapping an application icon in the side bar by the user, and select the application icon.

Figure 4F:
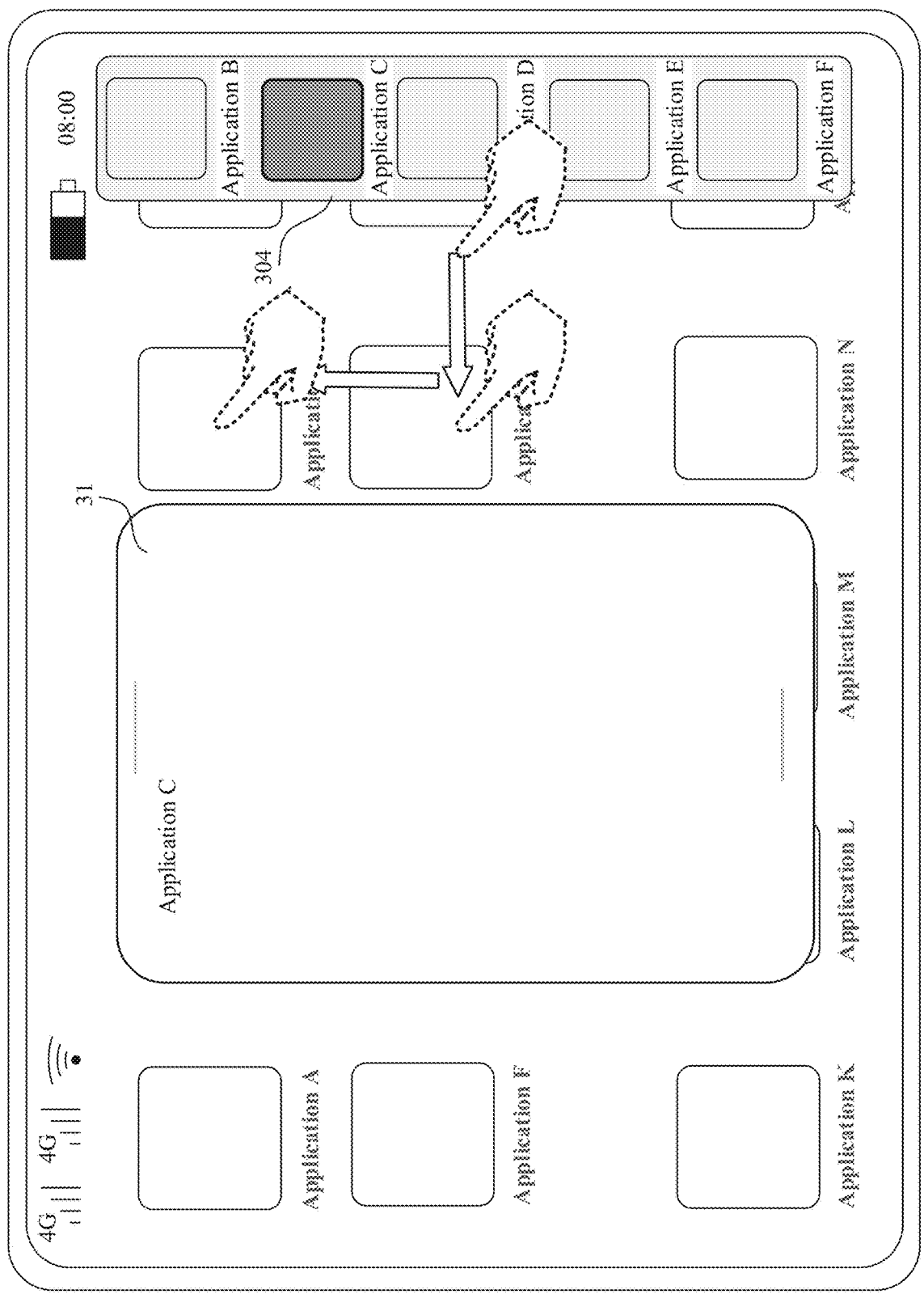

As shown in FIG. 4F, after the electronic device 100 detects, in a user interface shown in FIG. 4F, that the user inputs an operation of stopping sliding and releasing a finger, the electronic device 100 may display, in the floating window, the interface 31 provided by the application C corresponding to the last icon, namely, an icon before the finger is released.

It may be understood that FIG. 4A-FIG. 4F merely show two methods in which the electronic device displays, on the home screen in a form of a floating window, an interface provided by an application. In addition, the electronic device may display, in another user interface in a form of a floating window, an interface provided by an application. Details are as follows:

FIG. 4G-FIG. 4J show an example method in which when displaying, in full screen, an interface provided by another application, the electronic device displays, by using a floating window, an interface provided by an application.

Figure 4G:
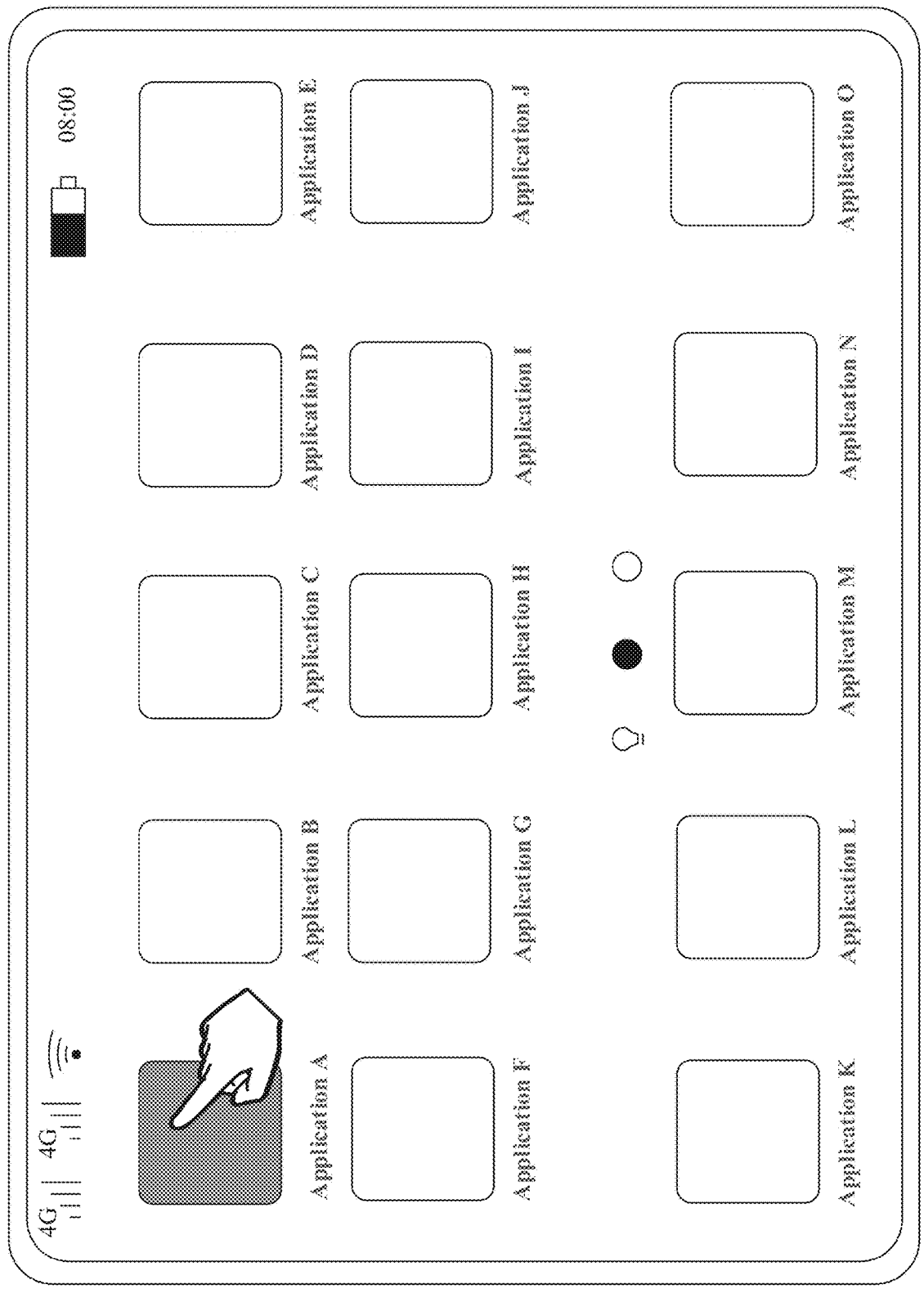

On the home screen shown in FIG. 4G, the electronic device 100 may detect, in the user interface 31 shown in FIG. 4G, an operation performed on the icon of the application A.

Figure 4H:
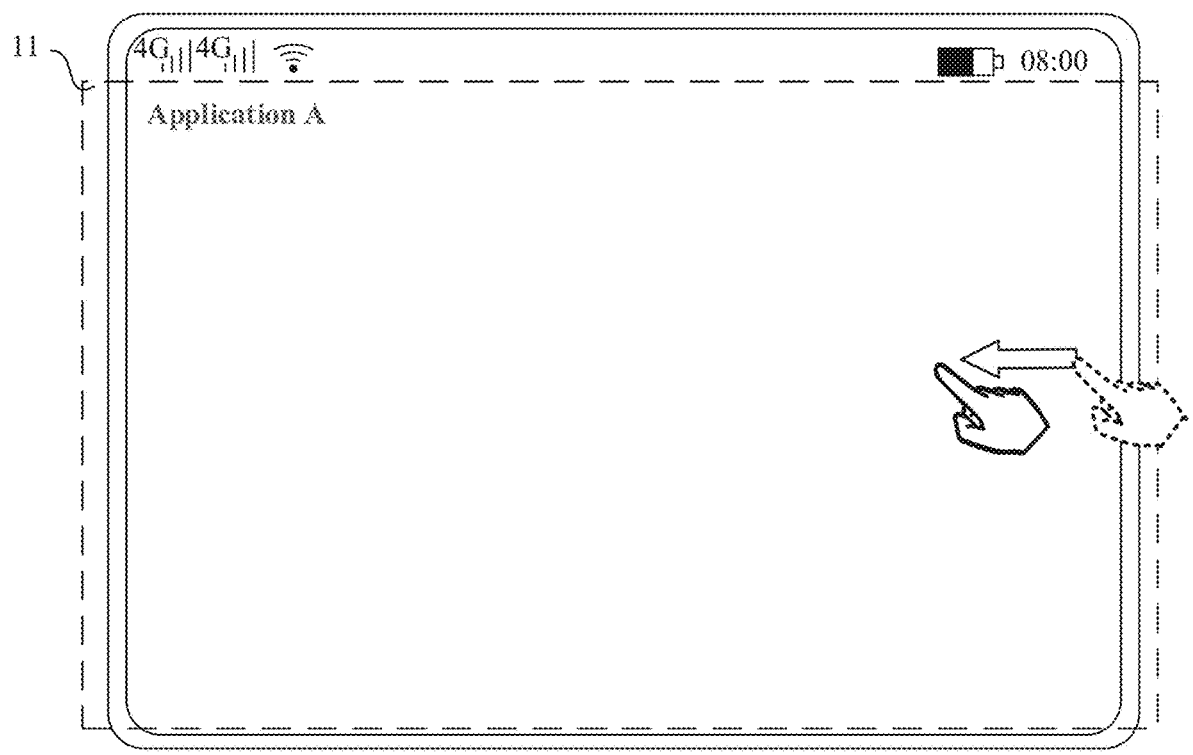

In response to the operation, the electronic device 100 displays, in full screen, the interface provided by the application A, as specifically shown in FIG. 4H.

As shown in FIG. 4H, the electronic device 100 displays, in full screen, the interface 11 provided by the application A. Full screen herein refers to a region other than the status bar 301 on the display screen.

Assuming that when the user needs to temporarily use the application B during use of the application A in the electronic device 100, the electronic device 100 may temporarily display the interface of the application B in the interface of the application A in a form of a floating window. Details are as follows:

Based on a user interface shown in FIG. 4H, the electronic device 100 may detect, in the interface 11 shown in FIG. 4H, an operation of sliding from the right edge of the screen to the inner side of the screen. In response to the operation, the electronic device 100 may display a user interface shown in FIG. 4I.

Figure 4I:
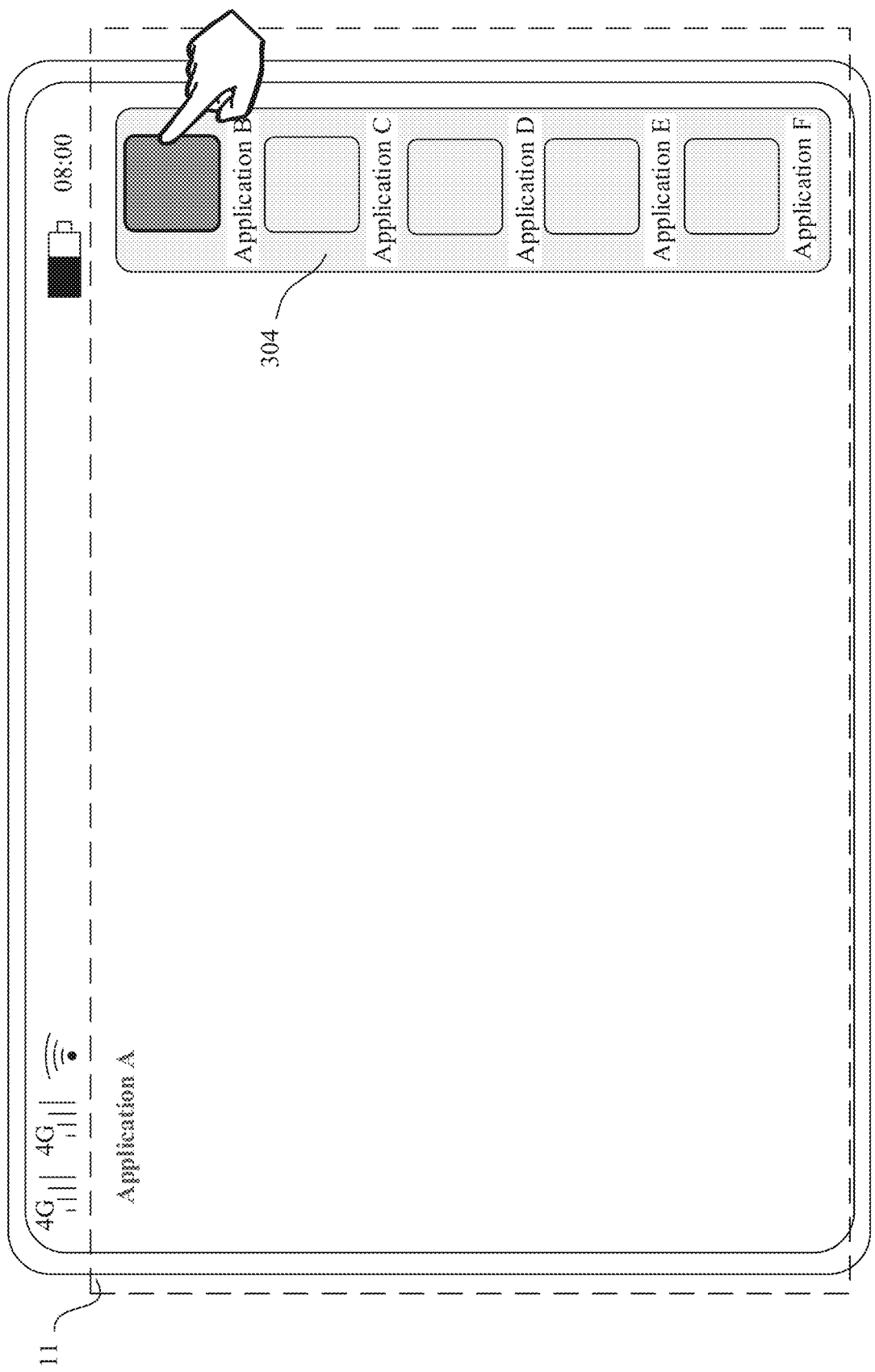

As shown in FIG. 4I, the electronic device 100 displays the side bar 304 in the user interface 11 provided by the application A, and the side bar 304 displays a series of application icons, for example, the icon of the application B, the icon of the application C, the icon of the application D, and the icon of the application E.

Based on the user interface shown in FIG. 4I, the electronic device 100 may detect, in the side bar 304 shown in FIG. 4I, an operation performed on the icon of the application B. In response to the operation, the electronic device 100 may display a user interface shown in FIG. 4J.

Figure 4J:
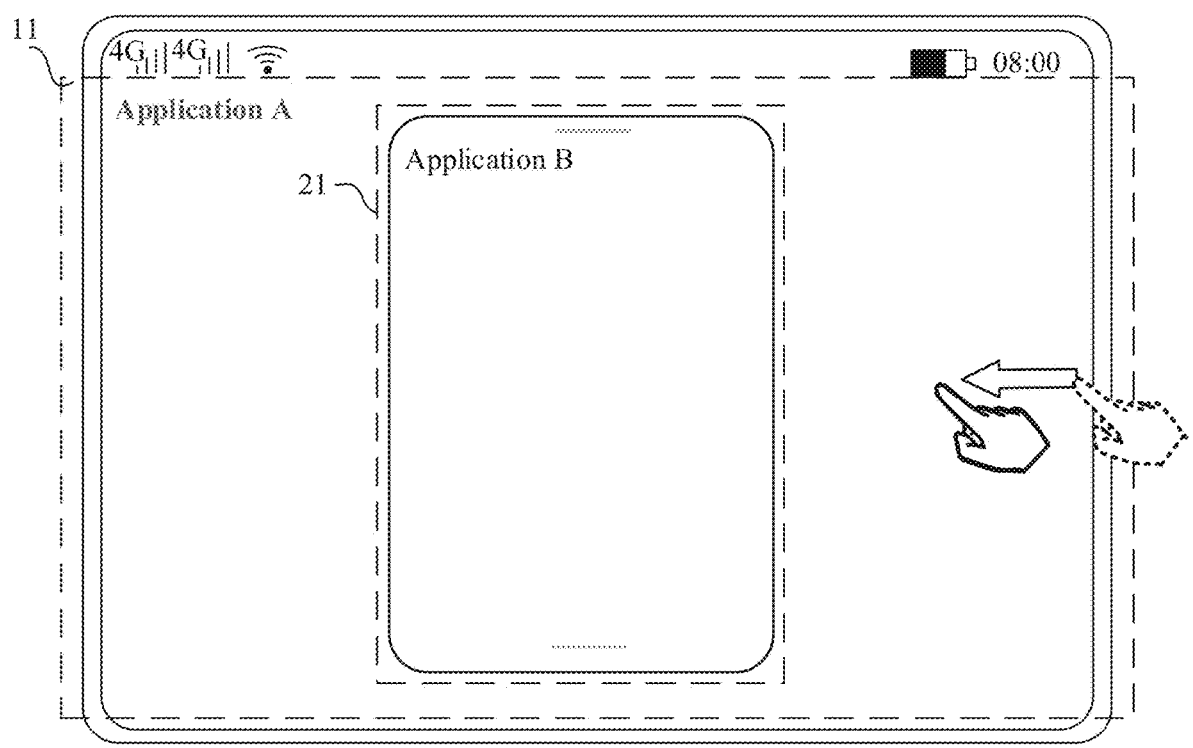

As shown in FIG. 4J, the electronic device 100 displays the interface 11 and the interface 21. The interface 11 is still an interface provided by the application A, and a display status of the interface 11 is consistent with that in FIG. 4H, that is, full-screen display. The interface 21 is an interface provided by the application B, and the interface 21 is displayed in the interface 11 in a form of a floating window.

It may be understood that the operation of triggering the electronic device to display an application in a form of a floating window in the method that is described in FIG. 4G-FIG. 4J and in which the electronic device displays, by using a floating window in an interface provided by another application displayed by the electronic device in full screen, an interface provided by an application may be the operation, shown in FIG. 4A-FIG. 4B, of first invoking the side bar by performing a sliding operation and then tapping an icon of a to-be-switched application in the side bar shown. In this case, an interface provided by a corresponding application can be displayed in a floating window by using at least two operations. Alternatively, an interface provided by a corresponding application may be displayed in a floating window by performing one sliding operation, that is, a continuous sliding operation of first sliding leftward and then sliding rightward in FIG. 4C-FIG. 4F.

Assuming that the user further needs to use the application C when using the application A in the electronic device 100 and temporarily using the application B, the electronic device 100 may temporarily display the interface of the application C in the interface of the application A in a form of a floating window. For specific operations, refer to the following descriptions.

Figure 4K:
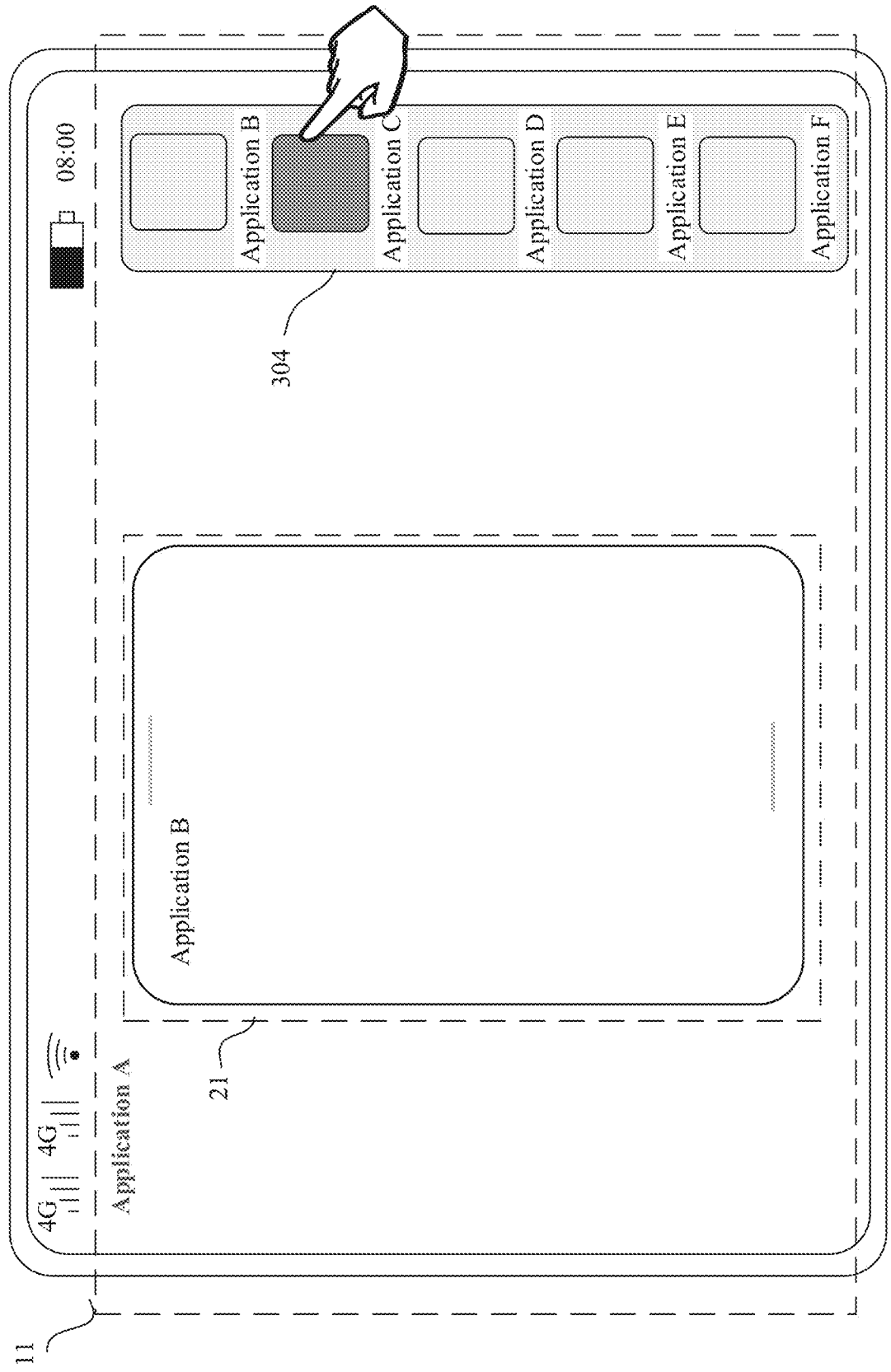
Figure 4L:
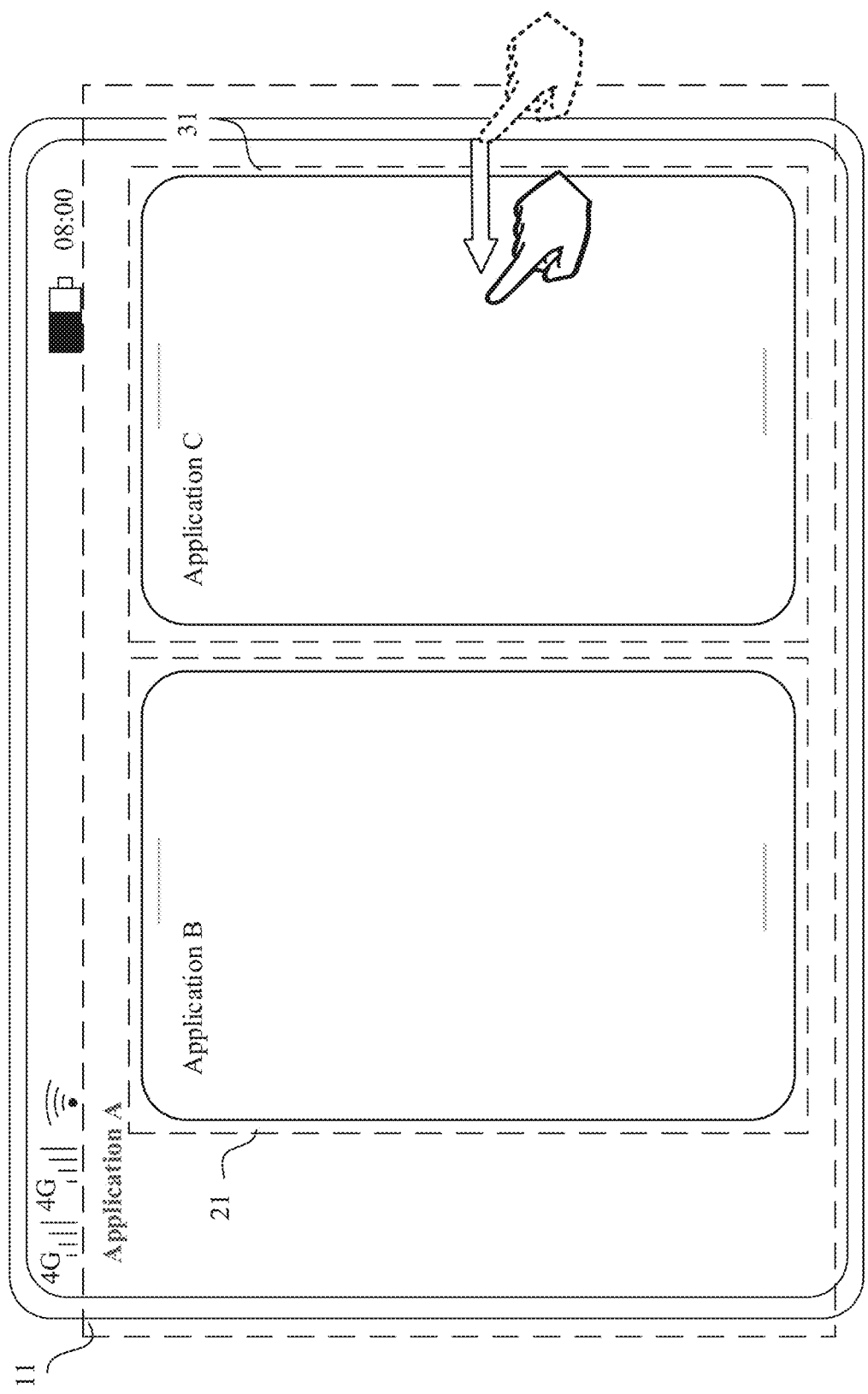

FIG. 4K-FIG. 4L show an example method in which the electronic device simultaneously displays, by using two floating windows, interfaces provided by two applications.

Based on FIG. 4J, the electronic device 100 may detect, in FIG. 4I, an operation used to invoke the side bar. In response to the operation, the electronic device 100 displays a user interface shown in FIG. 4K.

As shown in FIG. 4K, the electronic device 100 displays the side bar 304, and the side bar 304 displays a series of application icons, for example, the icon of the application B, the icon of the application C, the icon of the application D, and the icon of the application E.

Based on the user interface shown in FIG. 4K, the electronic device 100 may detect, in the side bar 304 shown in FIG. 4K, an operation performed on the icon of the application C, for example. In response to the operation, the electronic device 100 may display a user interface shown in FIG. 4L.

As shown in FIG. 4L, the electronic device 100 displays the interface 11, the interface 21, and the interface 31. The interface 11 is still an interface provided by the application A, and a display status of the interface 11 is consistent with that in FIG. 4H, that is, full-screen display. The interface 21 is provided by the application B, the interface 31 is provided by the application C, and the interface 21 and the interface 31 are separately displayed in the interface 11 in a form of a floating window.

Figure 4M:
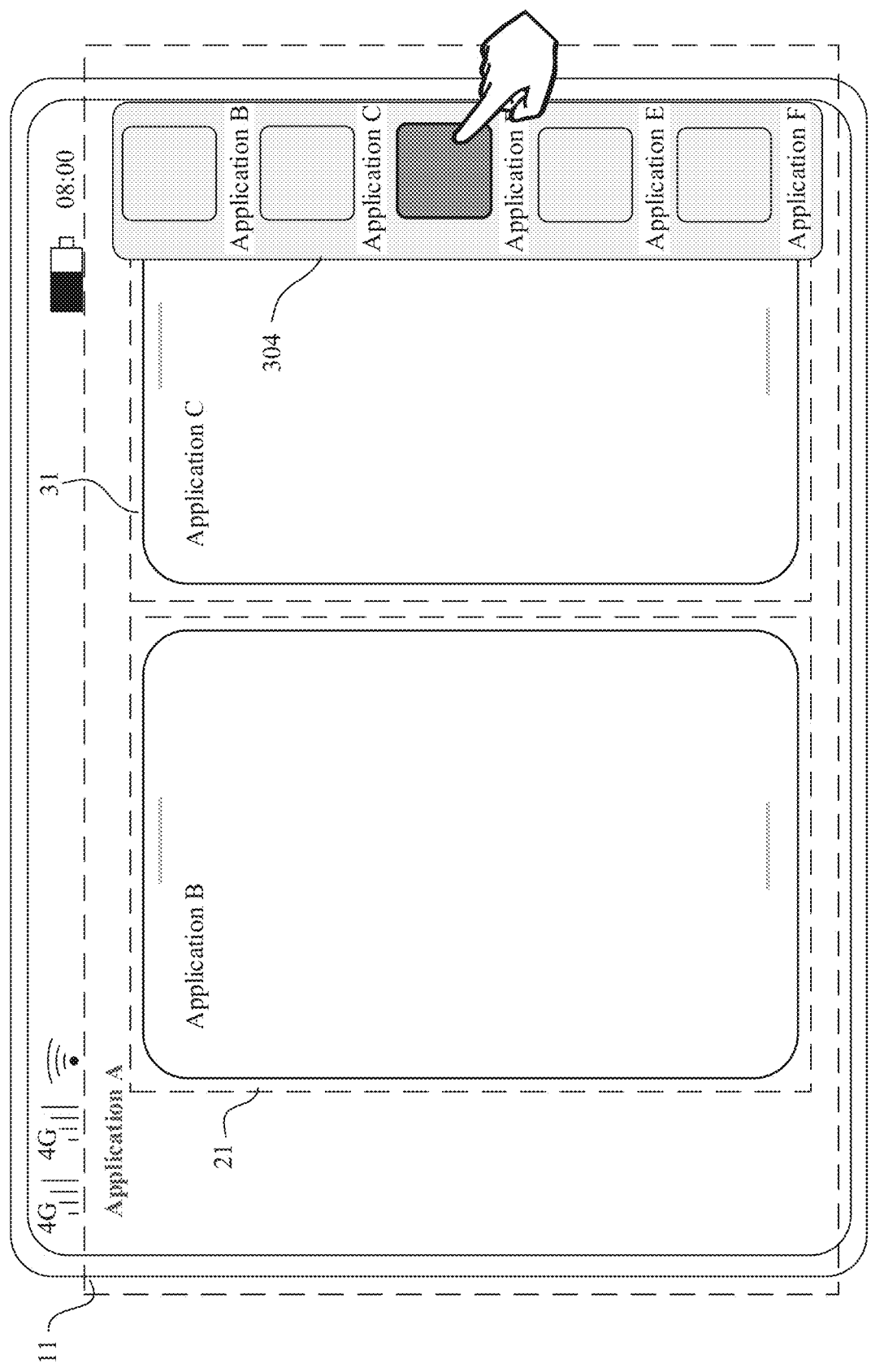
Figure 4N:
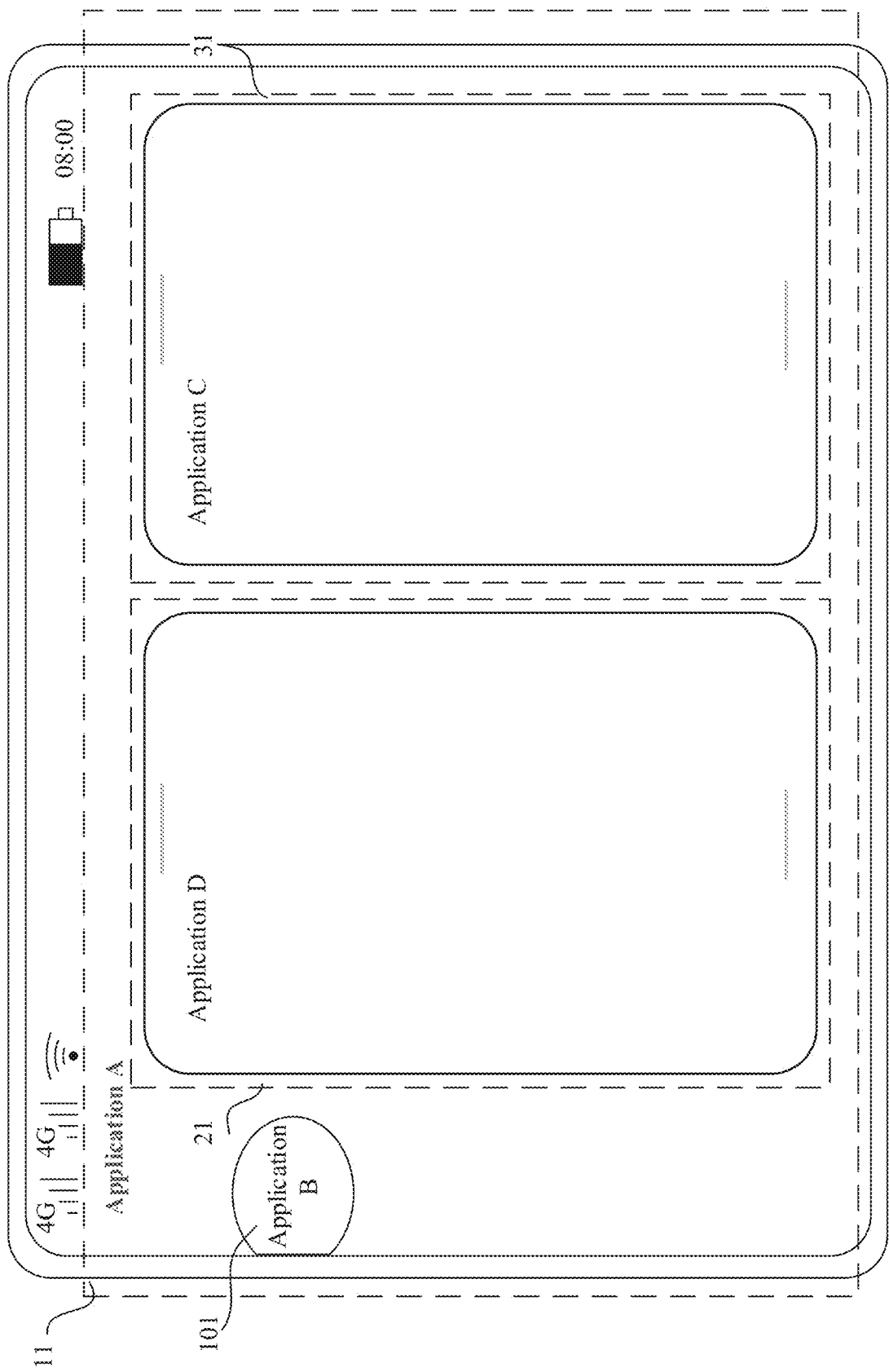

FIG. 4L-FIG. 4N show example user interfaces in which the electronic device opens a plurality of floating applications.

Based on the scenario that is described in FIG. 4H-FIG. 4L and in which the electronic device has opened a plurality of (for example, two) floating applications, the electronic device may further detect an operation that is input by the user and that is used to open another floating application in FIG. 4L-FIG. 4M. In response to the operation, the electronic device displays a user interface shown in FIG. 4M.

As shown in FIG. 4N, the electronic device may stop displaying an application first displayed by using a floating window in floating applications shown in FIG. 4L, and display an icon of the application in a form of a floating ball.

In some embodiments of this application, the plurality of floating applications may be two floating application shown in FIG. 4L, in other words, the electronic device can simultaneously display a maximum of two floating applications, or the plurality of floating applications may be of another quantity. This is not limited in this embodiment of this application.

In some embodiments of this application, a quantity of the plurality of floating applications may be based on a status of the electronic device. When the electronic device is displayed in the landscape mode or the portrait mode, quantities of floating applications that can be simultaneously displayed by the electronic device are different. For example, when the electronic device is displayed in the landscape mode, a maximum of two floating applications can be simultaneously displayed, and when the electronic device is displayed in the portrait mode, a maximum of one floating application can be simultaneously displayed.

FIG. 5A-FIG. 5M show an example of a series of user interfaces displayed by the electronic device when the electronic device edits a floating window.

In this embodiment of this application, an operation of editing the floating window may include editing the floating window, for example, adjusting a size or a display location of the floating window, or may be editing content provided by an application displayed in the floating window, for example, switching the content provided by the application.

Figure 5A:
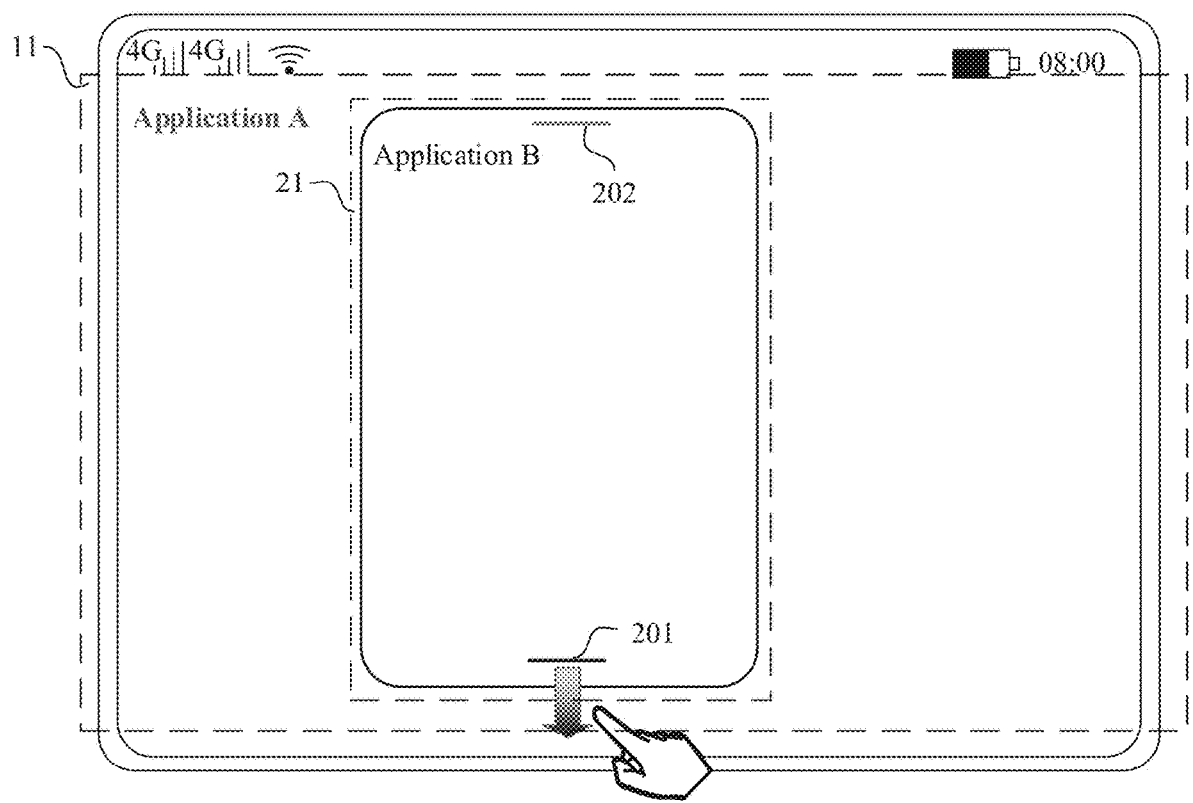
FIG. 5A-FIG. 5W are schematic diagrams of another group of user interfaces according to an embodiment of this application.
Figure 5B:
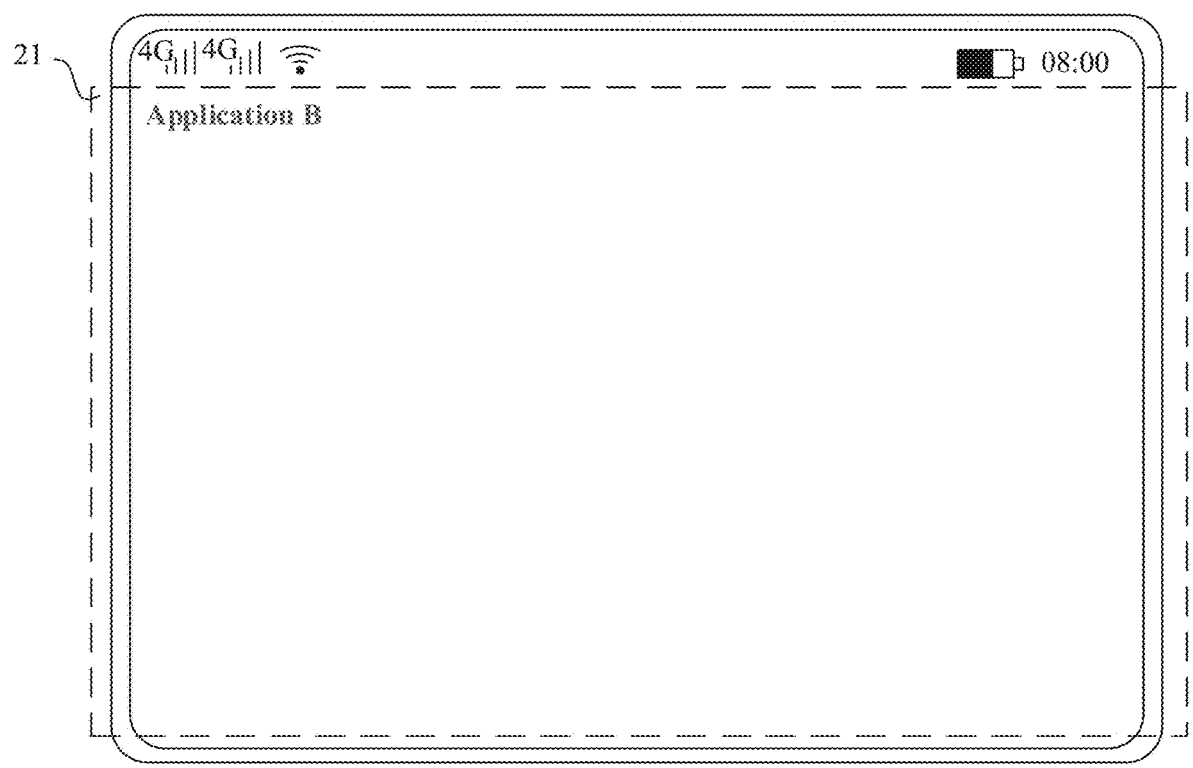

Based on the user interface, shown in FIG. 4J, in which the electronic device 100 displays the application A in full screen and displays the application B in a form of a floating window, assuming that in the process in which the user is using the application A in the electronic device 100 and temporarily uses the application B, the user wants to keep using the application B but no longer use the application A, the electronic device 100 may switch the application B from a form of a floating window to a full screen for display, and stop displaying the interface provided by the application A. A specific implementation method therefor is as follows:

FIG. 5A-FIG. 5B show an example implementation method in which the electronic device 100 switches an application from floating-window display to full-screen display.

As shown in FIG. 5A, the electronic device 100 displays the interface 11 of the application A in full screen, and displays the interface 21 of the application B in a floating state. The interface 21 displays a bottom Bar 201 and a top Bar 202. A user interface shown in FIG. 5A is the same as the user interface shown in FIG. 4J. Details are not described herein again.

The electronic device 100 may detect, in the user interface shown in FIG. 5A, an operation, for example, a downward sliding operation, performed by the user on the bottom Bar 201. In this case, the electronic device 100 may perform switching to display a user interface shown in FIG. 5B.

As shown in FIG. 5B, the electronic device 100 stops displaying the interface 11 of the application A, and switches the interface 21 of the application B from floating-window display to full-screen display. In other words, the electronic device 100 may enable the electronic device 100 to stop, based on the downward sliding operation that is input by the user and that is performed on the bottom Bar 201, displaying an application previously displayed in full screen, and perform switching to display, in full screen, an application previously displayed in a floating window.

Figure 5C:
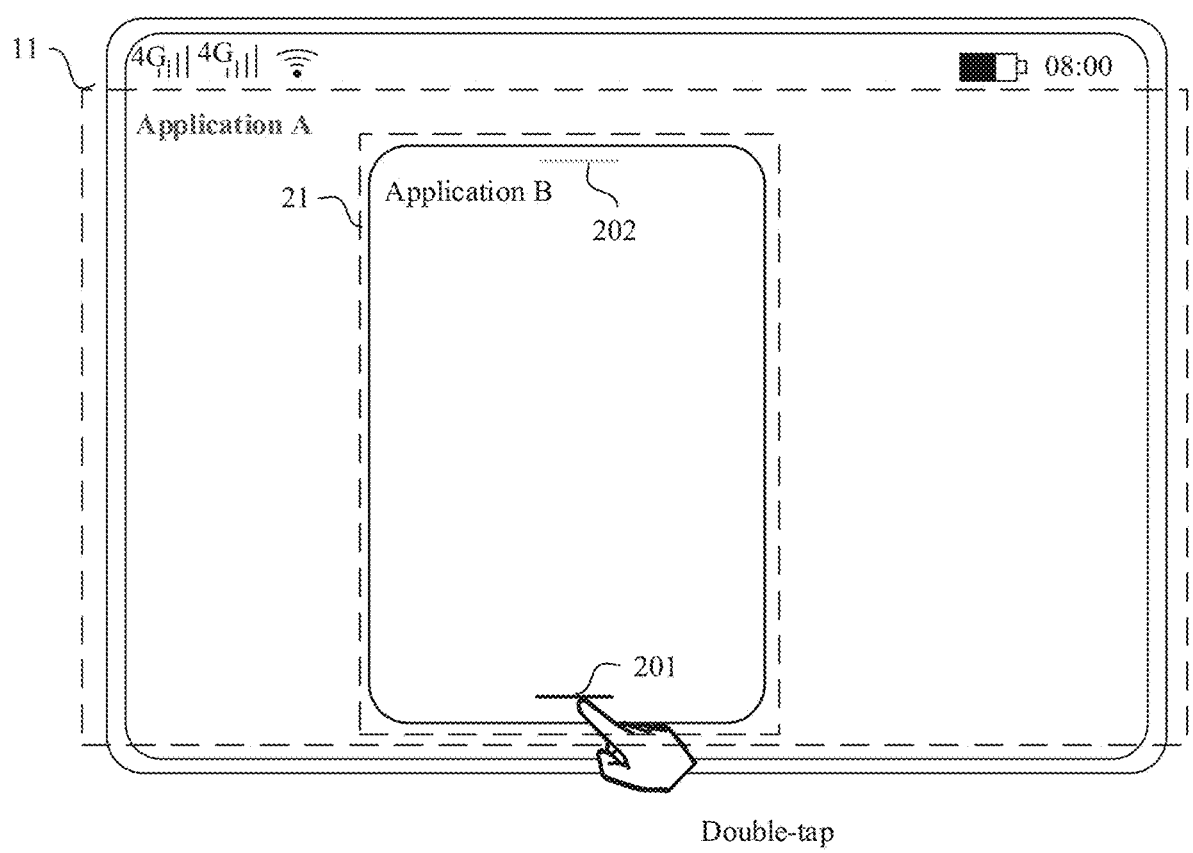
Figure 5D:
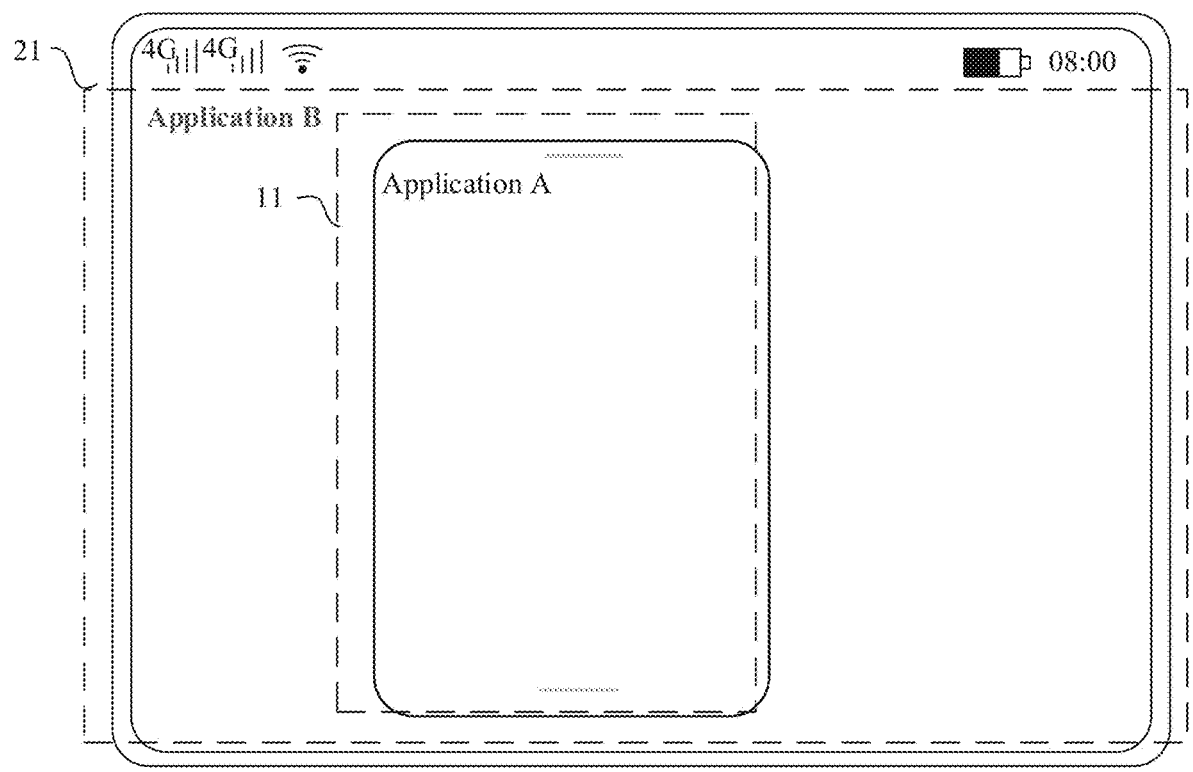

Based on the user interface, shown in FIG. 4J, in which the electronic device 100 displays the application A in full screen and displays the application B in a form of a floating window, assuming that in the process in which the user is using the application A in the electronic device 100 and temporarily uses the application B, the user wants to keep using the application B and temporarily use the application A, the electronic device 100 may switch the application B from the form of a floating window to a full screen for display, and switch the application A from full-screen display to floating-window display. A specific implementation method is as follows:

FIG. 5C-FIG. 5D show an example implementation method in which the electronic device 100 switches an application displayed in a floating window to full-screen display, and switches an application displayed in full screen to floating-window display.

Based on the user interface, shown in FIG. 3D, in which the electronic device 100 displays an application in full screen and displays a user interface of any other application in a floating state, assuming that in the process in which the user is using the application A in the electronic device 100 and temporarily uses the application B, the user wants to keep using the application B and temporarily use the application A, the electronic device 100 may switch the application B from the form of a floating window to a full screen for display, and switch the application A from full-screen display to floating-window display. A specific implementation method is as follows:

FIG. 5C-FIG. 5D show an example operation performed by the electronic device 100 to transpose full-screen display and floating-window display of applications. As shown in FIG. 5C, the electronic device 100 displays the interface 11 of the application A in full screen, and displays the interface 21 of the application B in a floating state. The interface 21 displays the bottom Bar 201 and the top Bar 202. A user interface shown in FIG. 5C is the same as the user interface shown in FIG. 3D. Details are not described herein again.

The electronic device 100 may detect, in the user interface shown in FIG. 5C, an operation, for example, a double-tapping operation, performed by the user on the bottom Bar 201. In this case, the electronic device 100 may perform switching to display a user interface shown in FIG. 5D.

As shown in FIG. 5D, the electronic device 100 switches the interface 11 of the application A from full-screen display shown in FIG. 5C to floating display, and switches the interface 21 of the application B from full-screen display shown in FIG. 5C to floating display. In other words, the electronic device 100 may transpose display statuses of a full-screen application and a floating application based on the operation that is input by the user and that is of double-tapping the bottom Bar in an interface of the floating application.

Figure 5E:
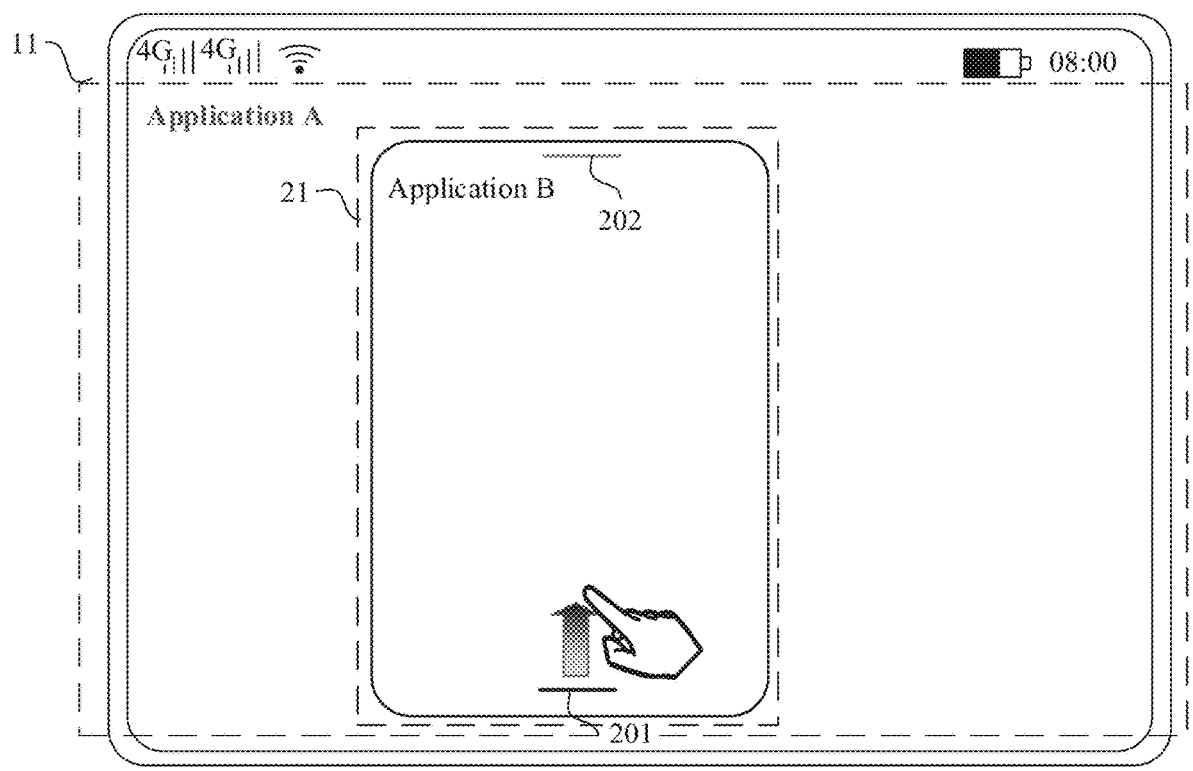
Figure 5F:
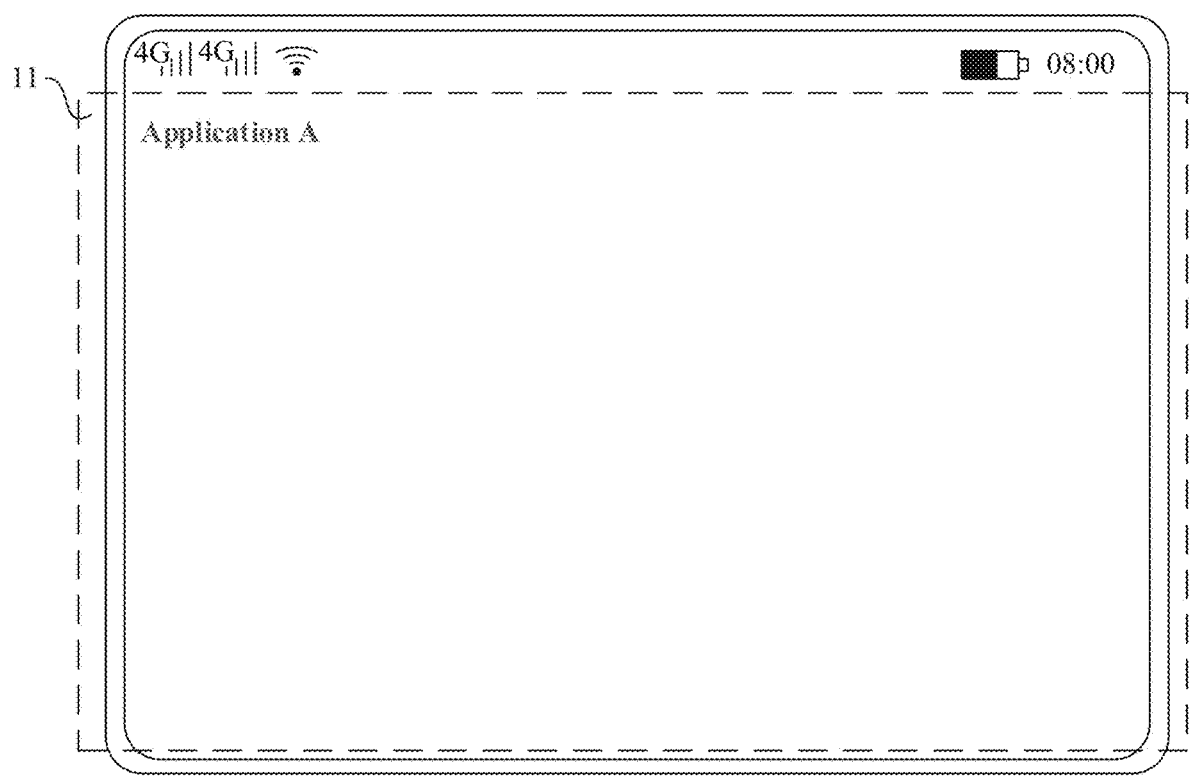

Based on the user interface, shown in FIG. 4J, in which the electronic device 100 displays the application A in full screen and displays the application B in a form of a floating window, assuming that in the process in which the user is using the application A in the electronic device 100 and temporarily uses the application B, the user wants to use only the application A and no longer use the application B, the electronic device 100 may stop displaying the application B. A specific implementation method is as follows:

FIG. 5E-FIG. 5F show an example implementation method in which the electronic device 100 stops running an application in a floating window.

As shown in FIG. 5E, the electronic device 100 displays the interface 11 of the application A in full screen, and displays the interface 21 of the application B in a floating state. The interface 21 displays the bottom Bar 201 and the top Bar 202. A user interface shown in FIG. 5E is the same as the user interface shown in FIG. 3D. Details are not described herein again.

The electronic device 100 may detect, in the user interface shown in FIG. 5E, an operation, for example, an upward sliding operation, performed by the user on the bottom Bar 201. In this case, the electronic device 100 may stop running the application B, and display a user interface shown in FIG. 5F.

As shown in FIG. 5F, the electronic device 100 stops displaying the interface 21 of the application B that is shown in FIG. 5E and that is displayed in the floating window, and displays only the interface 11 of the application A in full screen. In other words, the electronic device 100 may stop, based on the upward sliding operation that is input by the user and that is performed on the bottom Bar in the floating window, displaying an application in a form of a floating window.

Figure 5G:
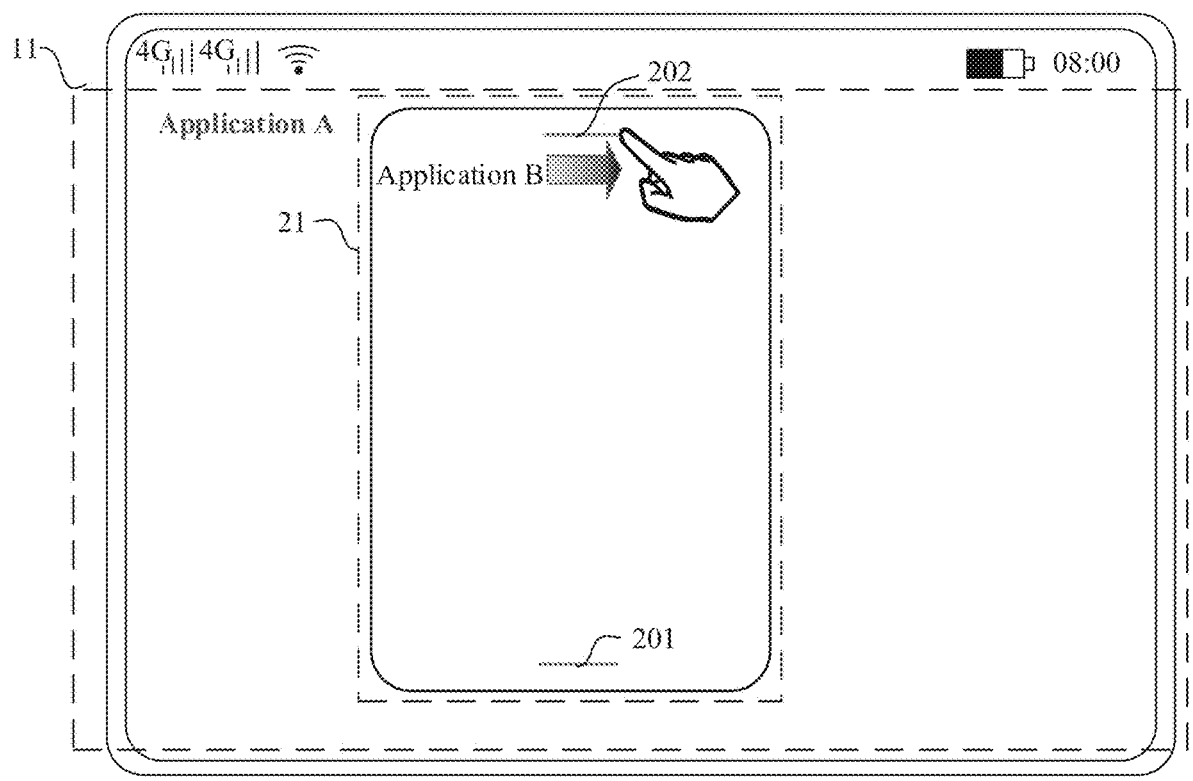
Figure 5H:
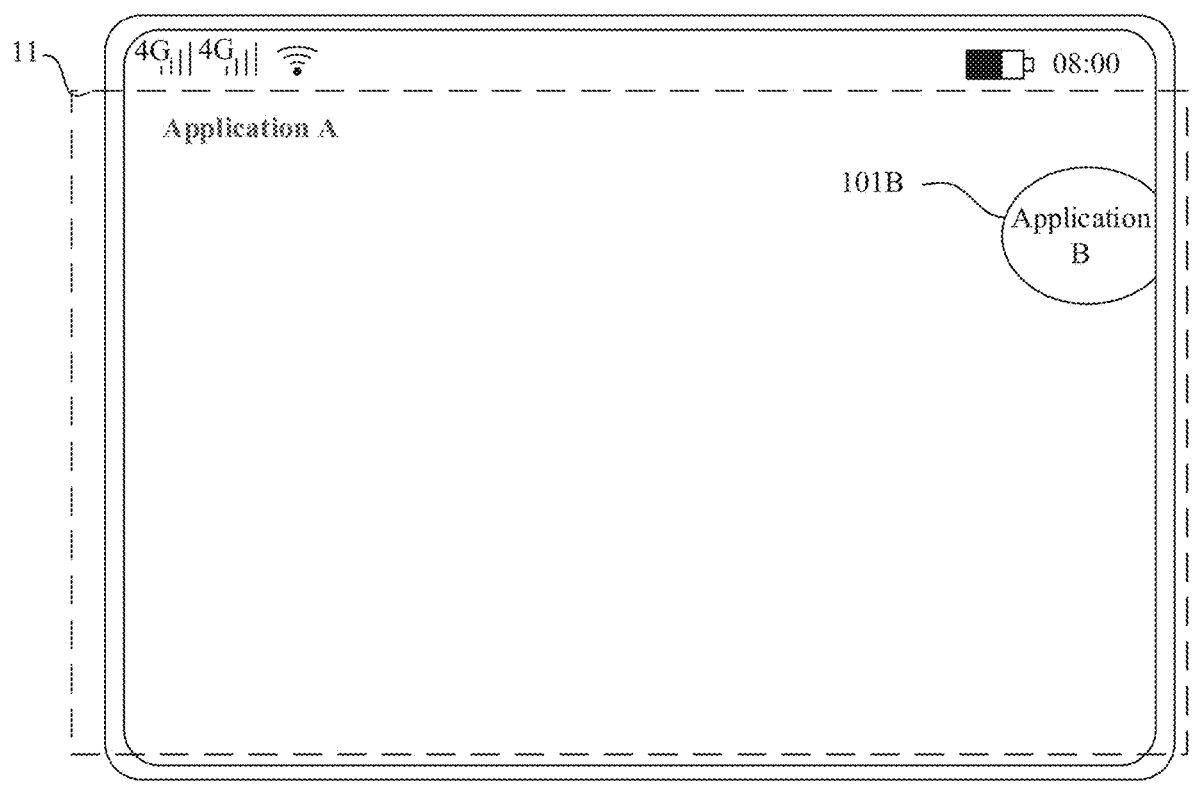

Based on the user interface, shown in FIG. 4J, in which the electronic device 100 displays the application A in full screen and displays the application B in a form of a floating window, assuming that in the process in which the user is using the application A in the electronic device 100 and temporarily uses the application B, the user wants to temporarily use only the application A and use the application B later, the electronic device 100 may switch the application B from the display form of a floating window to a display form of a floating ball. A specific implementation method is as follows:

FIG. 5G-FIG. 5H show an example implementation method in which the electronic device 100 performs switching to minimize an application in a floating window.

As shown in FIG. 5G, the electronic device 100 displays the interface 11 of the application A in full screen, and displays the interface 21 of the application B in a floating window. The interface 21 displays the bottom Bar 201 and the top Bar 202. A user interface shown in FIG. 5G is the same as the user interface shown in FIG. 4J. Details are not described herein again.

The electronic device 100 may detect, in the user interface shown in FIG. 5H, an operation, for example, a rightward sliding operation, performed by the user on the top Bar 202. In this case, the electronic device 100 may perform switching to display a user interface shown in FIG. 5H.

As shown in FIG. 5H, the electronic device 100 stops displaying the interface 21 of the application B displayed in the floating window shown in FIG. 5G, and displays a floating ball icon 101B. The floating ball icon 101B displays the icon of the application B. In other words, the electronic device 100 may switch, based on the rightward sliding operation that is input by the user and that is performed on the top Bar in the floating window, the application displayed in the floating window to a minimized display form, in other words, display, in a form of a floating ball icon, an icon corresponding to the application. When the electronic device detects an operation performed on the floating ball icon 101B, in response to the operation, the electronic device 100 displays, in a form of a floating window again, the interface 21 provided by the application B. In this embodiment of this application, in the process in which the electronic device 100 switches the floating window to the floating ball, the floating window may gradually become smaller in size and then become the floating ball, and the floating ball is displayed on one side, for example, a right side or a left side, of the display screen, may be hidden, or the like.

In some other embodiments of this application, when the electronic device 100 detects the operation performed on the floating ball icon, the electronic device 100 may display a historical application window 102. The historical application window 102 displays a plurality of interface thumbnails that are of applications in floating windows and that exist before a minimization operation is performed on the applications. For details, refer to the following descriptions in FIG. 6A-FIG. 6D. Details are not described herein.

It may be understood that in addition to the foregoing implementation method shown in FIG. 5A-FIG. 5B, the electronic device 100 may switch an application from floating-window display to full-screen display by using another implementation method. In addition, in addition to the foregoing implementation method shown in FIG. 5E-FIG. 5F, the electronic device 100 may stop, by using another implementation method, displaying the application B. In addition, in addition to the foregoing implementation method shown in FIG. 5G-FIG. 5H, the electronic device 100 may switch the application B from a display form of a floating window to a display form of a floating ball by using another implementation method.

In addition to the downward sliding operation performed on the bottom Bar 201, the foregoing operation method for switching an application from floating display to full-screen display mentioned in FIG. 5A-FIG. 5B may be implemented by the following operation method.

Figure 5I:
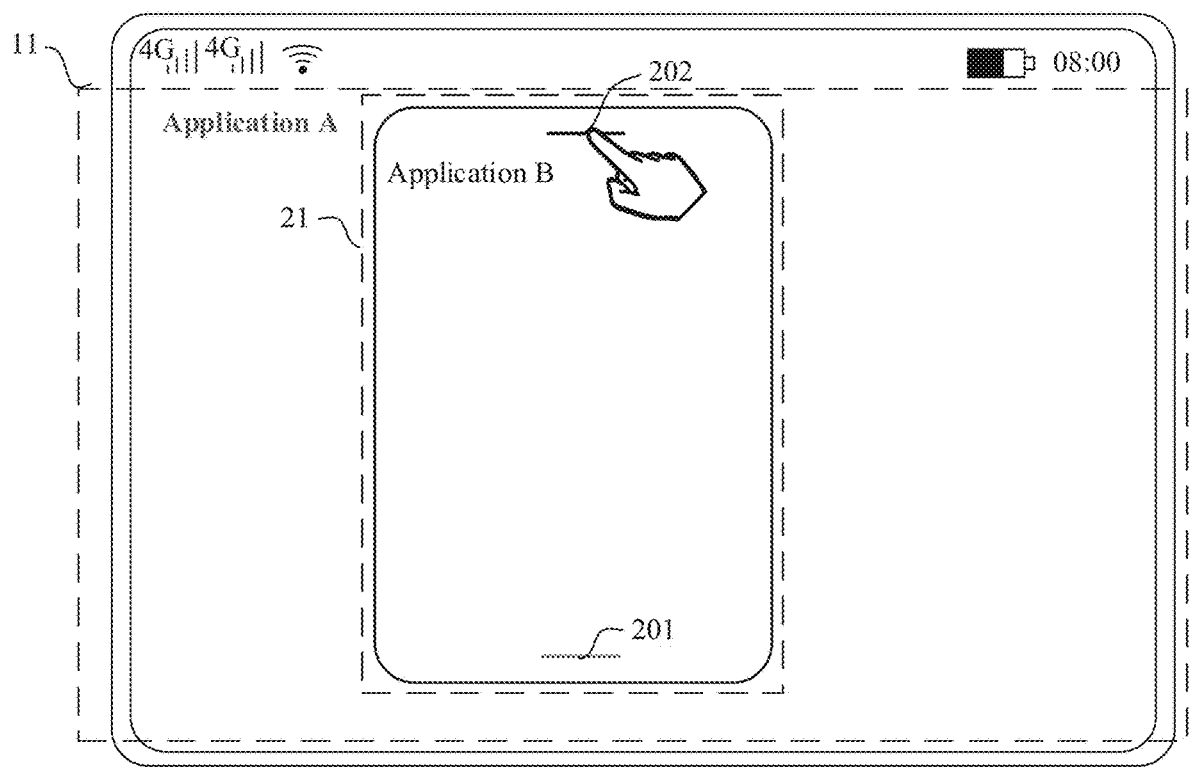
Figure 5J:
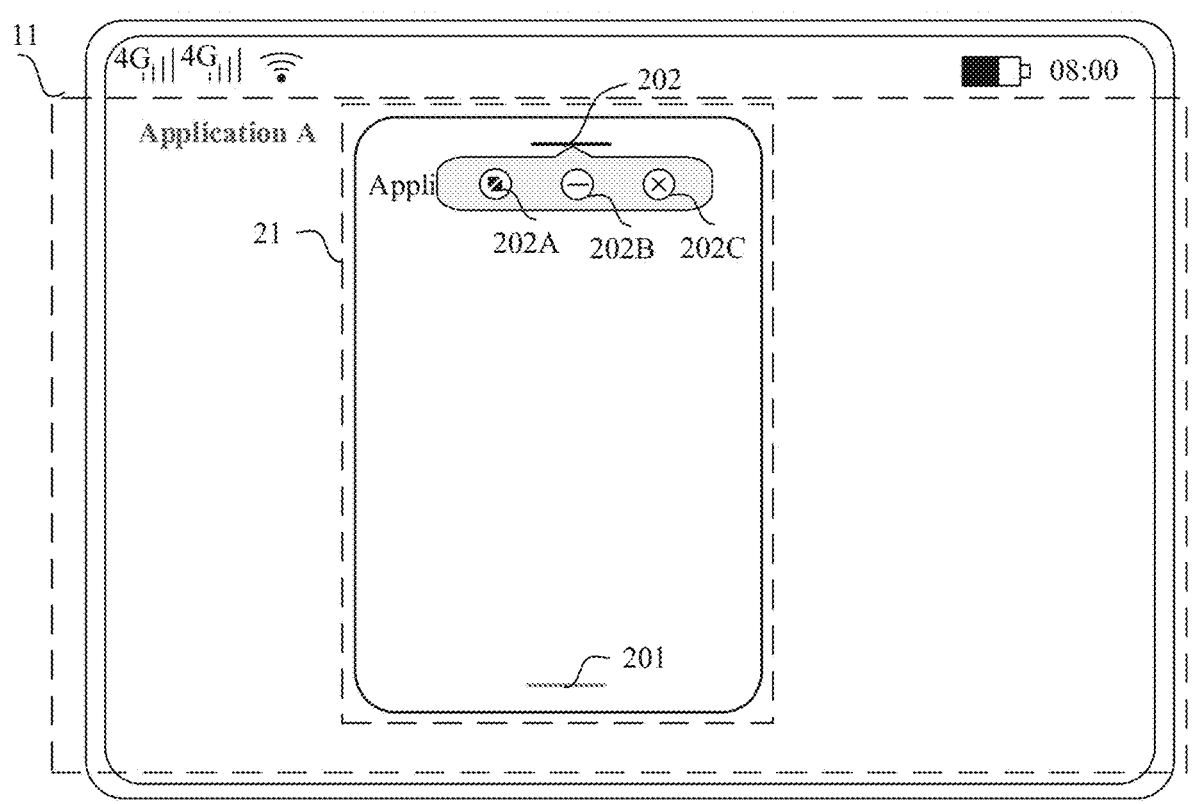

As shown in FIG. 5I, the electronic device 100 may detect an operation, for example, a tapping operation, performed by the user on the top Bar 202, and in this case, the electronic device 100 expands a control 202A, a control 202B, and a control 202C shown in FIG. 5J. The control 202A is configured to switch the application B from floating-window display to a full-screen display form shown in FIG. 5B. The electronic device 100 may detect an operation performed by the user on the control 202A. In response to the operation, the electronic device 100 may switch the application B from floating-window display to the full-screen display form shown in FIG. 5B.

In addition to the upward sliding operation performed on the bottom Bar 201, the foregoing operation method for stopping running an application displayed in a floating window mentioned in FIG. 5E-FIG. 5F may be implemented by the following operation method: The electronic device 100 may detect an operation performed by the user on the control 202C shown in FIG. 5J. In response to the operation, the electronic device 100 stops running the application B displayed in the floating window, and stops displaying the interface of the application B.

In addition to the rightward sliding operation performed on the top Bar 202, the foregoing operation method for displaying, in a minimized form, an application displayed in a floating window mentioned in FIG. 5G-FIG. 5H may be implemented by the following operation method: The electronic device 100 may detect an operation performed by the user on the control 202B shown in FIG. 5J. In response to the operation, the electronic device 100 switches the application B from floating-window display to minimized-form display. In other words, the electronic device switches the application B to the background for running, stops displaying the interface of the application B in the floating window, and displays the icon of the application B in a form of a floating ball.

Figure 5K:
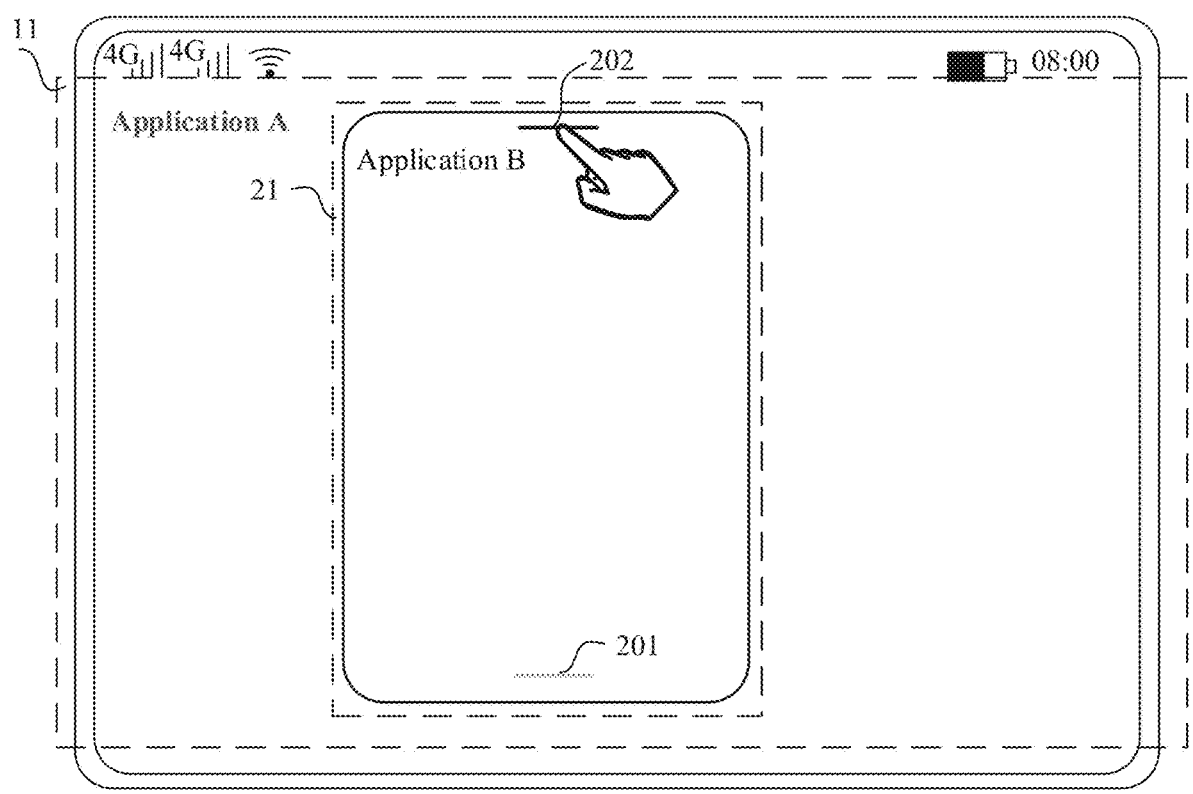
Figure 5L:
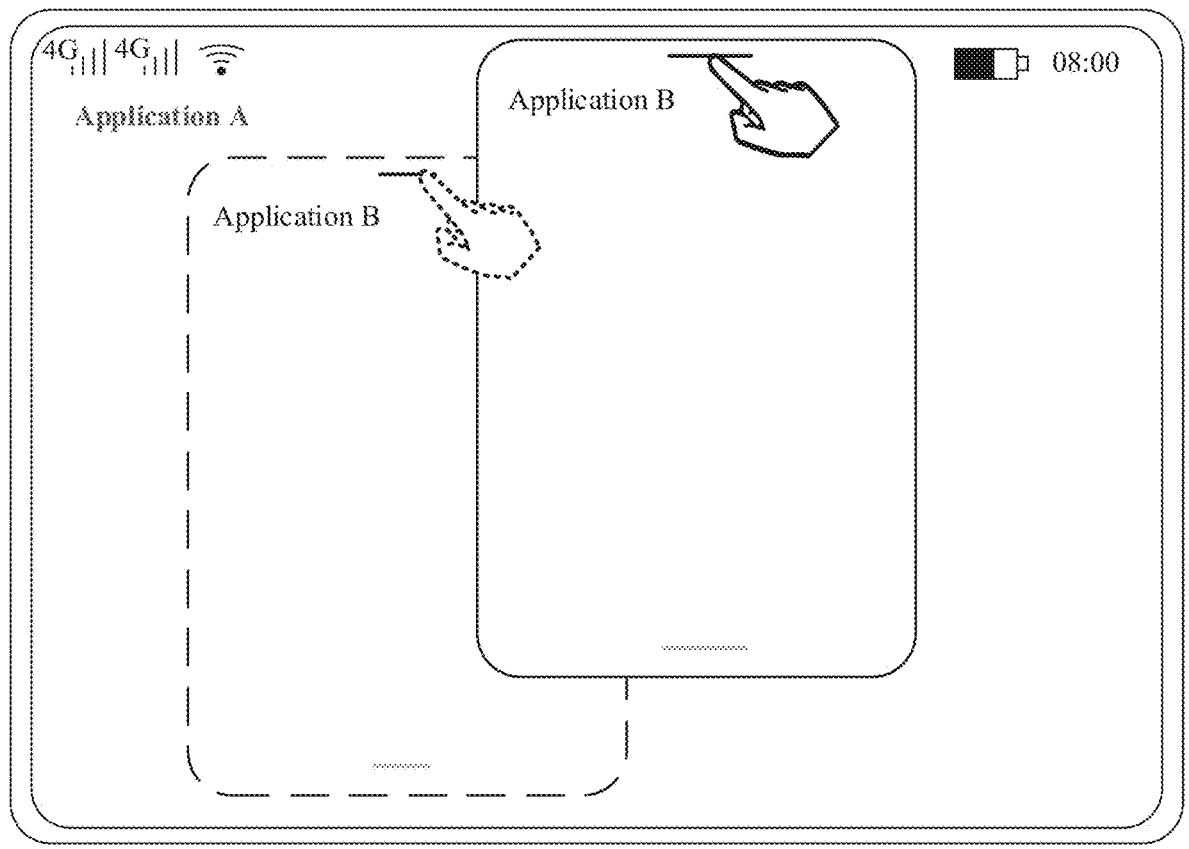
Figure 5M:
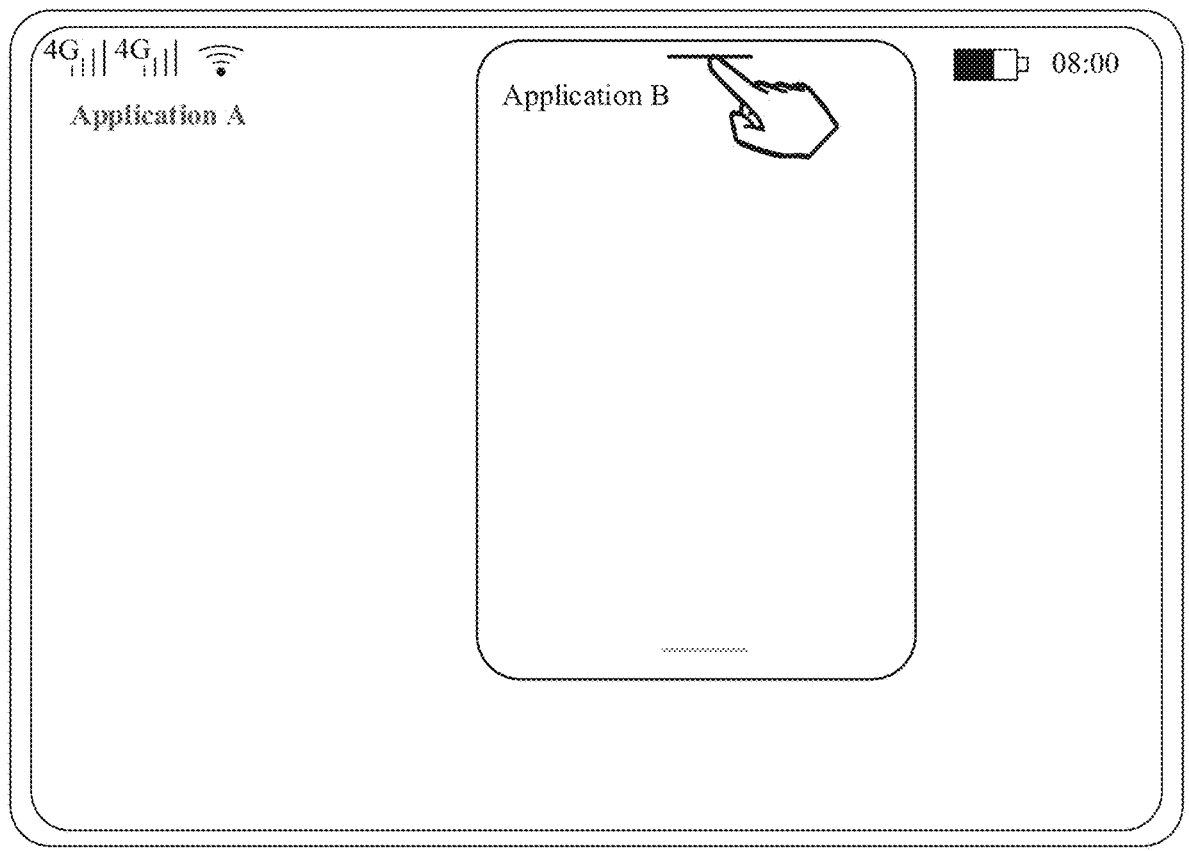

Based on the user interface, shown in FIG. 4J, in which the electronic device 100 displays the application A in full screen and displays the application B in the form of a floating window, assuming that the user wants to move a display location of the interface 21 of the application B, a specific implementation method therefor is as follows:

FIG. 5K-FIG. 5M show an example method in which the electronic device moves a display location of a floating window.

FIG. 5K-FIG. 5M show an example operation used by the electronic device 100 to change a display location of the floating application B.

As shown in FIG. 5K, the electronic device 100 displays the interface 11 of the application A in full screen, and displays the interface 21 of the application B in a floating state. The interface 21 displays the bottom Bar 201 and the top Bar 202. A user interface shown in FIG. 5K is the same as the user interface shown in FIG. 3D. Details are not described herein again.

The electronic device 100 may detect, in the user interface shown in FIG. 5K, an operation that is input by the user and that is of touching and holding the top Bar 202, to select the interface 21 of the application B. Then, as shown in FIG. 5L, the electronic device 100 may detect an operation of dragging the interface 21 by the user by keeping pressing the top Bar 202 and moving a finger. When the interface 21 is dragged to a location that meets an expectation of the user, the user may stop pressing the top Bar 202, in other words, the finger of the user leaves the display screen. In response to the series of operations, the electronic device 100 may change the display location of the application B. FIG. 5K-FIG. 5M may be compared.

Figure 5N:
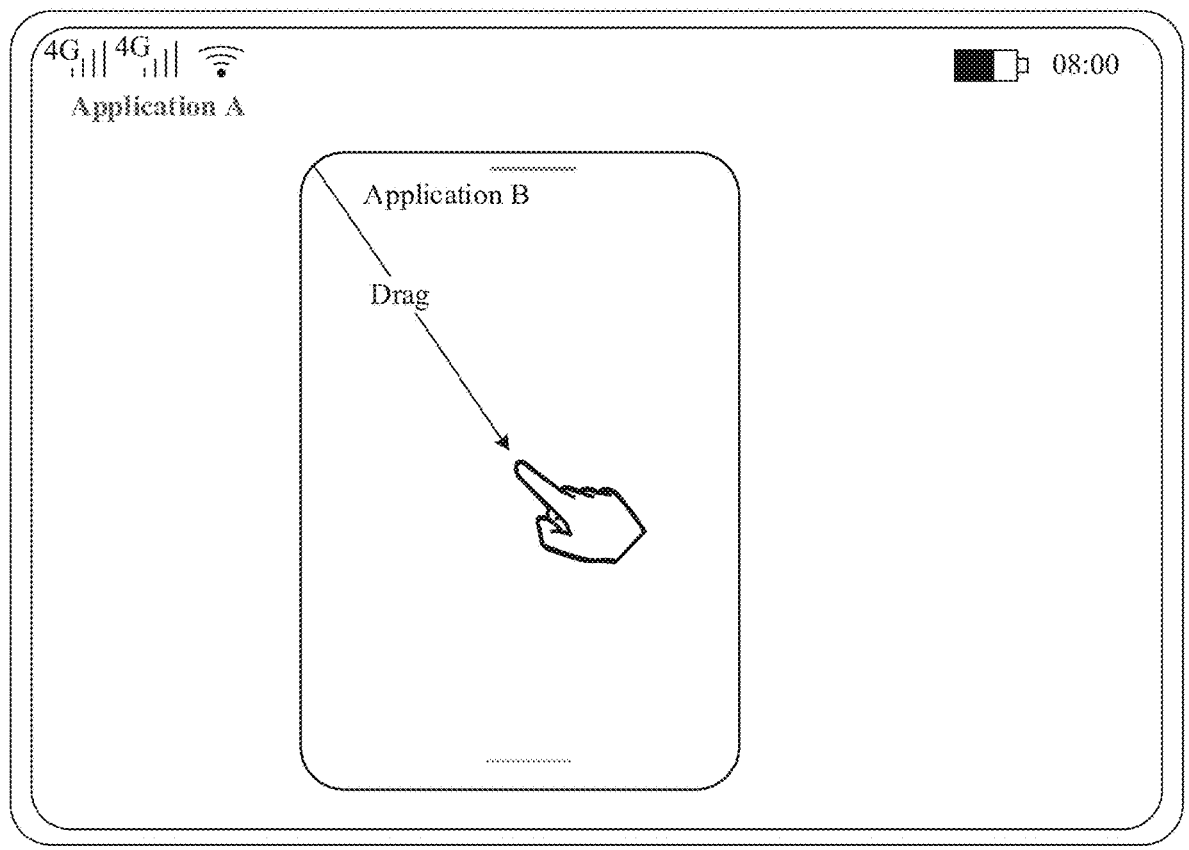
Figure 5O:
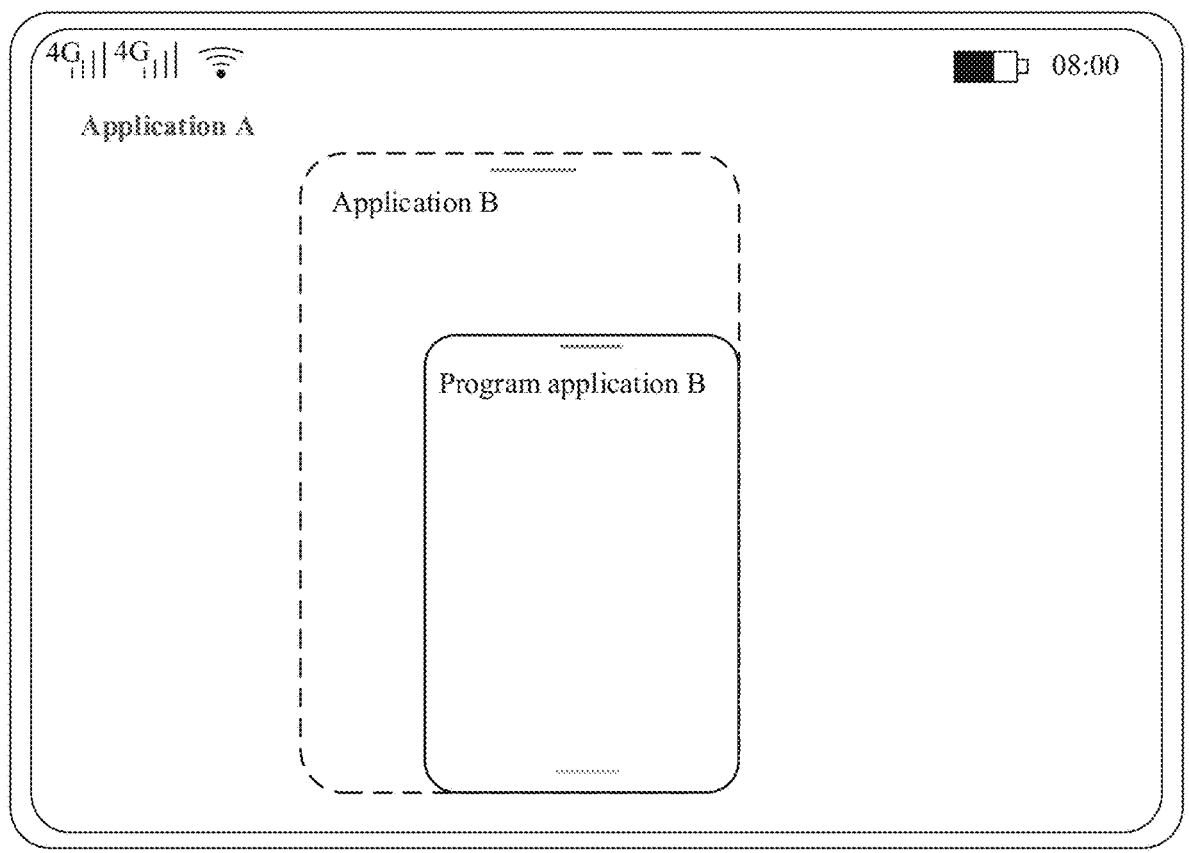
Figure 5P:
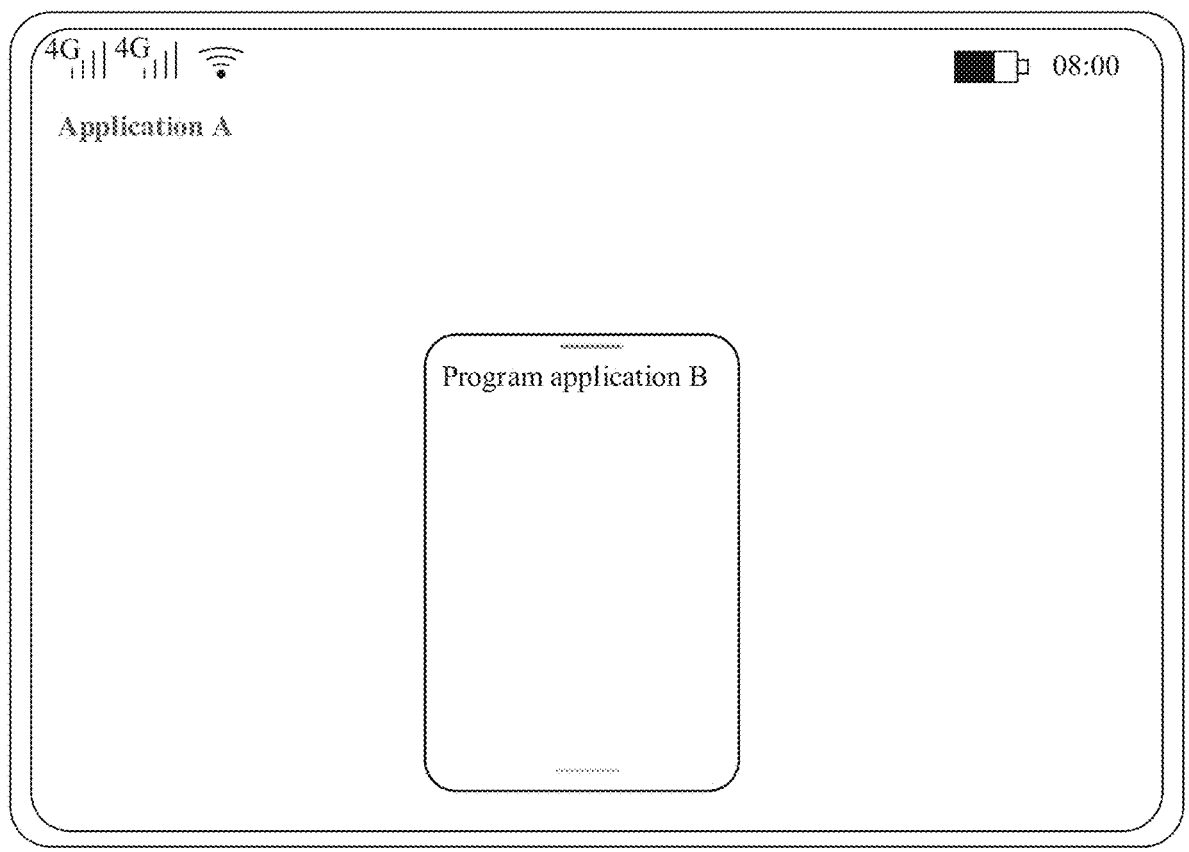

Based on the user interface, shown in FIG. 4J, in which the electronic device 100 displays the application A in full screen and displays the application B in a form of a floating window, assuming that the user wants to scale the floating window, a specific implementation method therefor is as follows:

FIG. 5N-FIG. 5P show an example method in which the electronic device moves a display location of a floating window.

As shown in FIG. 5N, the electronic device 100 displays the interface 11 of the application A in full screen, and displays the interface 21 of the application B in a floating state. The interface 21 displays the bottom Bar 201 and the top Bar 202. A user interface shown in FIG. 5N is the same as the user interface shown in FIG. 3D. Details are not described herein again. In some other embodiments of this application, when an application is displayed in a floating state, the floating window does not display the bottom Bar 201.

Figure 5Q:
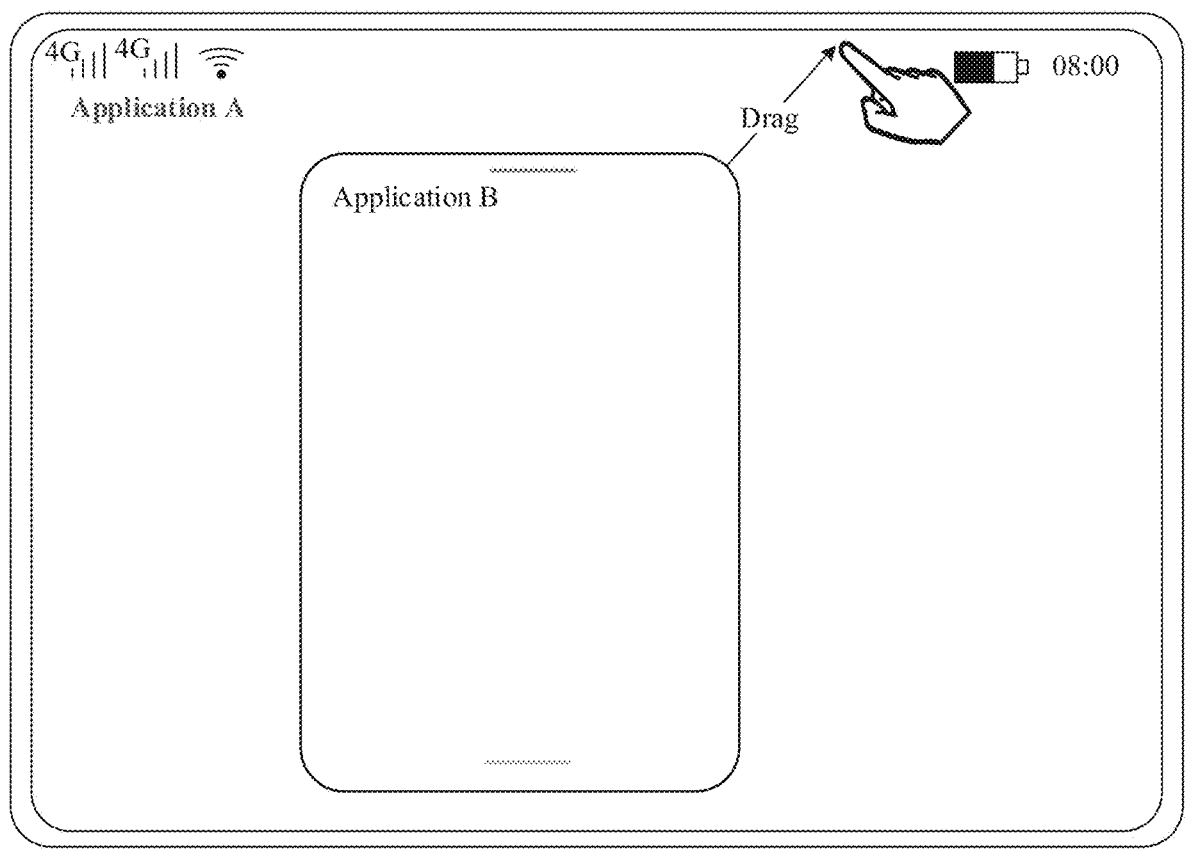
Figure 5R:
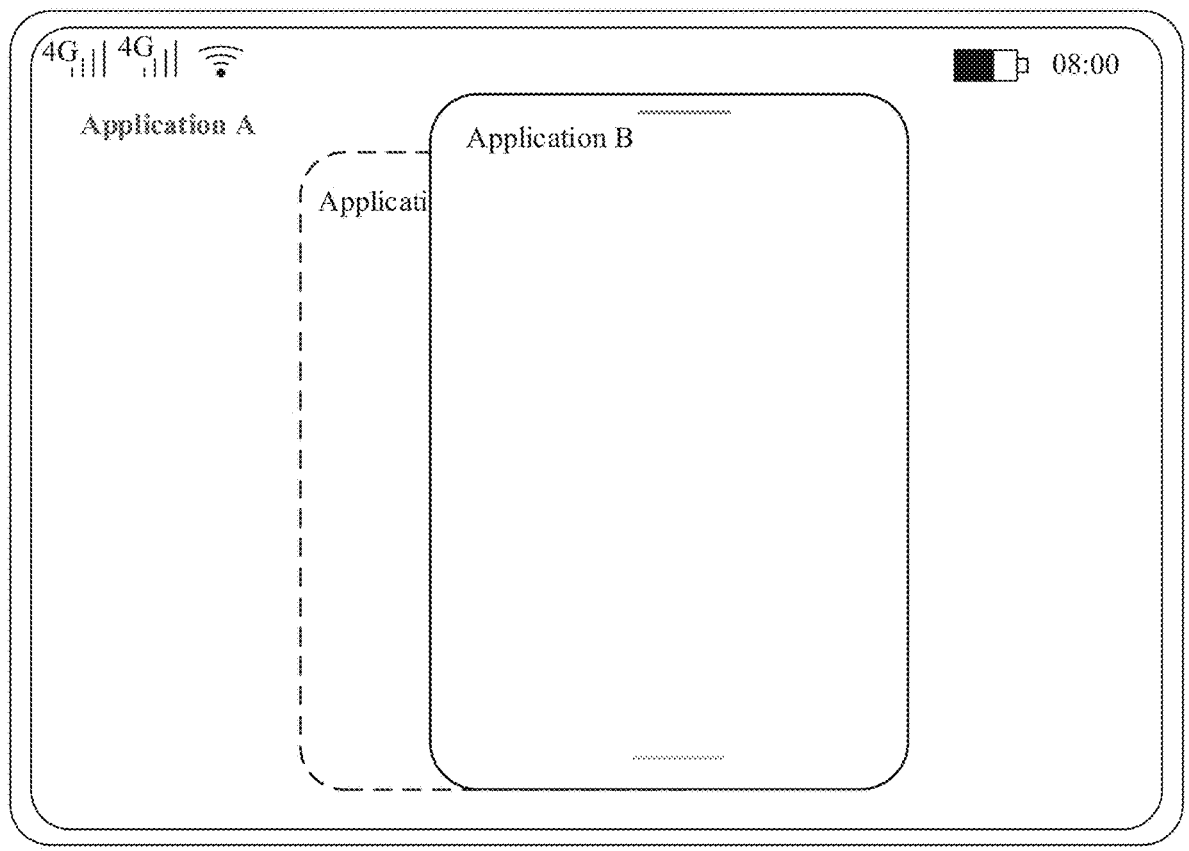
Figure 5S:
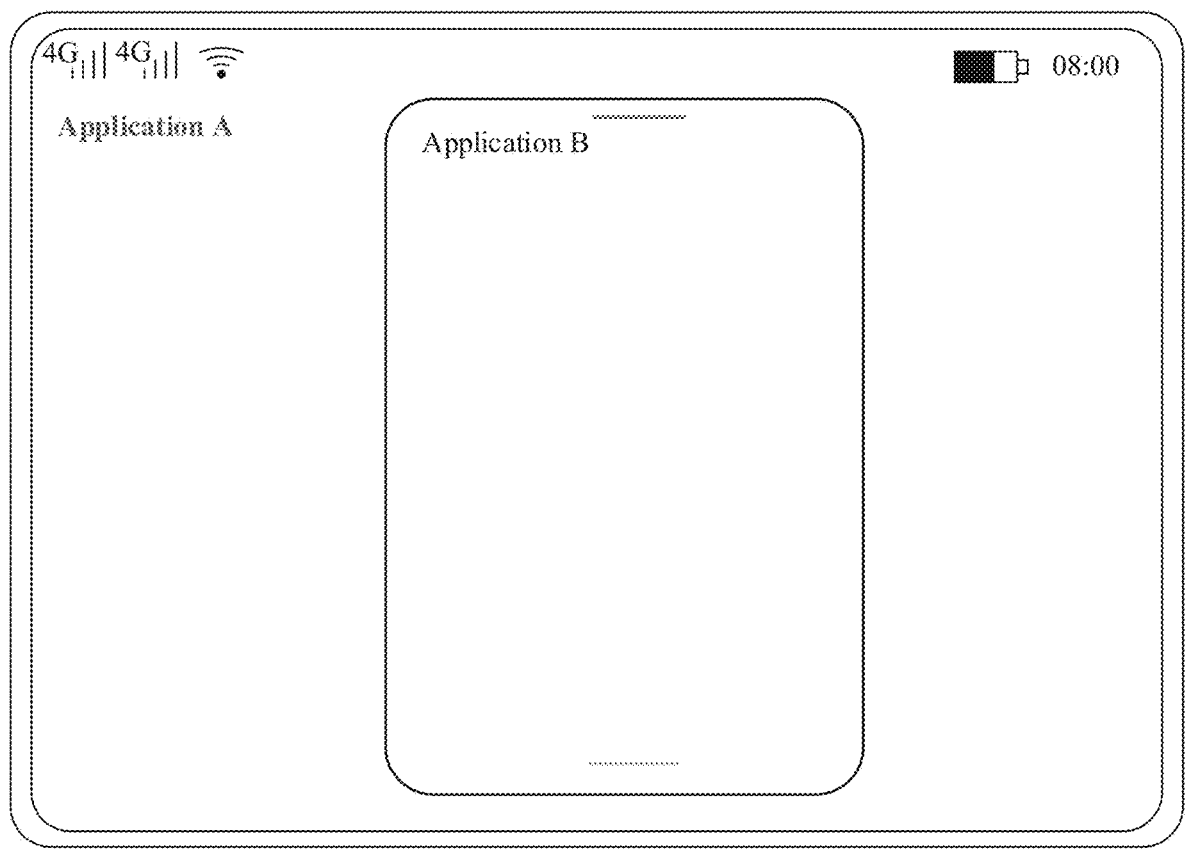

The electronic device 100 may detect, in the user interface shown in FIG. 5N, an operation that is input by the user and that is of sliding from any one of four corners of the interface 21 to an opposite corner. In response to the operation, the electronic device may scale down a display area of the interface 21. For details, refer to FIG. 5N-FIG. 5P. Alternatively, the electronic device 100 may detect an operation that is input by the user and that is of sliding from any one of four corners of the interface 21 in a direction away from an opposite corner. In response to the operation, the electronic device may scale up a display area of the interface 21 of the application. For details, refer to FIG. 5Q-FIG. 5S.

It should be noted that when the electronic device 100 expands, in the interface shown in FIG. 5N, the control 202A, the control 202B, and the control 202C that are collected in the top Bar 202, if the electronic device 100 detects the operation used to change the display location of the floating application B, or detects the operation used by the electronic device 100 to change the display area of the floating application B, or detects an operation performed on a region outside the interface 21, the electronic device 100 may retract the controls 202A, 202B, and 202C into the top Bar 202, in other words, the controls 202A, 202B, and 202C are not displayed in the interface 21.

Figure 5T:
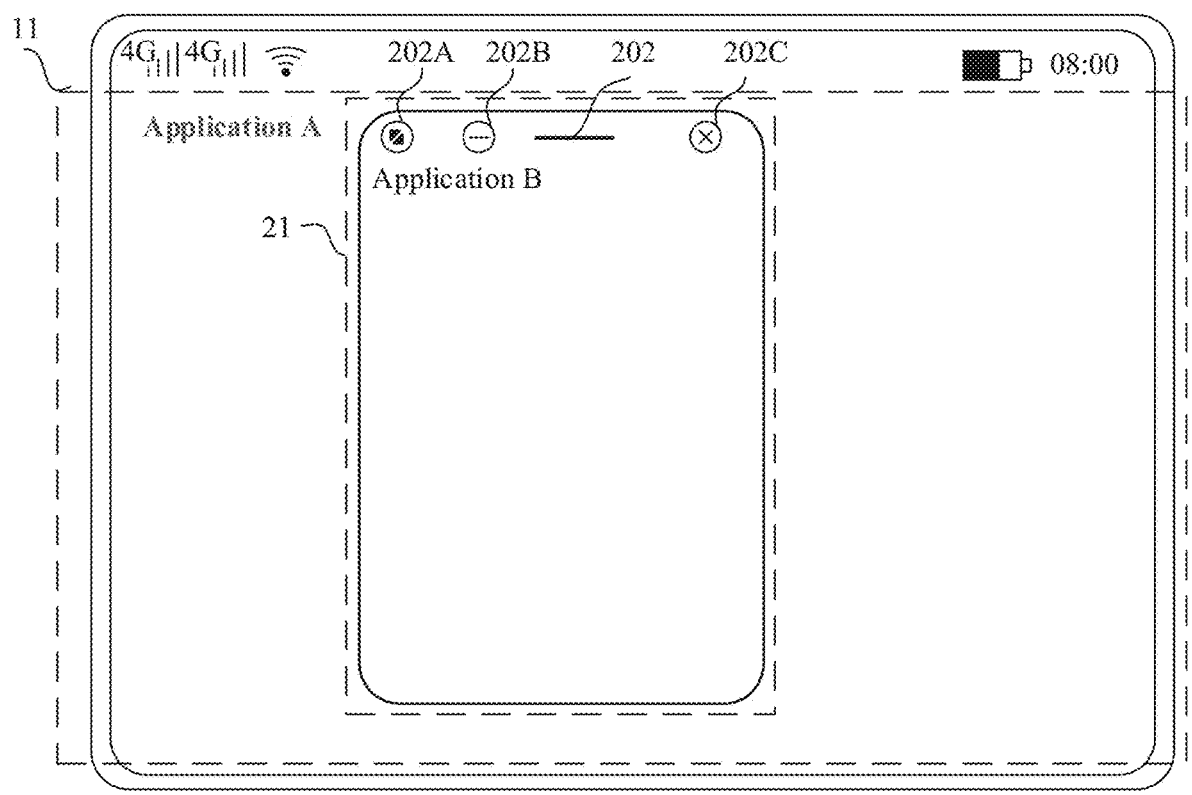

In some other embodiments of this application, when the electronic device displays an interface of an application in a floating window, the specific display form is shown in FIG. 5T.

As shown in FIG. 5T, the floating window displays the user interface of the application B, and the floating window directly displays the top Bar 202, the control 202A, the control 202B, and the control 202C. The control 202A is configured to switch the application B from a floating window to a full-screen display form. The control 202B is configured to switch an application from a floating window to a form of a floating ball for display. The control 202C is configured to close the floating window, in other words, stop running the application.

Figure 5U:
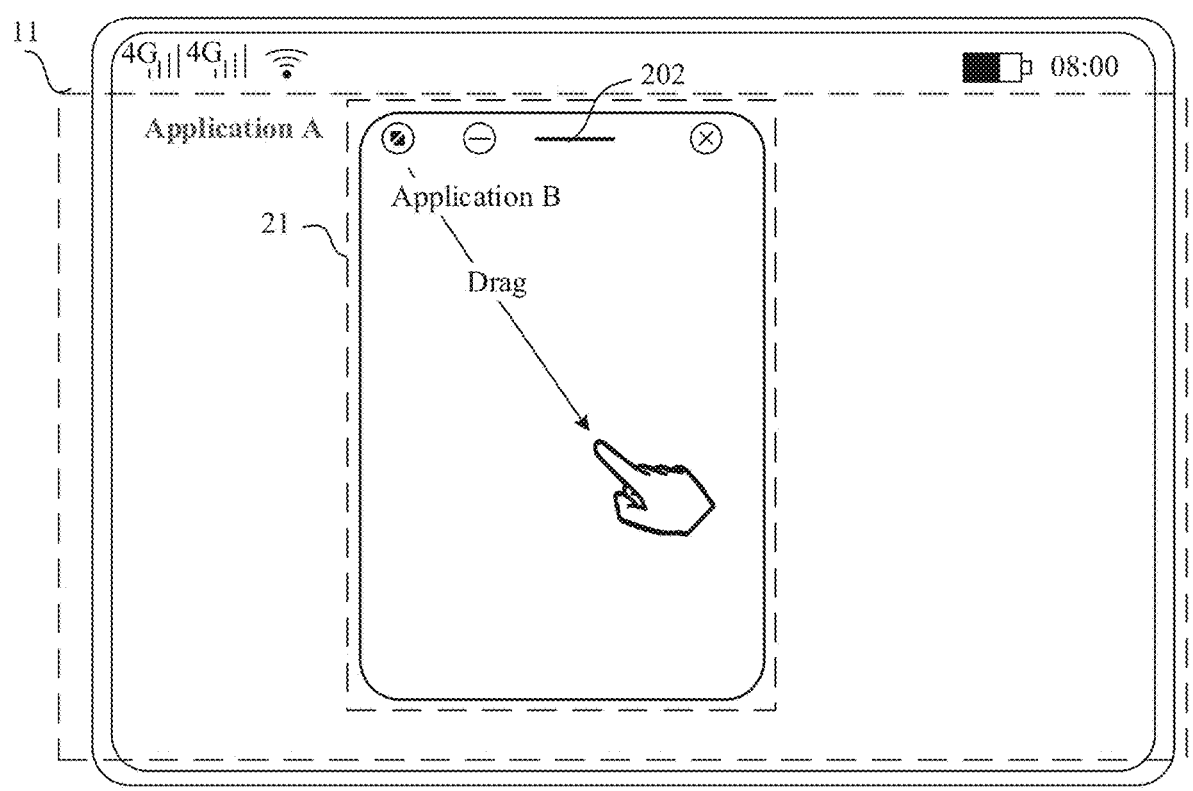

Based on a user interface shown in FIG. 5T, the electronic device may detect an operation of sliding from an upper right corner of the floating window to an opposite corner shown in FIG. 5U. In response to the operation, the electronic device displays a user interface shown in FIG. 5V.

Figure 5V:
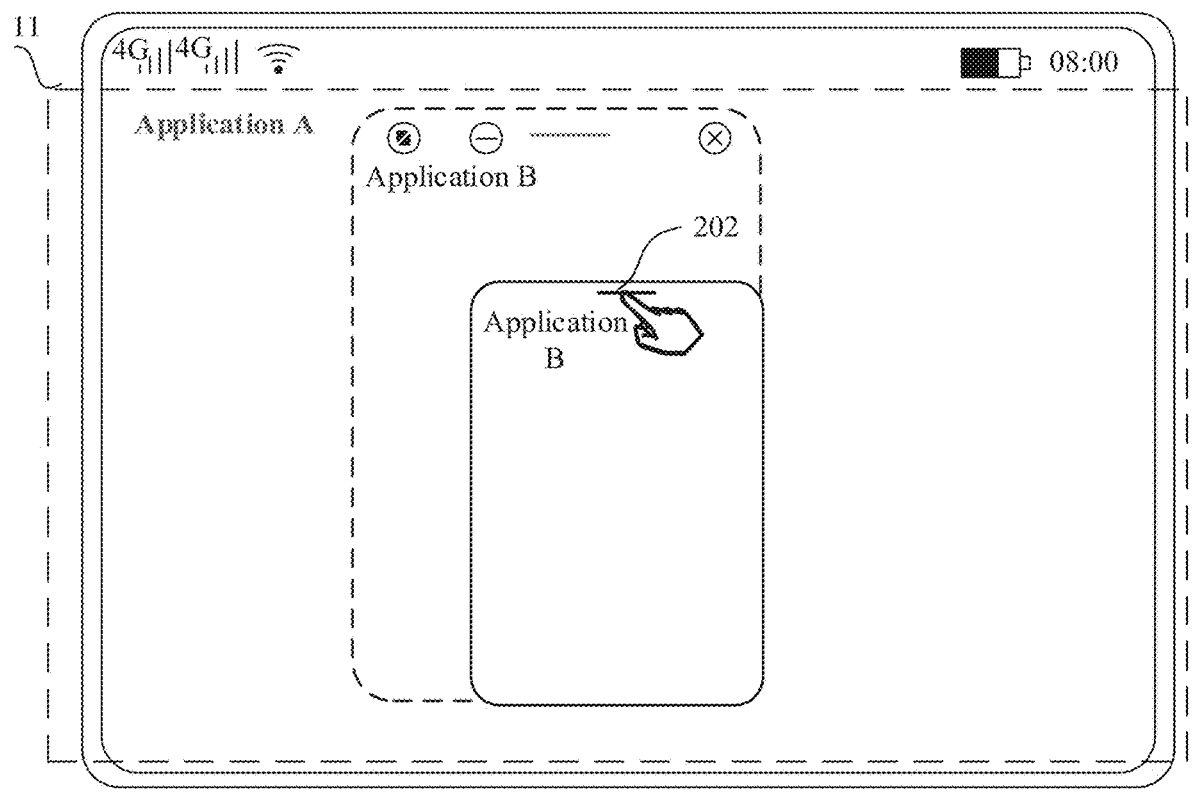

As shown in FIG. 5V, the electronic device scales down a display area of the floating window, stops displaying the control 202A, the control 202B, and the control 202C, and retracts the control 202A, the control 202B, and the control 202C into the top bar 202. The electronic device may detect an operation of tapping the top bar 202 by the user, and in response to the operation, the electronic device displays a user interface shown in FIG. 5W.

Figure 5W:
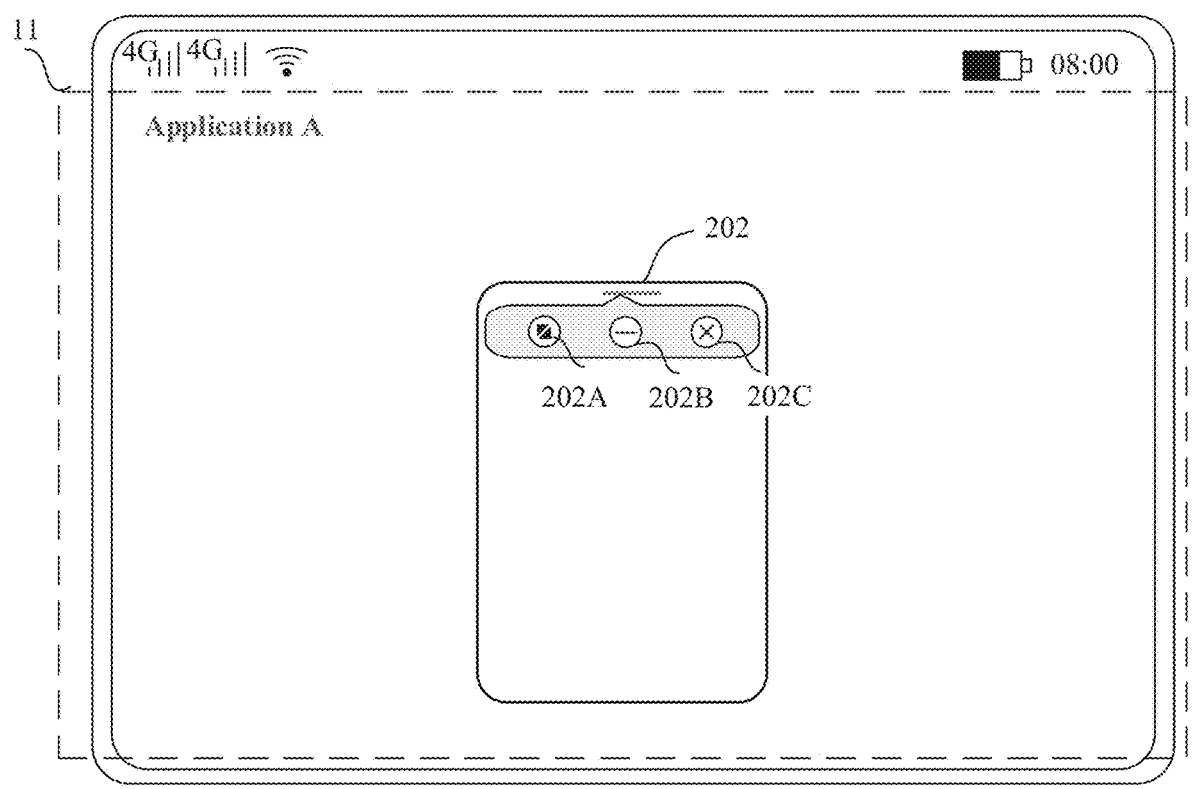

As shown in FIG. 5W, the electronic device displays the control 202A, the control 202B, and the control 202C through expansion.

FIG. 6A-FIG. 6J show an example method in which the electronic device switches an application in a floating window.

Based on the user interface shown in FIG. 5H, assuming that a minimization operation is to be performed on an application after the user inputs an operation used to trigger the electronic device to display the application by using a floating window, the electronic device switches the application to the background for running, stops displaying an interface of the application in the floating window, and displays an icon of the application in a form of a floating ball. Assuming that after the user repeatedly performs an operation of displaying an application in a floating state and then displaying the application in a minimized form, the electronic device sequentially switches the applications displayed in a floating state to the background, and sequentially displays icons of the applications in a form of a floating ball through superimposition.

Figure 6A:
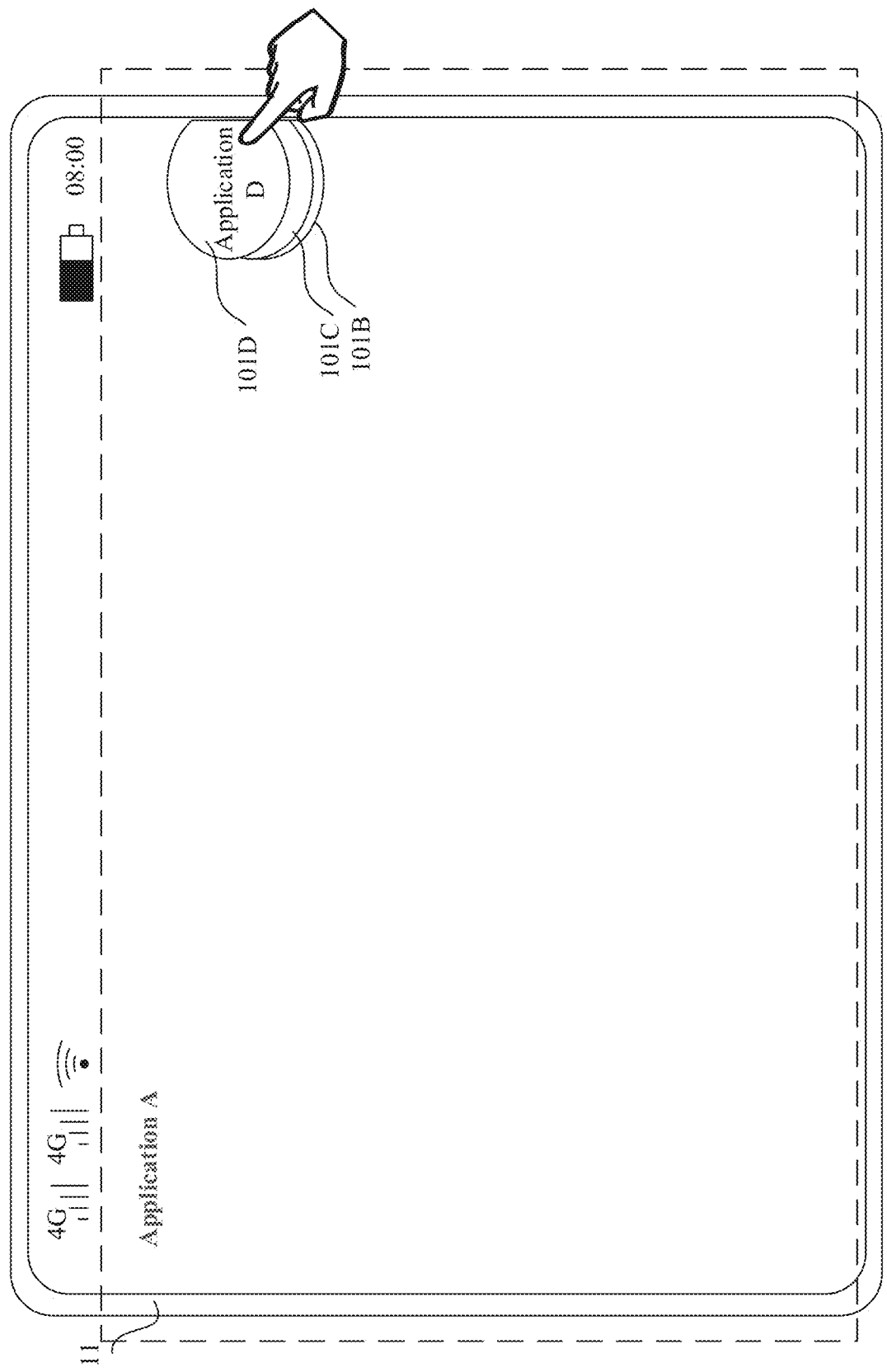

As shown in FIG. 6A, the electronic device 100 displays the floating ball icon 101B, the floating ball icon 101C, and the floating ball icon 101D. The electronic device sequentially performs a minimization operation in a positioning sequence of the application B, the application C, and the application D. Therefore, a sequence in which the floating ball icon 101B, the floating ball icon 101C, and the floating ball icon 101D are displayed through superimposition is the floating ball icon 101B, the floating ball icon 101C, and the floating ball icon 101D. In other words, the floating ball icon 101C is displayed in a manner of being superimposed on the floating ball icon 101B, and the floating ball icon 101D is displayed in a manner of being superimposed on the floating ball icon 101C.

The electronic device may detect, in a user interface shown in FIG. 6A, an operation of tapping the floating ball icon 101D by the user. In response to the operation, the electronic device displays a user interface shown in FIG. 6B.

Figure 6B:
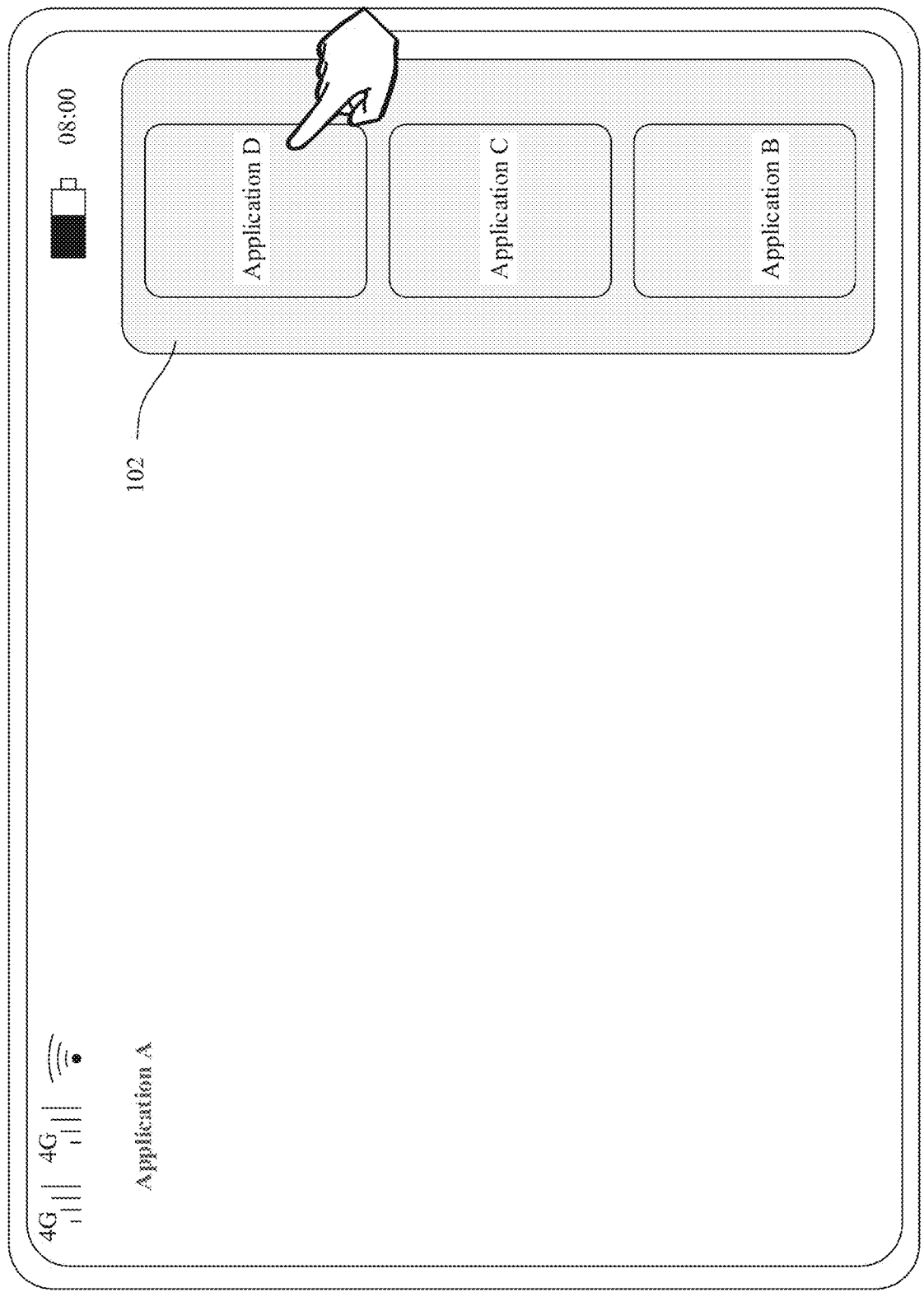

As shown in FIG. 6B, the electronic device 100 displays the historical application window 102 through expansion, and the historical application window 102 displays interface thumbnails of applications that are recently displayed by using floating windows and on which the minimization operation is performed, for example, interface thumbnails of the application D, the application C, and the application B.

In some embodiments of this application, display locations of the interface thumbnails of the applications may be sequentially displayed from the bottom to the top of the historical application window 102 based on a chronological sequence of performing the minimization operation on the applications. In other words, an interface thumbnail of an application on which the minimization operation is last performed is displayed at the topmost location. With reference to FIG. 6B, the application D is an application corresponding to a floating window on which the electronic device performs the minimization operation last. The minimization operation is performed on the application B, the application C, and the application D based on a chronological sequence.

In some other embodiments of this application, display locations of the interface thumbnails of the applications may be sequentially displayed from the top to the bottom of the historical application window 102 based on a chronological sequence of performing the minimization operation on the applications. This is not limited in this embodiment of this application.

FIG. 6C-FIG. 6F show an example method in which the electronic device switches an application displayed in a floating window.

Figure 6C:
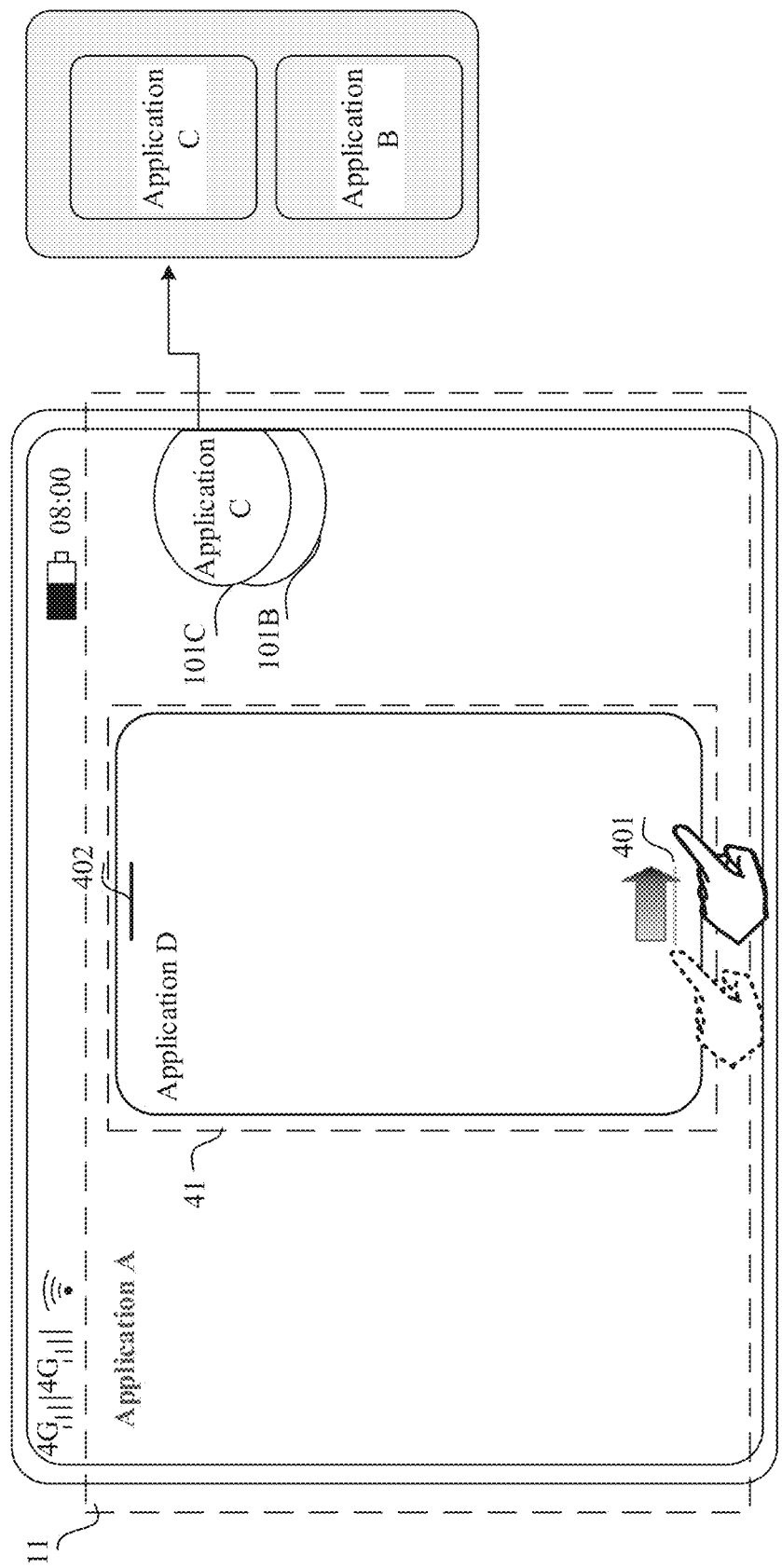

As shown in FIG. 6C, the electronic device 100 displays, in a form of a floating window, an interface 41 provided by the application D. The interface 41 displays a bottom Bar 401 and a top Bar 402. It should be noted that in this case, the floating ball icon 101C is displayed in a manner of being superimposed on the floating ball icon 101B.

The electronic device 100 detects a rightward sliding operation performed by the user on the bottom Bar 401 in the interface 41 shown in FIG. 6C. In response to the operation, the electronic device 100 displays a user interface shown in FIG. 6D.

Figure 6D:
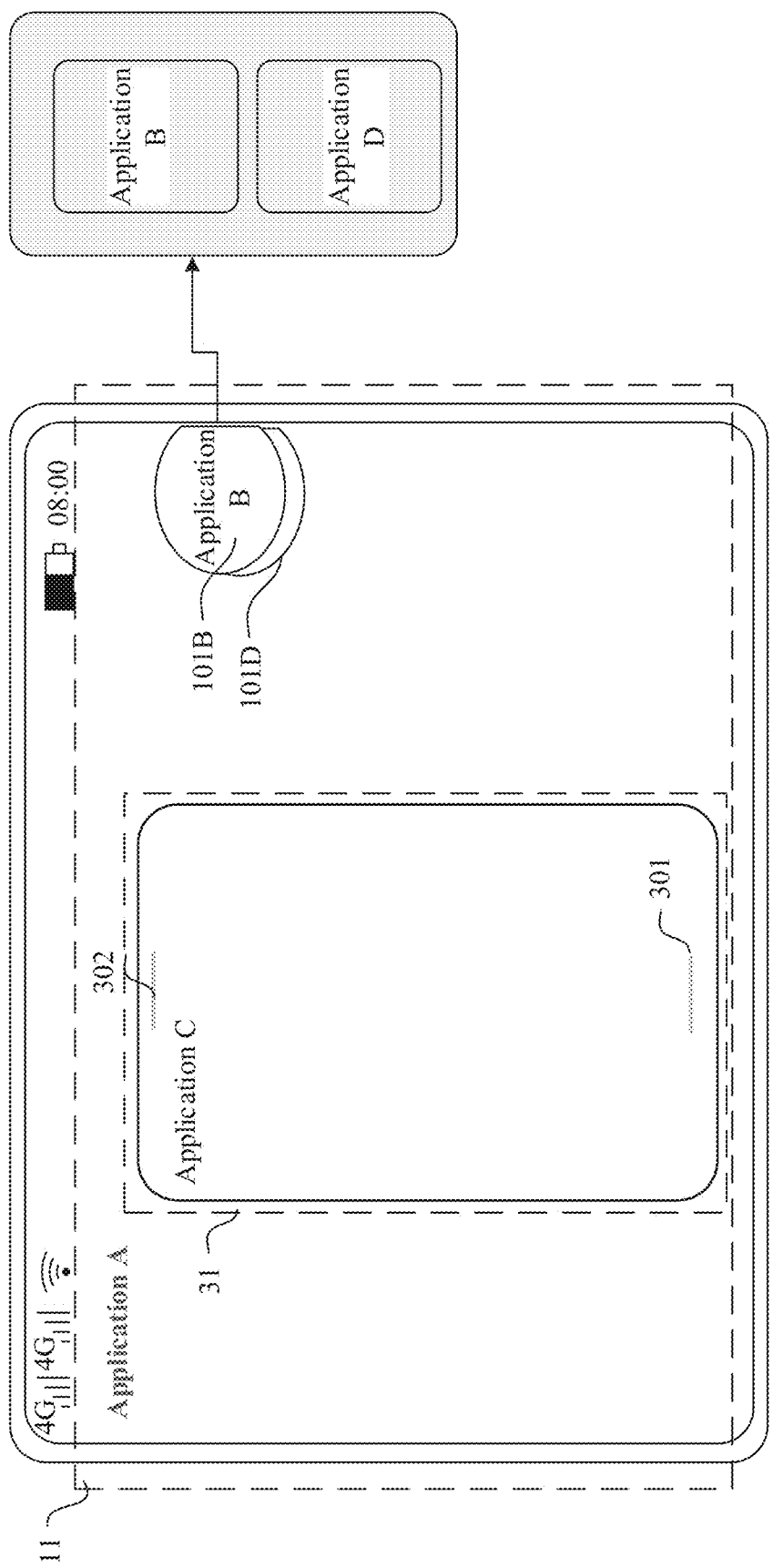

The electronic device 100 may switch the interface 41 of the application D previously displayed in the floating window in FIG. 6C to the interface 31 of the application C shown in FIG. 6D, and stop displaying the floating ball icon 101C. The floating ball icon 101B is displayed in a manner of being superimposed on the floating ball icon 101D.

In addition, in this case, the electronic device 100 does not expand the floating ball icons into the historical application window 102, but content of interface thumbnails of applications in the floating historical application window 102 has changed. Specifically, in response to the rightward sliding operation performed on the bottom Bar 401 shown in FIG. 6C, the electronic device 100 stops displaying an interface thumbnail of a switched-to application, namely, the application C, in the historical application window 102, displays an interface thumbnail of a switched application, namely, the application D, at the bottommost location of the historical application window 102, and sequentially moves interface thumbnails of other applications, for example, the application B, that are not switched in the historical application window 102 toward the top in a counterclockwise direction indicated by an arrow shown in FIG. 6C.

Specifically, when the electronic device 100 detects a further rightward sliding operation performed on the bottom Bar shown in FIG. 6D, the electronic device displays the interface 21 of the application B in a form of a floating window, stops displaying an interface thumbnail of the application B in the historical application window 102, displays an interface thumbnail of the application C at the bottommost location of the historical application window 102, and sequentially moves interface thumbnails of other applications, for example, the application D, toward the top by one location.

Figure 6E:
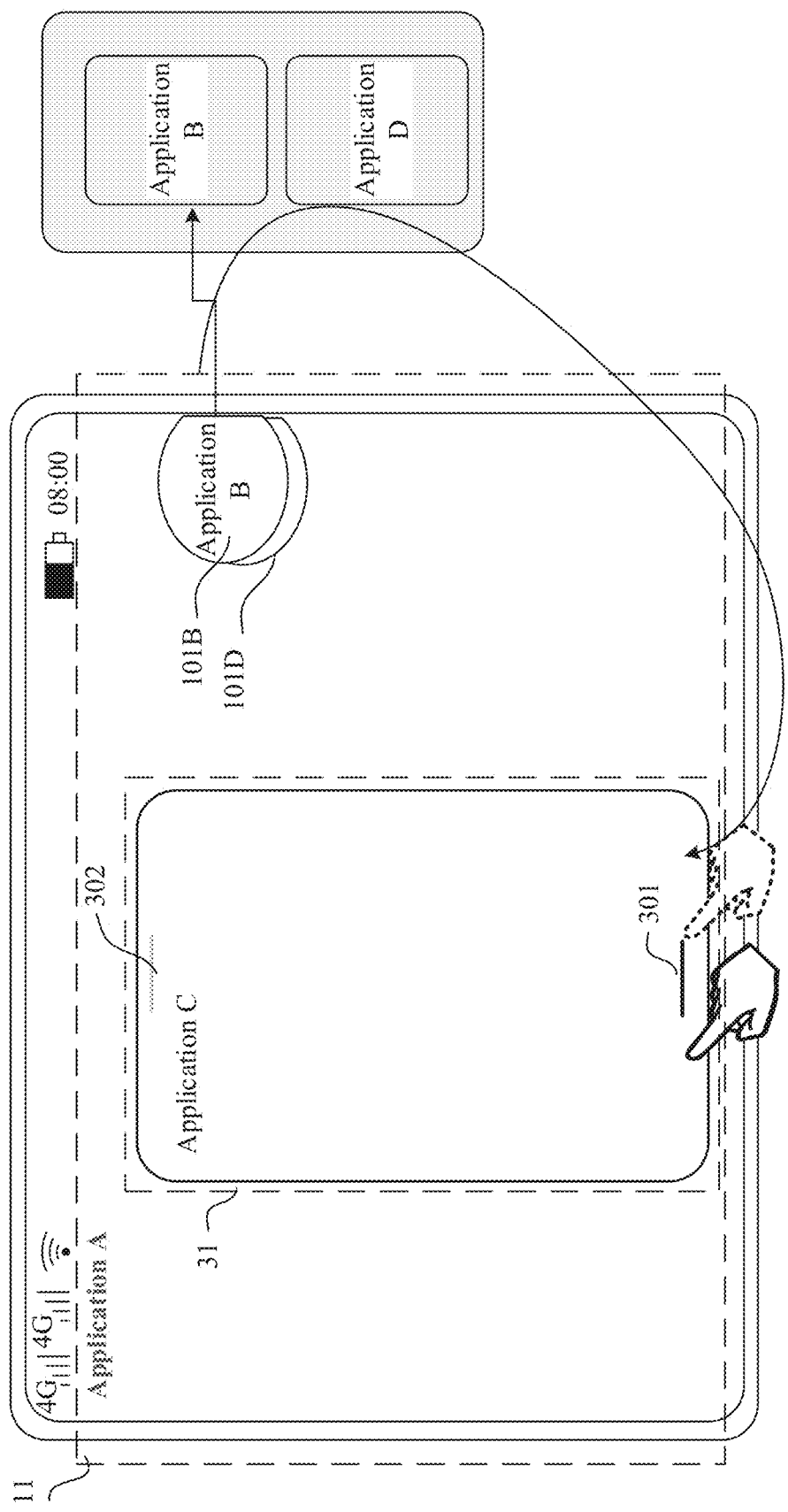

Based on the user interface, shown in FIG. 6D, in which the electronic device 100 displays the application A in full screen and displays the application C by using a floating window, assuming that the user wants to switch the application C displayed in the floating window to the application D previously displayed in FIG. 6A, a specific implementation method therefor is as follows:

As shown in FIG. 6E, the electronic device 100 may detect a leftward sliding operation performed by the user on the bottom Bar 401 in the interface 31. In response to the operation, the electronic device 100 displays a user interface shown in FIG. 6F.

Figure 6F:
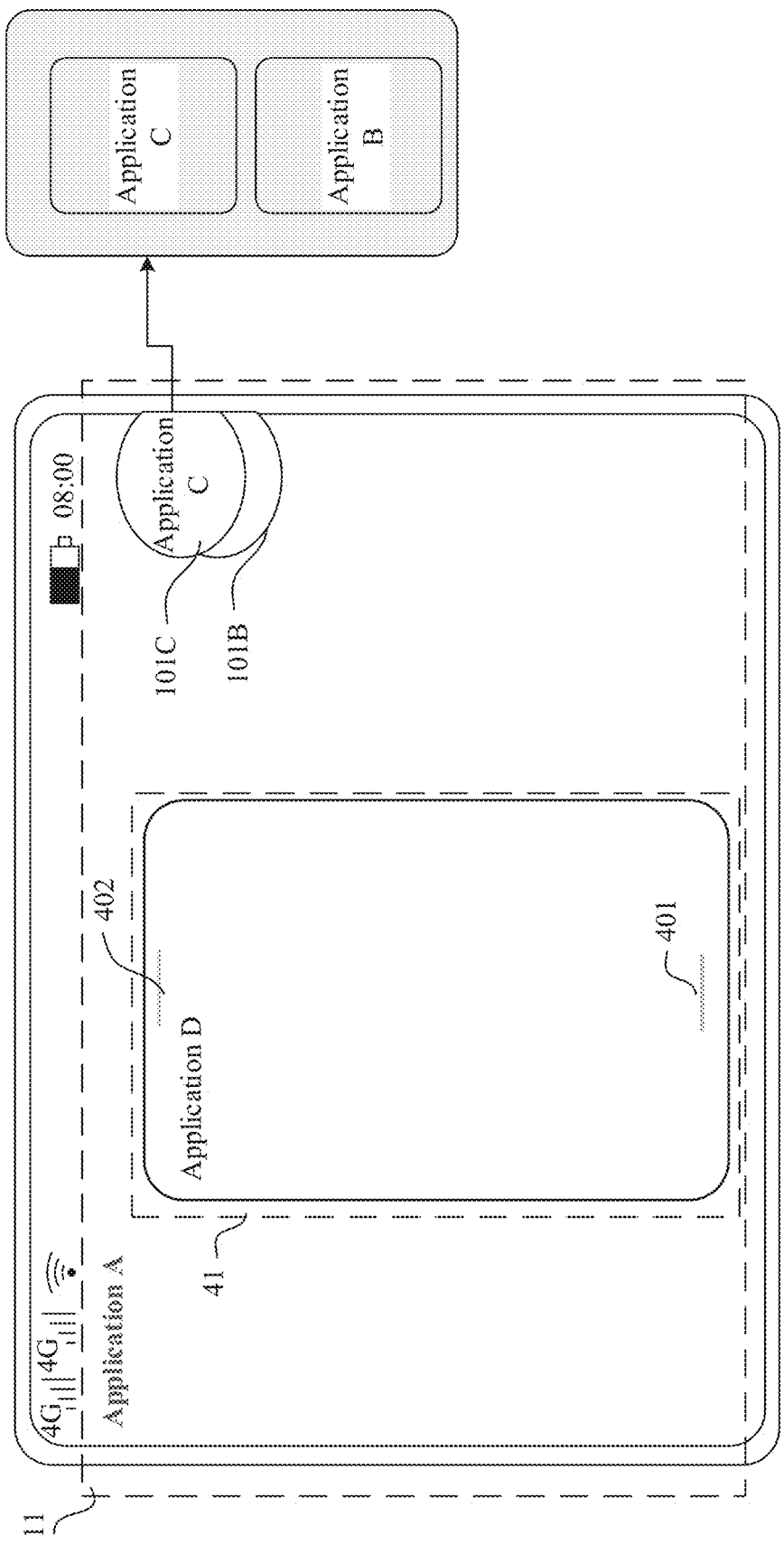

As shown in FIG. 6F, the electronic device 100 may switch the interface 31 of the application C displayed in the floating window to the interface 41 of the application D last displayed by using a floating window before the application C, and stop displaying the floating ball icon 101D. The floating ball icon 101C is displayed in a manner of being superimposed on the floating ball icon 101B.

In addition, in this case, the electronic device 100 does not expand the floating ball icons into the historical application window 102, but content of interface thumbnails of applications in the floating historical application window 102 has changed. Specifically, in response to the rightward sliding operation performed on the bottom Bar 301 shown in FIG. 6E, the electronic device 100 stops displaying an interface thumbnail of a switched-to application, namely, the application D, in the historical application window 102, displays an interface thumbnail of a switched application, namely, the application C, at the topmost location of the historical application window 102, and sequentially moves interface thumbnails of other applications, for example, the application B, that are not switched in the historical application window 102 to the bottom in a clockwise direction indicated by an arrow shown in FIG. 6E.

According to the switching method described above, when the user wants to browse back and forth between two applications, and perform continuous and fast switching, the user may input a leftward sliding or rightward sliding operation on the bottom Bar, to implement fast switching of an application displayed in a floating window. In this switching method, it is feasible to switch an application displayed in a floating window back and forth by using only a one-step operation, and therefore, the switching operation is smoother and more efficient, operation burden of the user is reduced, an experience requirement of the user is met, and user experience is improved.

It may be understood that an implementation method for switching, by the electronic device 100, back and forth between a plurality of applications recently displayed in a floating state is not limited to the method described in FIG. 6C-FIG. 6F. An embodiment of this application further provides another switching method, which is specifically as follows:

FIG. 6G-FIG. 6J show another example method in which the electronic device switches an application displayed in a floating window.

Figure 6G:
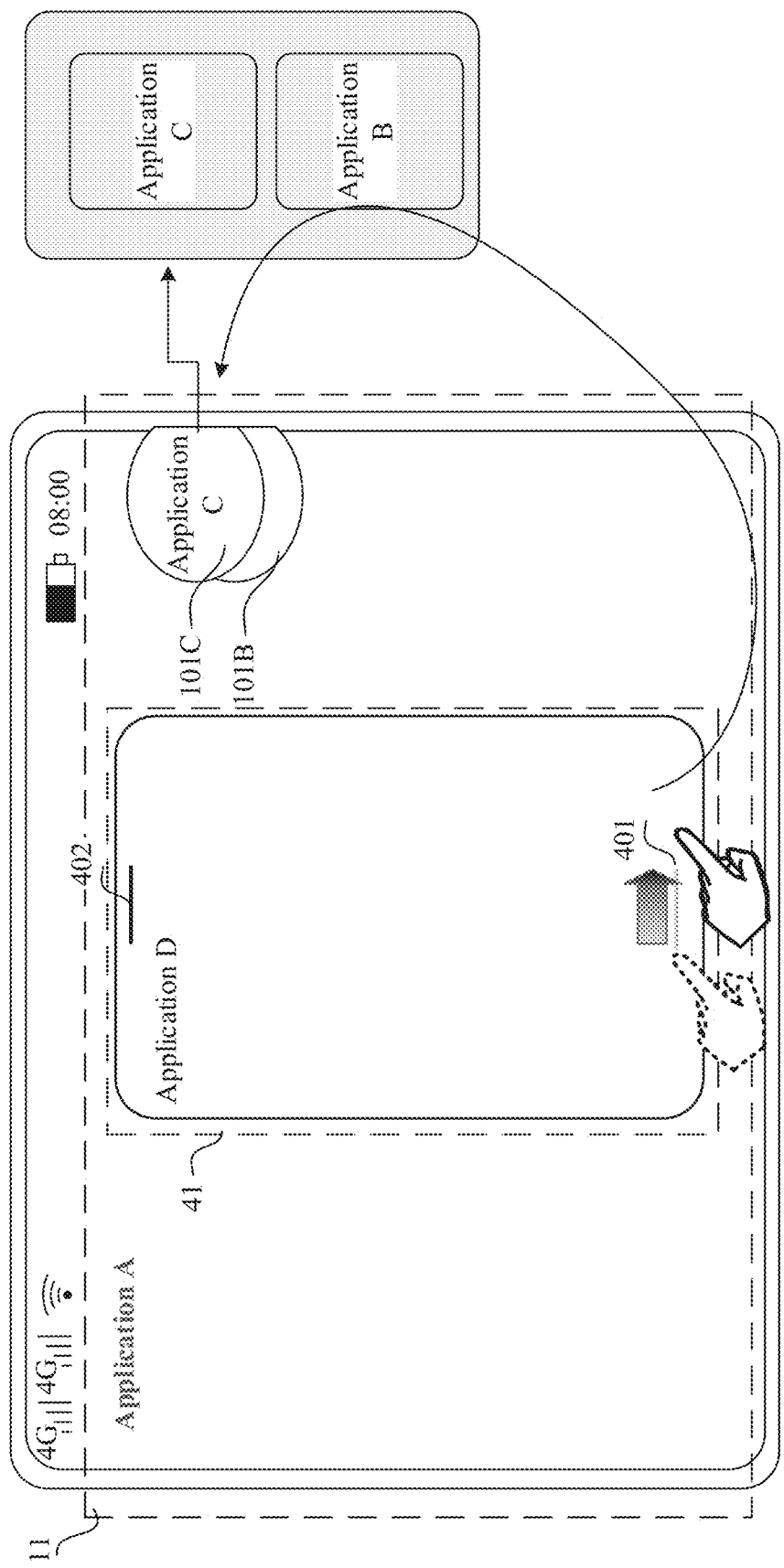

As shown in FIG. 6G, the electronic device 100 detects a rightward sliding operation performed by the user on the bottom Bar 401 in the interface 41. In response to the operation, the electronic device 100 displays a user interface shown in FIG. 6H.

Figure 6H:
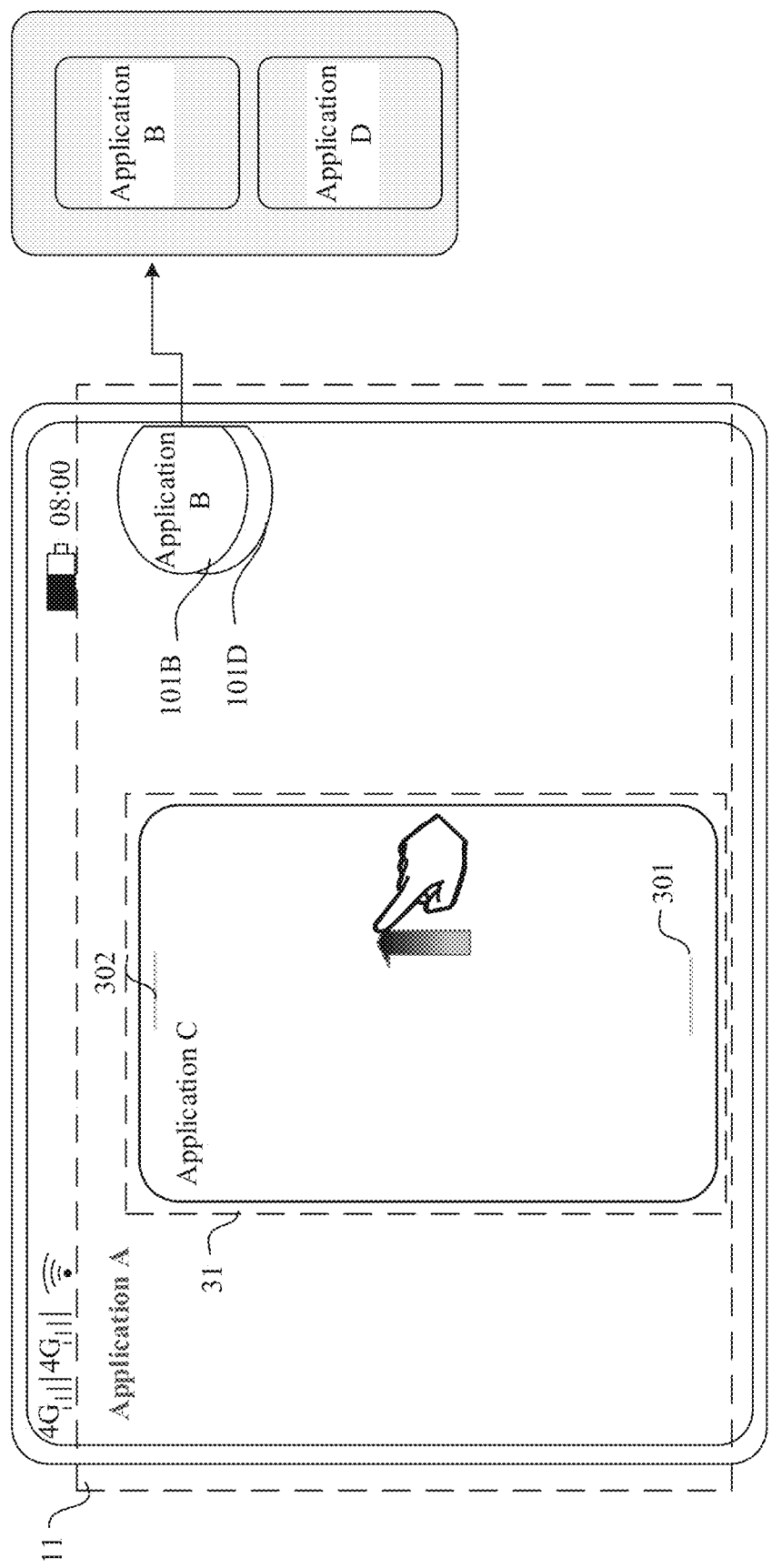
Figure 61:
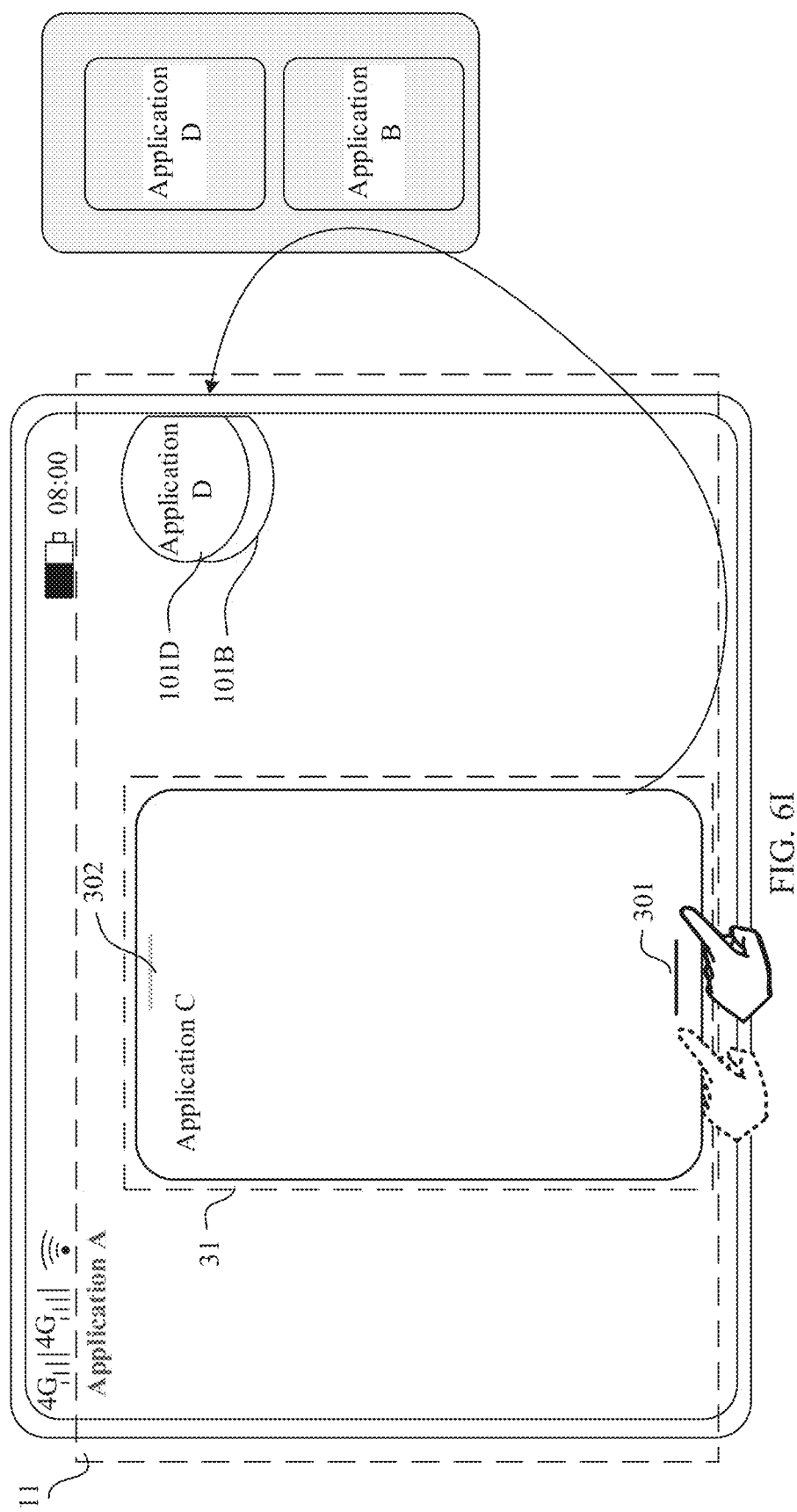

As shown in FIG. 6H, the electronic device 100 may switch the interface 41 of the application D displayed in the floating window to the interface 31 of the application C, and stop displaying the floating ball icon 101D. The floating ball icon 101B is displayed in a manner of being superimposed on the floating ball icon 101C.

In addition, in this case, the electronic device 100 does not expand the floating ball icon 101C and the floating ball icon 101B into the historical application window 102, but content of interface thumbnails of applications in the floating historical application window 102 has changed. Specifically, in response to the rightward sliding operation performed on the bottom Bar 401 shown in FIG. 6C, the electronic device 100 stops displaying an interface thumbnail of a switched-to application, namely, the application C, in the historical application window 102, displays an interface thumbnail of a switched application, namely, the application D, at the bottommost location of the historical application window 102, and sequentially moves interface thumbnails of other applications, for example, the application B, that are not switched in the historical application window 102 to the top in a counterclockwise direction indicated by an arrow shown in FIG. 6G.

Based on the user interface, shown in FIG. 6H, in which the electronic device 100 displays the application A in full screen and displays the application C by using a floating window, assuming that the user does not continuously switch an application as described in FIG. 6C-FIG. 6F, in other words, the user wants to input an operation, for example, an operation used to slide the interface 31 or an operation of tapping a control provided by the application C, in the interface 31 in which the application C is displayed, or a time for which the user browses the interface exceeds a first threshold, the electronic device changes a display location of an interface thumbnail of an application in the historical application window 102. For details, refer to FIG. 6I.

As shown in FIG. 6I, the electronic device 100 performs switching from superimposing the floating ball icon 101B on the floating ball icon 101D for display in FIG. 6H to superimposing the floating ball icon 101D on the floating ball icon 101B for display, and in the window 102, moves a thumbnail of the application D to the top, and sequentially moves interface thumbnails of original other applications, for example, the interface thumbnail of the application B, toward the bottom by one location. It should be noted that in a user interface shown in FIG. 6J, the electronic device 100 does not display the historical application window 102 through expansion, and the electronic device 100 needs to detect an operation of tapping a floating ball icon by the user, to display the historical application window 102 through expansion.

Based on the user interface shown in FIG. 6I, in this case, if the user wants to switch the application C displayed in the floating window to the application D displayed in FIG. 6G, a specific implementation method therefor is as follows:

As shown in FIG. 6I, the electronic device 100 may detect a rightward sliding operation performed by the user on the bottom Bar 301 in the interface 31. In response to the operation, the electronic device 100 displays a user interface shown in FIG. 6J.

Figure 6J:
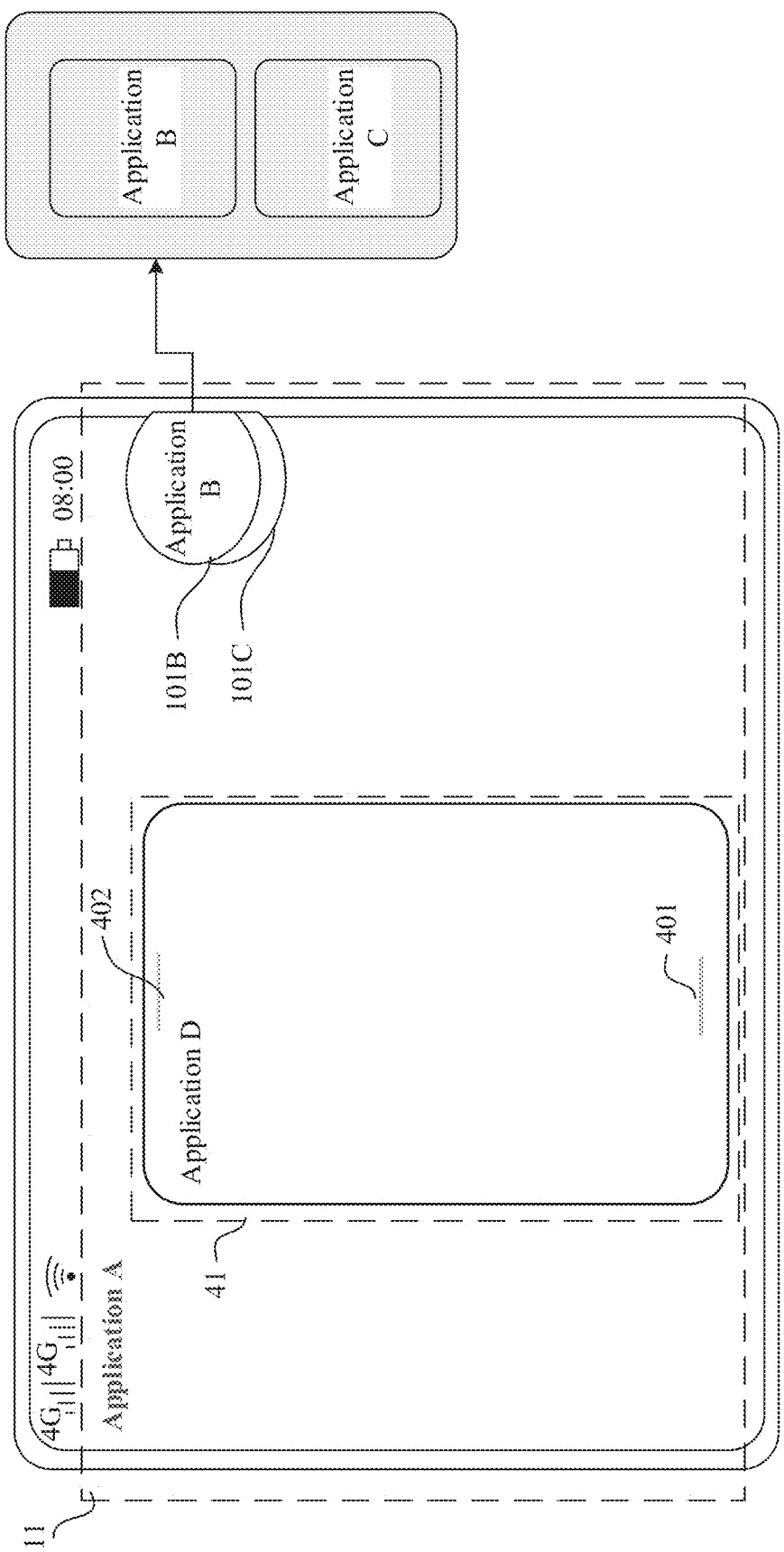

As shown in FIG. 6J, the electronic device 100 may switch the application C in FIG. 6I to the application D that is in the window 102 and that is last displayed by using a floating window, and display the application C in a minimized form, in other words, display the floating ball icon 101C. The floating ball icon B is displayed in a manner of being superimposed on the floating ball icon C. In this case, the interface thumbnail of the application C is displayed at the bottommost location of the historical application window 102 expanded from the floating ball icon. It should be noted that in the user interface shown in FIG. 6J, the electronic device 100 does not display the historical application window 102 through expansion, and the electronic device 100 needs to detect an operation of tapping a floating ball icon by the user, to display the historical application window 102 through expansion.

It may be understood that in the another switching method described in FIG. 6G-FIG. 6J, the operation used to switch an application is not limited to a rightward sliding operation, and may be a leftward sliding operation. It should be noted that when the user inputs a leftward sliding operation in FIG. 6G, the application to which the electronic device 100 performs switching in FIG. 6H is the application B, and the interface thumbnail of the application D is displayed at the topmost location of the historical application window 102. Then, when the electronic device 100 detects an operation performed on the application B, the electronic device 100 may change a display location of the interface thumbnail of the application D to the bottommost location of the window 102. In this case, when the user inputs a leftward sliding operation again, the electronic device 100 may switch the application D to a floating window for display.

After the another switching method described above is implemented, the electronic device 100 considers an operation habit of the user. To be specific, when the user wants to switch back and forth between two applications, but habitually inputs one switching operation, for example, always inputs a rightward sliding operation or always inputs a leftward sliding operation. In other words, when the electronic device 100 first displays the application D, and then switches to the application C based on a rightward sliding operation input by the user, after the user has used the application C for a period of time and wants to switch back to the application D, the user may continue to input a rightward sliding operation because the user has forgotten a switching sequence or based on the habit of the user. In this case, because the electronic device 100 can determine, based on an operation that is input by the user and that is performed on the application C or when a time for which the user has browsed the application C exceeds a first threshold, that the user does not want to switch to a next application, namely, the application B, through continuous rightward sliding, the electronic device 100 may change, by default, the display location of the interface thumbnail of the application D last displayed in a floating state to the top of the historical application window 102. In this way, memory costs of the user can be reduced, so that the user can switch to the previous application D even when the user continues to input a same switching operation, namely, a rightward sliding operation, based on the habit.

FIG. 7A-FIG. 7E show another example method in which the electronic device switches an application displayed in a floating window.

Figure 7A:
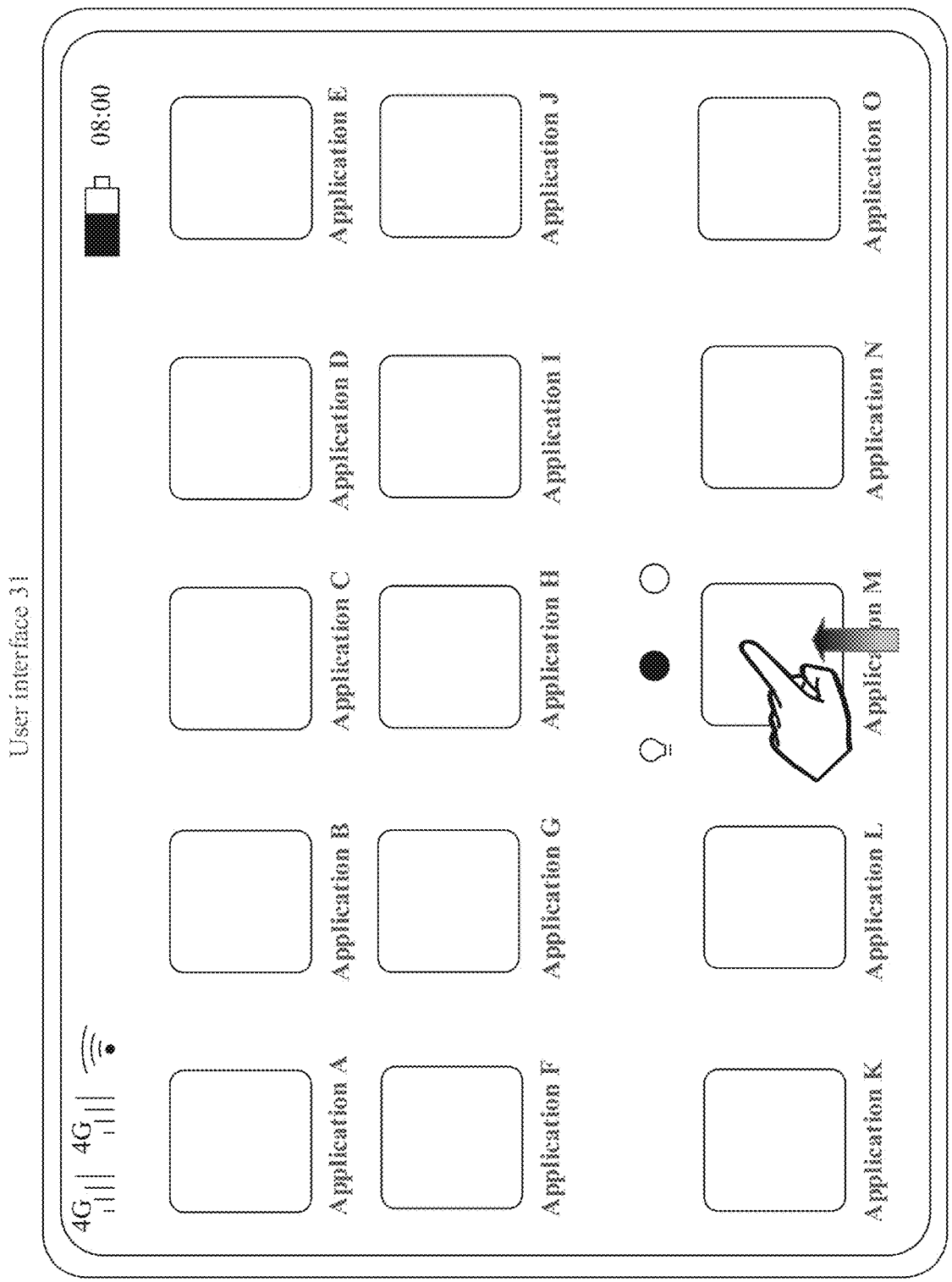
FIG. 7A-FIG. 7E are schematic diagrams of another group of user interfaces according to an embodiment of this application.

As shown in FIG. 7A, the electronic device 100 may detect, in the user interface 31, an operation that is input by the user and that is of sliding upward from a bottom side of the display screen and holding a hand without releasing a finger from the display screen. In response to the operation, the electronic device 100 displays a user interface shown in FIG. 7B. For descriptions of a user interface shown in FIG. 7A, refer to the foregoing descriptions of the user interface 31 shown in FIG. 3A. Details are not described herein again.

Figure 7B:
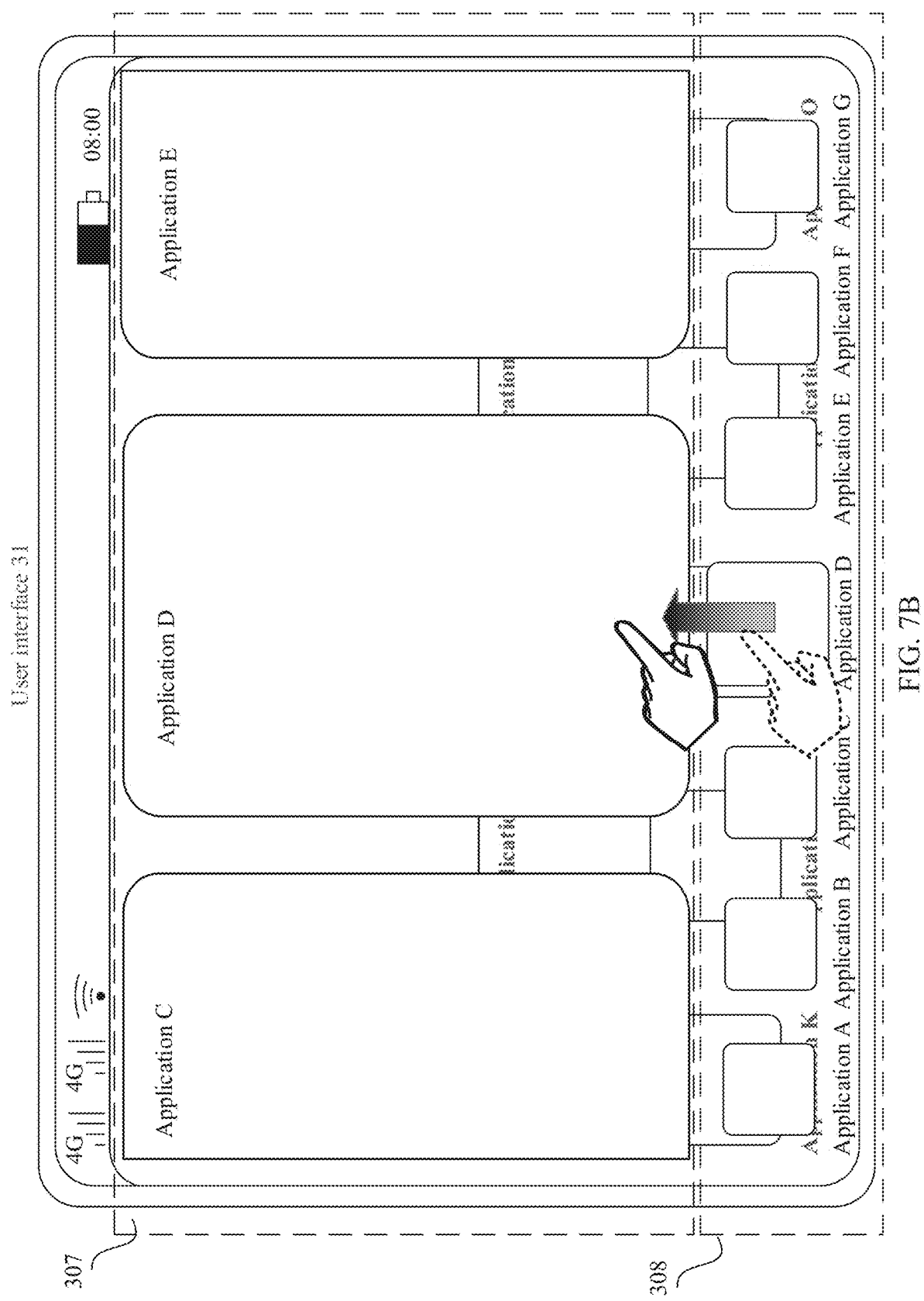

As shown in FIG. 7B, the electronic device 100 may display a multitasking bar 307 and a shortcut window bar 308 in the user interface 31. The multitasking bar 307 displays interface thumbnails separately provided by one or more applications. The electronic device 100 may display, based on a detected leftward sliding or rightward sliding operation of the user in a region of the multitasking bar 307, interface thumbnails provided by different applications.

Then the electronic device 100 may display, in full screen based on a detected operation of tapping any one of the interface thumbnails by the user, an application corresponding to the interface thumbnail. The shortcut window bar 308 displays icons separately corresponding to one or more applications, and shows that an icon of an application displayed in the middle of the display screen is selected by default. The electronic device 100 may browse, based on a detected leftward sliding or rightward sliding operation of the user in a region of the shortcut window bar 308, icons corresponding to different applications. Then the electronic device 100 may display, in full screen based on a detected operation of tapping any one of the icons by the user, an application corresponding to the icon.

Figure 7C:
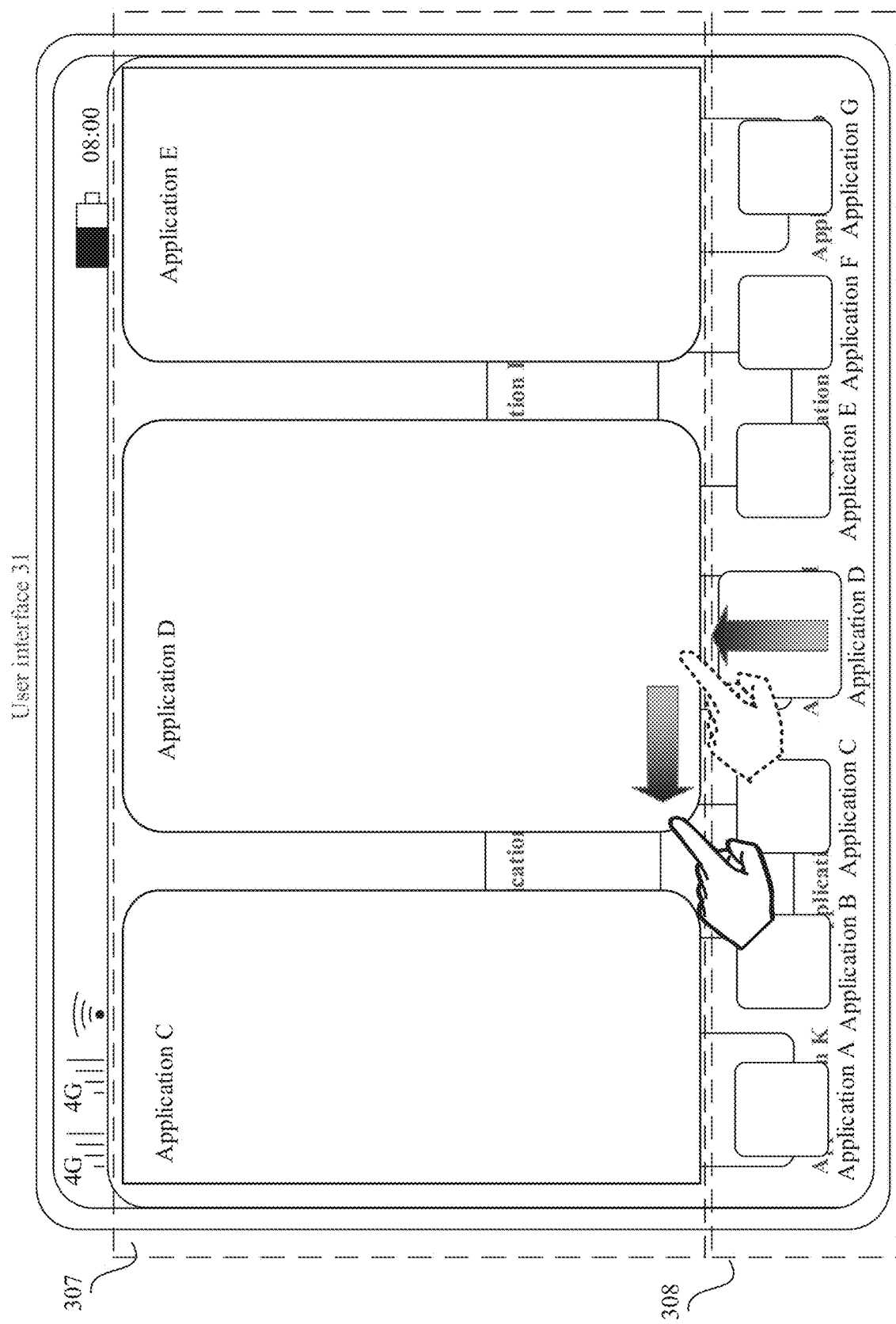

As shown in FIG. 7C, in this embodiment of this application, the electronic device 100 may further continue to input, in the region of the shortcut window bar 308 in a state of the operation that is input by the user, that is of sliding upward from the bottom side of the display screen and holding the hand without releasing the finger from the display screen, and that is shown in FIG. 7A, the leftward sliding or rightward sliding operation shown in FIG. 7C. The electronic device 100 may enable, depending on whether the user performs leftward sliding or rightward sliding, an icon of an application to move toward the left or the right to change a display location of the icon. In addition, the selected application in the middle changes accordingly. With the movement of the icon of the application, the interface thumbnails of the applications in the multitasking bar 307 also move. After the user stops performing the leftward sliding or rightward sliding operation, display locations of the application icons in the shortcut window bar 308 and display of the interface thumbnails of the applications in the multitasking bar 307 do not change. For details, refer to FIG. 7D.

Figure 7D:
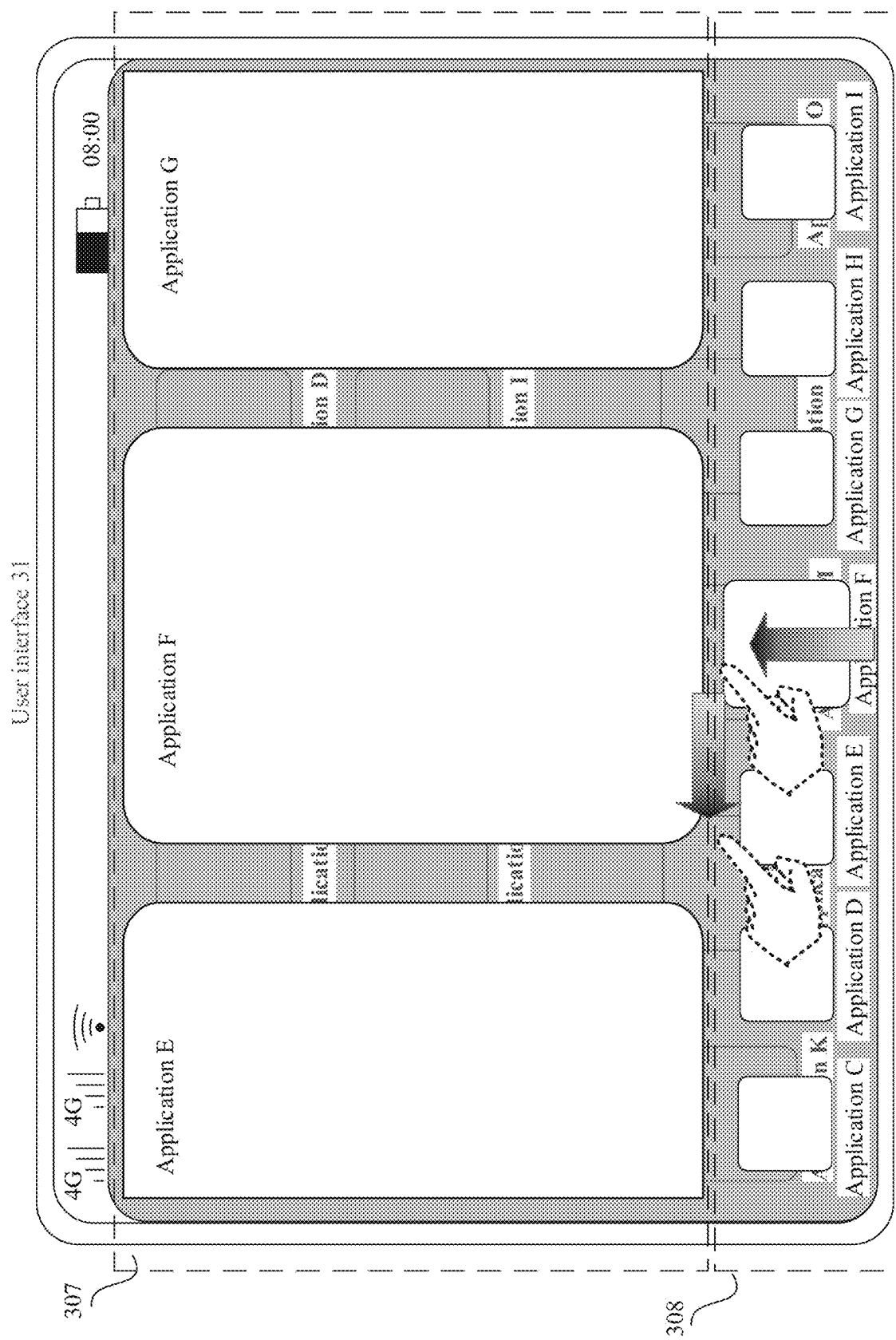
Figure 7E:
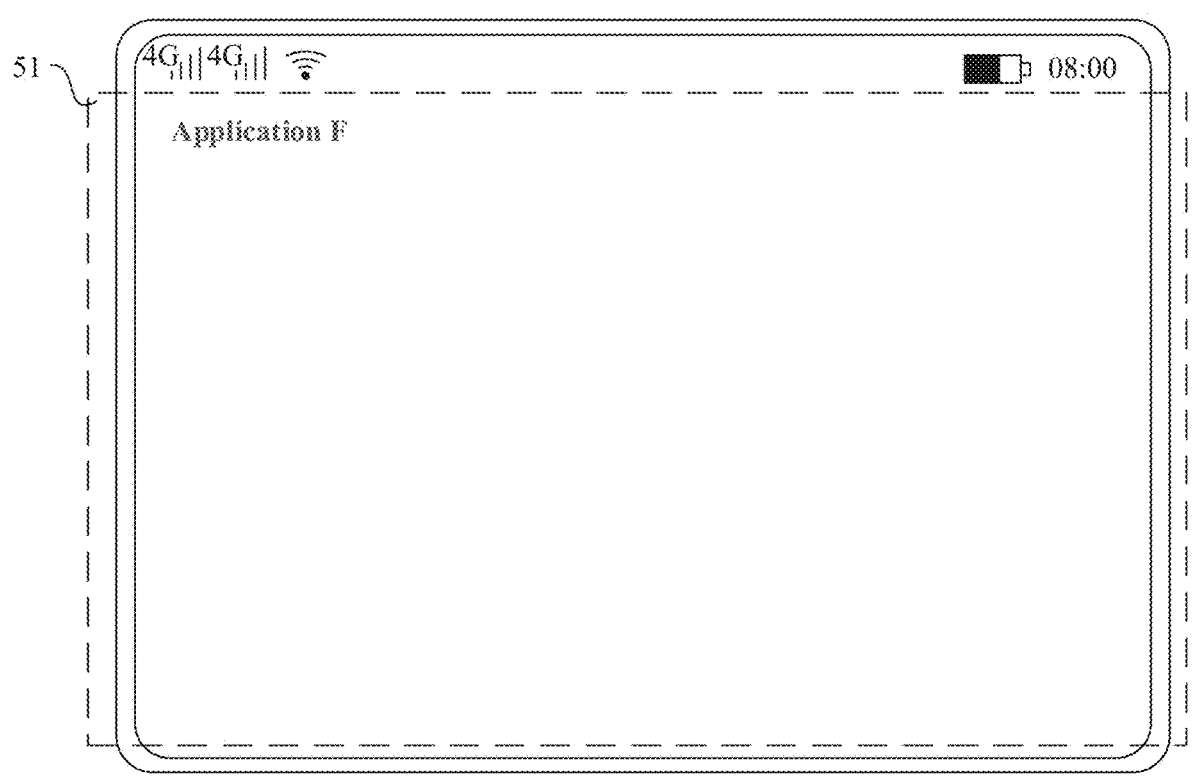

As shown in FIG. 7D, the selected application icon in the shortcut window bar 308 is an icon of an application F, and an interface thumbnail of the application F in the multitasking bar 307 is also displayed at a central location for the user to browse. In this case, when the electronic device 100 detects an operation of releasing the finger, in other words, making the finger leave the display screen, by the user, in response to the operation, the electronic device 100 may display, in full screen, an interface 51 provided by the application F shown in FIG. 7E.

It should be noted that the foregoing operation may be detected by the electronic device 100 in a user interface other than the user interface 31 shown in FIG. 7A, for example, detected when the electronic device 100 displays another application in full screen. This is not limited in this embodiment of this application.

It can be learned that according to the method for displaying an application in full screen provided in FIG. 7A-FIG. 7D, and the electronic device 100 may display, in full screen based on a continuous operation input by the user, that is, an operation of first sliding upward and continuing to slide leftward or slide rightward, an interface provided by the application. Such an uninterrupted operation of direct entry meets an expectation, and avoids interrupting an operation flow of the user, so that the user feels more immersed. In addition, in such a continuous sliding operation, abandoning an original form of touch interaction switched between windows and using a continuous sliding operation instead not only simplify and optimize redundant steps but also improve error tolerance of a user operation. To be specific, when the user selects an application icon, the user can re-select another application icon as long as the user does not release a hand, but in the original single-point touch interaction operation, the user cannot re-change a target application icon after selecting the target application icon.

Figure 8A:
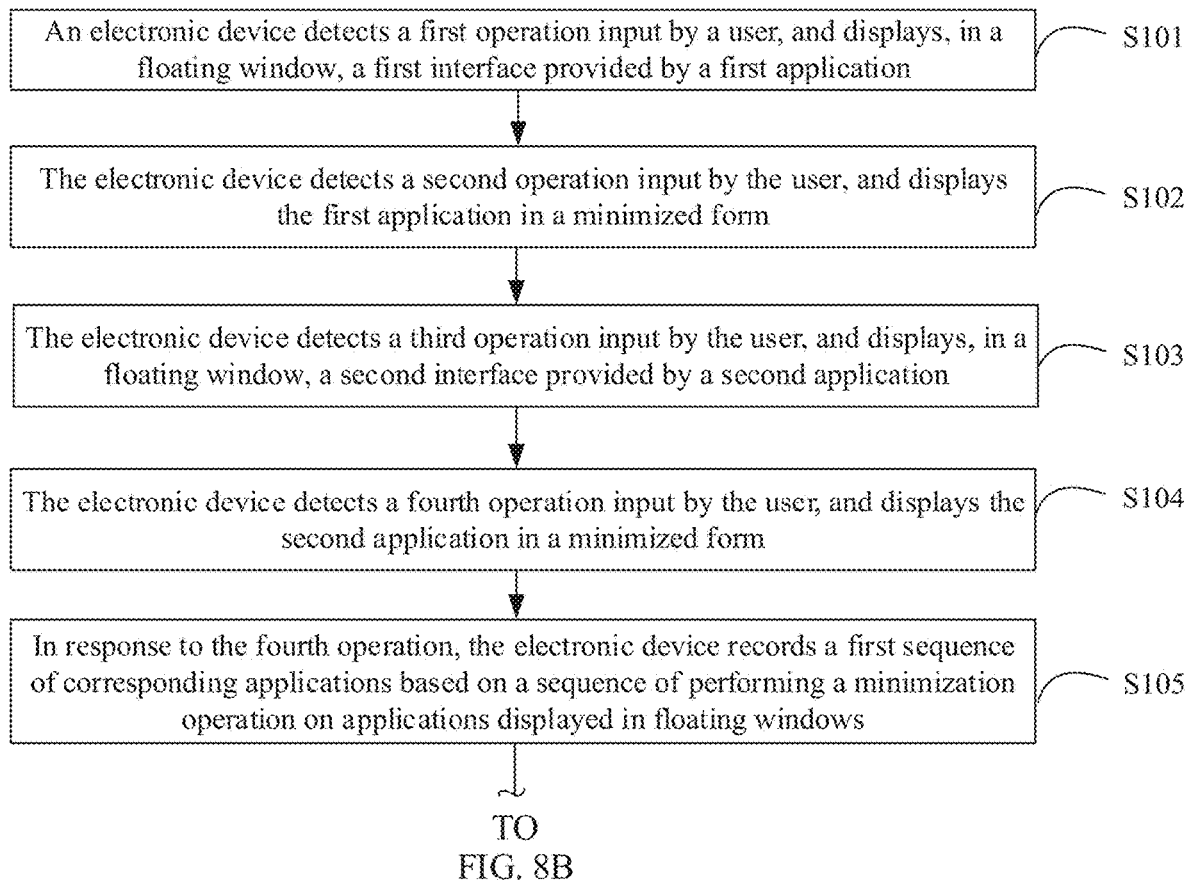

Based on the foregoing software and hardware architectures of the electronic device 100 and embodiments of a series of UIs that are related to application switching and that are provided by the electronic device 100, the following summarizes the switching method provided in this application with reference to a method procedure provided in FIG. 8A and FIG. 8B. As shown in FIG. 8A and FIG. 8B, the method may include the following steps.

S101: An electronic device 100 detects a first operation input by a user, and displays, in a floating window, a first interface provided by a first application.

The foregoing implementation method in which the electronic device displays the first application in a form of a floating window and that is described in FIG. 4A-FIG. 4B is used as a reference. Specifically, an input/output device driver, for example, a display driver, in a kernel layer of the electronic device 100 may detect the first operation, for example, the foregoing tapping operation performed on the icon of the application B shown in FIG. 4A, input by the user. Then the input/output device driver may send the foregoing operation input by the user to an input manager service (IMS) at an application framework layer, and then the IMS distributes the operation to the corresponding application B at an application layer. Then the application B invokes a startActivity interface in an AMS to start an Activity corresponding to the foregoing operation. In addition, the AMS further needs to invoke a Windows manager service (WMS) interface, so that the WMS draws a window corresponding to the Activity, and invokes the display driver to display an interface, for example, the interface 21 of the application B shown in FIG. 4B, on a display screen.

It may be understood that the foregoing operation of triggering the electronic device 100 to display an interface of an application by using a floating window is not limited to the operation of tapping an icon of an application in the side bar shown in FIG. 4A-FIG. 4B. The electronic device 100 may alternatively trigger, based on another detected user operation, for example, a continuous sliding operation of first sliding from a right edge of the display screen to an inner side of the display screen, in other words, sliding leftward, to invoke the side bar and then continuing to slide upward or downward without releasing a hand to select a target application, for example, the application B, shown in FIG. 4C-FIG. 4F in the foregoing UI embodiments, the electronic device 100 to display the interface 21 of the application B by using a floating window.

It can be learned that in the operation used to switch a floating window application provided in FIG. 4C-FIG. 4F in this embodiment of this application, the electronic device 100 may display, by using a floating window and based on a continuous operation, namely, an operation of sliding leftward and continuing to slide upward or downward, input by the user, an interface provided by an application. Such an uninterrupted operation of direct entry meets an expectation, and avoids interrupting an operation flow of the user, so that the user feels more immersed. In addition, in such a continuous sliding operation, abandoning an original form that is of touch interaction switched between windows and that is shown in FIG. 4A-FIG. 4B and using a continuous sliding operation instead not only simplify and optimize redundant steps but also improve error tolerance of a user operation. To be specific, when the user selects an application icon, the user can re-select another application icon as long as the user does not release a hand, but in the original single-point touch/tap interaction operation, the user cannot re-change a target application icon after selecting the target application icon.

S102: The electronic device 100 detects a second operation input by the user, and displays the first application in a minimized form.

In this embodiment of this application, the foregoing representation form of displaying the first application in a minimized form is to stop displaying, in the floating window, the first interface provided by the first application, and display an icon of the first application in a form of a floating ball. A display location of a floating ball icon may be any location on a side edge of the display screen of the electronic device, or a location of the floating ball icon may be moved based on a dragging operation input by the user.

The second operation used to trigger the electronic device to stop displaying, in the floating window, the first interface provided by the first application and display the icon of the first application in a form of a floating ball is shown with reference to FIG. 5G-FIG. 5F. Specifically, the input/output device driver, for example, the display driver, in the kernel layer of the electronic device 100 may detect an operation, for example, the foregoing operation performed on the top Bar 202 provided by the application B displayed on the display screen shown in FIG. 5G-FIG. 5H, input by the user. Then the input/output device driver may send the foregoing operation input by the user to the input manager service (IMS) at the application framework layer, and then the IMS distributes the operation to the corresponding application B at the application layer. Then the application B invokes the startActivity interface in the AMS to close the Activity corresponding to the foregoing operation. In addition, the AMS further needs to invoke the Windows manager service (WMS) interface, so that the WMS draws a floating ball icon, and invokes the display driver to display an interface, for example, the floating ball icon 101B shown in FIG. 5H, on the display screen.

In addition, the electronic device 100 further continues to run the first application in the background, and stores the first interface. When the electronic device detects an operation performed by the user on the floating ball icon 101B, the electronic device displays the first interface herein by using a floating window.

S103: The electronic device 100 detects a third operation input by the user, and displays, in a floating window, a second interface provided by a second application.

The third operation herein is similar to the first operation described in step S101 except that an object of the third operation is an operation performed on an icon of the second application. Therefore, an interface displayed by the electronic device in the floating window is an interface 31 provided by an application C. Step S103 is not described herein.

S104: The electronic device 100 detects a fourth operation input by the user, and displays the second application in a minimized form.

Similar to step S103, that the electronic device 100 displays the second application in a minimized form means stopping displaying, in the floating window, the second interface provided by the second application, and superimposing, on the floating ball icon 101B described in step S102, a floating ball icon 101C corresponding to the second application for display. A difference from step S103 is that an object of the fourth operation is a rightward sliding operation performed on the top Bar 202 provided by the second application. Therefore, the electronic device superimposes the floating ball icon 101C on the floating ball icon 101B for display, and switches the icon of the first application shown in step S102 to the icon of the second application.

S105: In response to the fourth operation, the electronic device 100 records a first sequence of corresponding applications based on a sequence of performing a minimization operation on applications displayed in floating windows.

Specifically, each time the electronic device detects that the minimization operation is not performed for the first time, the electronic device may record the first sequence of the corresponding applications based on the sequence of performing the minimization operation on the applications displayed in the floating windows. For example, the first sequence of the applications that is recorded after the electronic device responds to the fourth operation is the first application and the second application in a chronological sequence.

It may be understood that the first sequence of the applications herein corresponds to the display locations of the interface thumbnails of the applications displayed in the historical application window described in FIG. 6A-FIG. 6B in the foregoing UI embodiments. In other words, the electronic device sequentially displays interface thumbnails of the corresponding applications in the historical application window based on the first sequence of the applications.

S106: The electronic device 100 detects a fifth operation input by the user, and displays, in a floating window, a third interface provided by a third application.

In some embodiments of this application, the fifth operation herein is similar to the first operation described in step S101, in other words, may be similar to the operation shown in FIG. 4A-FIG. 4B, except that an object of the fifth operation is an operation performed on an icon of the third application. Therefore, an interface displayed by the electronic device in the floating window is an interface 41 provided by an application D. Step S106 is not described herein.

With reference to FIG. 6A-FIG. 6C, in some other embodiments of this application, the fifth operation herein may alternatively be an operation performed on the thumbnail of the third interface of the third application in the historical application window shown in FIG. 6B in the foregoing UI embodiments. In response to the fifth operation shown in FIG. 6B, the electronic device may display the user interface shown in FIG. 6C. For descriptions of FIG. 6A-FIG. 6B, refer to the foregoing UI embodiments. Details are not described herein again.

It should be noted that when the fifth operation is the operation shown in FIG. 6B, before the electronic device 100 detects the fifth operation, the electronic device 100 further needs to detect an operation that is performed on the icon of the third application and that is similar to that in step S101, and display, in the floating window, the third interface provided by the third application. Then the electronic device 100 further needs to detect a rightward sliding operation that is performed on a top Bar 402 provided by the third application and that is similar to that described in step S102. In response to the operation, the electronic device 100 displays the user interface shown in FIG. 6A. Then the electronic device 100 further needs to detect an operation that is input by the user and that is performed on a floating ball icon 101D shown in FIG. 6A. In response to the operation, the electronic device displays the user interface shown in FIG. 6B.

S107: The electronic device receives, within a first time in which the third interface provided by the third application is displayed, no operation performed on the third application, and receives a sixth operation, and the electronic device switches, based on the first sequence of the applications described in step S105, the third application to the second application on which the minimization operation is first or last performed in the first sequence.

With reference to FIG. 6C-FIG. 6D, when the electronic device 100 detects a sixth operation of sliding rightward performed on a bottom Bar of the third interface, the electronic device 100 switches, based on the chronological sequence of performing the minimization operation on the applications described in step S105, namely, a bottom-to-top sequence of interface thumbnails of applications in the historical application window 102 displayed by expanding the floating ball icon 101C shown in FIG. 6C, the third application to the second application, namely, the application C, shown in FIG. 6D, that is, a corresponding application on which the minimization operation is last performed before the electronic device 100 displays the third interface in the floating window.

With reference to FIG. 6C-FIG. 6D, when the electronic device 100 detects a sixth operation of sliding leftward performed on the bottom Bar of the third interface, the electronic device 100 switches, based on the chronological sequence of performing the minimization operation on the applications described in step S105, namely, the bottom-to-top sequence of the interface thumbnails of the applications in the historical application window 102 displayed by expanding the floating ball icon 101C shown in FIG. 6C, the third application to the second application, namely, the application C, shown in FIG. 6D, that is, a corresponding application on which the minimization operation is last performed before the electronic device 100 displays the third interface of the application D in the floating window.

S108: The electronic device changes the first sequence of the applications in step S105 to a second sequence.

Specifically, each time the electronic device detects that the minimization operation is not performed for the first time, the electronic device may record the sequence of the corresponding applications based on the sequence of performing the minimization operation on the applications displayed in the floating windows. For example, the second sequence of the applications that is recorded after the electronic device responds to the sixth operation is the first application and the third application in a chronological sequence.

It may be understood that the second sequence of the applications herein is corresponds to the display locations of the interface thumbnails of the applications displayed in the historical application window shown in FIG. 6D in the foregoing UI embodiments. In other words, the electronic device sequentially displays interface thumbnails of the corresponding applications in the historical application window based on the second sequence of the applications.

S109: When the electronic device receives, within the first time in which the second interface provided by the second application is displayed, an operation performed on the second application, and/or after the first time in which the electronic device displays the second interface provided by the second application, the electronic device changes the second sequence of the applications to a third sequence.

With reference to the foregoing descriptions of FIG. 6G-FIG. 6H, when the electronic device 100 detects an operation performed by the user on the second application, for example, an operation of sliding an interface of the second application or an operation of tapping a control provided by the second application, and/or after a time for which the electronic device 100 displays the third interface of the third application exceeds the first time, the electronic device 100 changes the recorded second sequence of the applications to the third sequence, and correspondingly changes the display locations of the interface thumbnails of the applications in the historical application window 102 in FIG. 6H to the display locations in FIG. 6I.

S110: The electronic device receives a seventh operation, and switches, based on the third sequence in response to the seventh operation, the second application to the third application on which the minimization operation is first or last performed in the third sequence.

With reference to FIG. 6I-FIG. 6J, when the electronic device 100 detects a seventh operation of sliding rightward performed on the bottom Bar in the second interface, the electronic device 100 switches, based on the third sequence described in step S109, namely, a bottom-to-top sequence of interface thumbnails of applications in the historical application window 102 displayed by extending the floating ball icon 101D shown in FIG. 6I, the third application to the third application, namely, the application D, shown in FIG. 6J, that is, a corresponding application on which the minimization operation is last performed before the electronic device 100 displays the third interface in the floating window.

With reference to FIG. 6I-FIG. 6J, when the electronic device 100 detects a seventh operation of sliding leftward performed on the bottom Bar in the second interface, the electronic device 100 switches, based on the third sequence described in step S109, namely, the bottom-to-top sequence of the interface thumbnails of the applications in the historical application window 102 displayed by extending the floating ball icon 101D shown in FIG. 6I, the third application to the first application, namely, the application B, shown in FIG. 6J, that is, a corresponding application on which the minimization operation is first performed before the electronic device 100 displays the third interface in the floating window.

It can be learned that after the electronic device performs the foregoing steps S109-S110, because the user stays in the third interface of the third application for an excessively long time, or the user inputs an operation in the third interface, if the user wants to switch back to an application on which the minimization operation is last performed, but the user may forget whether a leftward sliding operation or a rightward sliding operation should be input at the bottom Bar 401 of the third interface, considering memory pressure and an operation habit of the user, that is, a habit of usually inputting an operation in an application or staying in the application for a relatively long time, the electronic device 100 may change a display location of an interface thumbnail of a corresponding application that is in the historical application window and on which the minimization operation is last performed, so that the user only needs to input a sliding operation in a same direction, for example, always input a rightward sliding operation or always input a leftward sliding operation, to switch back and forth between and use two applications. In other words, after the electronic device 100 first displays the third interface of the third application, and then switches to the second interface of the second application based on a rightward sliding operation input by the user, the electronic device 100 may change interface thumbnails of applications in the historical application window, so that an interface thumbnail of the third application is displayed at the topmost location. In this way, memory costs of the user can be reduced, so that the user can switch back to the third application even if the user continues to input a sliding operation in a same direction, namely, a rightward sliding operation, based on the habit.

It can be learned that after the method provided in this embodiment of this application is implemented, the electronic device 100 uses continuous multi-point touch interaction, namely, sliding operation interaction, to replace an original human-computer interaction form of touching or tapping switched between a plurality of windows, to switch an application. Such an operation simplifies redundant steps, achieves an effect of direct entry to a target scenario, meets an expectation of the user, and avoids interrupting an operation flow of the user, thereby bringing immersive "flow" experience to the user. In addition, error tolerance of a sliding operation is greater than that of a touch/tapping operation. To be specific, after the user inputs a sliding operation, the user can change a target operation by continuing to perform sliding, as long as the user does not release a hand. The display improves user experience.

The various implementations of this application may be arbitrarily combined to achieve different technical effects.

All or some of the foregoing embodiments may be implemented by using software, hardware, firmware, or any combination thereof. When being implemented by the software, the embodiments may be completely or partially implemented in a form of a computer program product. The computer program product includes one or more computer instructions. When the computer program instructions are loaded and executed on a computer, all or some of procedures or functions according to this application are generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server, or data center to another website, computer, server, or data center in a wired manner (for example, through a coaxial cable, an optical fiber, or a digital subscriber line) or in a wireless manner (for example, by using infrared, wireless, or microwave). The computer-readable storage medium may be any usable medium accessible by a computer, or a data storage device, for example, a server or a data center, integrating one or more available media. The usable medium may be a magnetic medium (for example, a floppy disk, a hard disk, or magnetic tape), an optical medium (for example, a DVD), a semiconductor medium (for example, a solid state disk (SSD)), or the like.

A person of ordinary skill in the art may understand that all or some of the procedures of the method in the foregoing embodiments are implemented. The procedures may be completed by a computer program instructing related hardware. The program may be stored in a computer-readable storage medium. When the program is executed, the procedures in the foregoing method embodiments may be included. The foregoing storage medium includes any medium that can store program code, for example, a read-only memory (ROM), a random access memory (RAM), a magnetic disk, or an optical disc.

In conclusion, the foregoing descriptions are only embodiments of the technical solutions of the present disclosure, and are not intended to limit the protection scope of the present disclosure. Any modifications, equivalent replacements, improvements, or the like made based on the disclosure of the present disclosure shall fall within the protection scope of the present disclosure.

What is claimed is:

1. An application switching method, the method comprising:
    displaying, by an electronic device, a first interface, wherein the first interface comprises a first floating window and a second floating window, wherein the first floating window corresponds to a first application, and the second floating window corresponds to a second application;
    detecting, by the electronic device, a first operation;
    displaying, by the electronic device, a second interface in response to the first operation, wherein the second interface comprises the second floating window, a third floating window, and a first floating ball, wherein the third floating window corresponds to a third application, and the first floating ball corresponds to the first application;
    detecting, by the electronic device, a second operation performed on the first floating ball;
    displaying, by the electronic device, a third interface in response to the second operation, wherein the third interface comprises the first floating window, the third floating window, and a second floating ball, and the second floating ball corresponds to the second application;

detecting, by the electronic device, a third operation used to display the first floating window in a minimized form;

displaying, by the electronic device, a fourth interface in response to the third operation, wherein the fourth interface displays the third floating window, the second floating ball, and the first floating ball, and the first floating ball is displayed in a manner of being superimposed on the second floating ball;

detecting, by the electronic device, a fourth operation of sliding rightward performed on a bottom of the third floating window; and displaying, by the electronic device, a fifth interface in response to the fourth operation, wherein the fifth interface displays the first floating window, the second floating ball, and a third floating ball, and the second floating ball is displayed in a manner of being superimposed on the third floating ball.

2. The method according to claim 1, wherein after the displaying, by the electronic device, the fifth interface, the method further comprises:

detecting, by the electronic device, no fifth operation within a first time in which the fifth interface is displayed, and detecting, by the electronic device, a sixth operation of sliding leftward performed on the bottom of the first floating window, wherein the fifth operation comprises an operation used to change a display size, a display location, or display content of the first floating window; and displaying, by the electronic device, a sixth interface in response to the sixth operation, wherein the sixth interface displays the third floating window, the second floating ball, and the first floating ball, and the first floating ball is displayed in a manner of being superimposed on the second floating ball.

3. The method according to claim 1, wherein after the displaying, by the electronic device, the fifth interface, the method further comprises:

receiving, by the electronic device, a fifth operation within a first time in which the fifth interface is displayed, or displaying, by the electronic device, the fifth interface for duration exceeding the first time, wherein the fifth operation comprises an operation used to change a display size, a display location, or display content of the first floating window;

detecting, by the electronic device, a sixth operation of sliding rightward performed on the bottom of the first floating window; and displaying, by the electronic device, a sixth interface in response to the sixth operation, wherein the sixth interface displays the third floating window, the second floating ball, and the first floating ball, and the second floating ball is displayed in a manner of being superimposed on the first floating ball.

4. The method according to claim 1, wherein the detecting, by the electronic device, the first operation comprises:

first detecting, by the electronic device, an operation of sliding from an edge to an inner side of a display screen and displaying a side bar, wherein the side bar displays icons of one or more applications, and then detecting, by the electronic device, an operation performed on an icon of the third application, wherein the icons of the one or more applications comprise the icon of the third application;

or first detecting, by the electronic device, an operation of sliding from an edge to an inner side of a display screen and displaying a side bar, wherein the side bar displays icons of one or more applications; then detecting, by the electronic device, an operation of continuously touching the display screen and sliding upward or downward after the operation of sliding toward the inner side, and determining, by the electronic device based on the operation of sliding upward or downward, that a corresponding application icon is selected; and finally detecting an operation of stopping touching the display screen when the icon of the third application is selected.

5. The method according to claim 1, wherein the first floating window displays any one or more of the following: a top bar, a maximize control, a minimize control, a close control, or a bottom bar.

6. The method according to claim 5, wherein after the displaying, by the electronic device, the fifth interface, the method further comprises:

detecting, by the electronic device, a seventh operation, and performing, by the electronic device, any one of the following in response to the seventh operation:
changing a location of the third floating window;
changing a size of the third floating window;
displaying, in full screen, an interface provided by the application corresponding to the third floating window; or
stopping running the application corresponding to the third floating window.

7. The method according to claim 2, wherein before the displaying, by the electronic device, the first interface, the method further comprises:

displaying, by the electronic device in full screen, an interface provided by a fourth application.

8. The method according to claim 7, wherein after the displaying, by the electronic device, the sixth interface, the method further comprises:

detecting, by the electronic device, an eighth operation of double-tapping a bottom bar in the third floating window; and displaying, by the electronic device, a seventh interface in response to the eighth operation, wherein the seventh interface displays, in full screen, an interface provided by the third application corresponding to the third floating window; and displaying, by the electronic device, a fourth floating window, the first floating ball, and the second floating ball in the interface provided by the first application, wherein the fourth floating window corresponds to the fourth application.

9. The method according to claim 4, wherein the side bar displaying icons of the one or more applications comprises:

displaying, by the electronic device, the icons of the one or more applications in the side bar in a form of a single column or a plurality of columns.

10. The method according to claim 4, wherein the side bar displaying icons of the one or more applications comprises:

when the electronic device is displayed in a landscape mode, the electronic device displays the icons of the one or more applications in the side bar in a form of a plurality of columns; and when the electronic device is displayed in a portrait mode, the electronic device displays the icons of the one or more applications in the side bar in a form of a single column;

or when a quantity of icons of the one or more applications is greater than a preset quantity, the electronic device displays the icons of the one or more applications in the side bar in a form of a plurality of columns; and when the quantity of icons of the one or more applications is less than or equal to the preset quantity, the electronic device displays the icons of the one or more applications in the side bar in a form of a single column.

11. The method according to claim 4, wherein the icons of the one or more applications displayed in the side bar are preset by the electronic device or set by a user.

12. An electronic device, comprising:
one or more memories, wherein the one or more memories are configured to store computer program code, wherein the computer program code comprises computer instructions; and
one or more processors configured to execute the computer instructions to cause the electronic device to perform operations comprising:
displaying a first interface, wherein the first interface comprises a first floating window and a second floating window, wherein the first floating window corresponds to a first application, and the second floating window corresponds to a second application;
detecting a first operation;
displaying a second interface in response to the first operation, wherein the second interface comprises the second floating window, a third floating window, and a first floating ball, wherein the third floating window corresponds to a third application, and the first floating ball corresponds to the first application;
detecting a second operation performed on the first floating ball;
displaying a third interface in response to the second operation, wherein the third interface comprises the first floating window, the third floating window, and a second floating ball, and the second floating ball corresponds to the second application;
detecting a third operation used to display the first floating window in a minimized form;
displaying a fourth interface in response to the third operation, wherein the fourth interface displays the third floating window, the second floating ball, and the first floating ball, and the first floating ball is displayed in a manner of being superimposed on the second floating ball;
detecting a fourth operation of sliding rightward performed on a bottom of the third floating window; and
displaying a fifth interface in response to the fourth operation, wherein the fifth interface displays the first floating window, the second floating ball, and a third floating ball, and the second floating ball is displayed in a manner of being superimposed on the third floating ball.

13. The electronic device according to claim 12, wherein after the displaying the fifth interface, the operations further comprise:
detecting no fifth operation within a first time in which the fifth interface is displayed, and detecting a sixth operation of sliding leftward performed on the bottom of the first floating window, wherein the fifth operation comprises an operation used to change a display size, a display location, or display content of the first floating window; and
displaying a sixth interface in response to the sixth operation, wherein the sixth interface displays the third floating window, the second floating ball, and the first floating ball, and the first floating ball is displayed in a manner of being superimposed on the second floating ball.

14. The electronic device according to claim 12, wherein after the displaying the fifth interface, the operations further comprise:
receiving a fifth operation within a first time in which the fifth interface is displayed, or displaying the fifth interface for duration exceeding the first time, wherein the fifth operation comprises an operation used to change a display size, a display location, or display content of the first floating window;
detecting a sixth operation of sliding rightward performed on the bottom of the first floating window; and
displaying a sixth interface in response to the sixth operation, wherein the sixth interface displays the third floating window, the second floating ball, and the first floating ball, and the second floating ball is displayed in a manner of being superimposed on the first floating ball.

15. The electronic device according to claim 12, wherein the first floating window displays any one or more of the following: a top bar, a maximize control, a minimize control, a close control, or a bottom bar.

16. A non-transitory computer-readable storage medium storing instructions that, when executed by one or more processors, cause an electronic device to perform operations comprising:
displaying a first interface, wherein the first interface comprises a first floating window and a second floating window, wherein the first floating window corresponds to a first application, and the second floating window corresponds to a second application;
detecting a first operation;
displaying a second interface in response to the first operation, wherein the second interface comprises the second floating window, a third floating window, and a first floating ball, wherein the third floating window corresponds to a third application, and the first floating ball corresponds to the first application;
detecting a second operation performed on the first floating ball;
displaying a third interface in response to the second operation, wherein the third interface comprises the first floating window, the third floating window, and a second floating ball, and the second floating ball corresponds to the second application;
detecting a third operation used to display the first floating window in a minimized form;
displaying a fourth interface in response to the third operation, wherein the fourth interface displays the third floating window, the second floating ball, and the first floating ball, and the first floating ball is displayed in a manner of being superimposed on the second floating ball;
detecting a fourth operation of sliding rightward performed on a bottom of the third floating window; and
displaying a fifth interface in response to the fourth operation, wherein the fifth interface displays the first floating window, the second floating ball, and a third floating ball, and the second floating ball is displayed in a manner of being superimposed on the third floating ball.

17. The computer-readable storage medium according to claim 16, wherein after the displaying the fifth interface, the operations further comprise:

detecting no fifth operation within a first time in which the fifth interface is displayed, and detecting a sixth operation of sliding leftward performed on the bottom of the first floating window, wherein the fifth operation comprises an operation used to change a display size, a display location, or display content of the first floating window; and displaying a sixth interface in response to the sixth operation, wherein the sixth interface displays the third floating window, the second floating ball, and the first floating ball, and the first floating ball is displayed in a manner of being superimposed on the second floating ball.

18. The computer-readable storage medium according to claim 16, wherein after the displaying the fifth interface, the operations further comprise:

receiving a fifth operation within a first time in which the fifth interface is displayed, or displaying the fifth interface for duration exceeding the first time, wherein the fifth operation comprises an operation used to change a display size, a display location, or display content of the first floating window;

detecting a sixth operation of sliding rightward performed on the bottom of the first floating window; and displaying a sixth interface in response to the sixth operation, wherein the sixth interface displays the third floating window, the second floating ball, and the first floating ball, and the second floating ball is displayed in a manner of being superimposed on the first floating ball.

19. The computer-readable storage medium according to claim 16, wherein the first floating window displays any one or more of the following: a top bar, a maximize control, a minimize control, a close control, or a bottom bar.

* * * * *